(12) United States Patent
Holt

(10) Patent No.: US 7,852,845 B2
(45) Date of Patent: Dec. 14, 2010

(54) ASYNCHRONOUS DATA TRANSMISSION

(75) Inventor: John M. Holt, Essex (GB)

(73) Assignee: Waratek Pty Ltd., Lindfield, New South Wales (AU)

( * ) Notice: Subject to any disclaimer, the term of this patent is extended or adjusted under 35 U.S.C. 154(b) by 372 days.

(21) Appl. No.: 11/973,393

(22) Filed: Oct. 5, 2007

(65) Prior Publication Data

US 2008/0137662 A1 Jun. 12, 2008

Related U.S. Application Data

(60) Provisional application No. 60/850,533, filed on Oct. 9, 2006, provisional application No. 60/850,711, filed on Oct. 9, 2006.

(30) Foreign Application Priority Data

Oct. 5, 2006 (AU) .............................. 2006905527
Oct. 5, 2006 (AU) .............................. 2006905530

(51) Int. Cl.
*H04L 12/28* (2006.01)
(52) U.S. Cl. ..................... 370/394; 370/429; 370/474
(58) Field of Classification Search ................. 370/394, 370/412, 429, 474
See application file for complete search history.

(56) References Cited

U.S. PATENT DOCUMENTS

| | | |
|---|---|---|
| 4,969,092 A | 11/1990 | Shorter |
| 5,214,776 A | 5/1993 | Bagnoli et al. |
| 5,291,597 A | 3/1994 | Shorter |
| 5,418,966 A | 5/1995 | Madduri |
| 5,434,994 A | 7/1995 | Shaheen et al. |
| 5,488,723 A | 1/1996 | Baradel et al. |
| 5,544,345 A | 8/1996 | Carpenter et al. |
| 5,568,609 A | 10/1996 | Sugiyama et al. |
| 5,612,865 A | 3/1997 | Dasgupta |

(Continued)

FOREIGN PATENT DOCUMENTS

EP 0969377 1/2000

(Continued)

OTHER PUBLICATIONS

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

(Continued)

*Primary Examiner*—Jayanti K Patel
*Assistant Examiner*—Jung Park
(74) *Attorney, Agent, or Firm*—Pillsbury Winthrop Shaw Pittman LLP

(57) ABSTRACT

A method of, and system for, asynchronous data transmission are disclosed which have application in the transmission of stock exchange data or replicated memory data. Later transmitted data is used to overwrite earlier transmitted and received data. However, earlier transmitted data which is received later than later transmitted data (for example due to network latency) does not overwrite the later transmitted data. Transmitted data packets include a count value indicative of the sequence position of each data packet in a transmitted sequence of data packets. A transmitter and receiver for asynchronous data transmission and reception, and a packet signal structure are also disclosed.

5 Claims, 29 Drawing Sheets

U.S. PATENT DOCUMENTS

| | | | |
|---|---|---|---|
| 5,802,585 | A | 9/1998 | Scales et al. |
| 5,918,248 | A | 6/1999 | Newell et al. |
| 6,049,809 | A | 4/2000 | Raman et al. |
| 6,148,377 | A | 11/2000 | Carter et al. |
| 6,163,801 | A | 12/2000 | O'Donnell et al. |
| 6,192,514 | B1 | 2/2001 | Lurndal |
| 6,314,558 | B1 | 11/2001 | Angel et al. |
| 6,324,587 | B1 | 11/2001 | Trenbeath et al. |
| 6,327,630 | B1 | 12/2001 | Carroll et al. |
| 6,370,625 | B1 | 4/2002 | Carmean et al. |
| 6,389,423 | B1 | 5/2002 | Sakakura |
| 6,425,016 | B1 | 7/2002 | Banavar et al. |
| 6,571,278 | B1 | 5/2003 | Negishi et al. |
| 6,574,628 | B1 | 6/2003 | Kahn et al. |
| 6,574,674 | B1 | 6/2003 | May et al. |
| 6,611,955 | B1 | 8/2003 | Logean et al. |
| 6,625,751 | B1 | 9/2003 | Starovic et al. |
| 6,668,260 | B2 | 12/2003 | Zoltan |
| 6,757,896 | B1 | 6/2004 | Cohen et al. |
| 6,760,903 | B1 | 7/2004 | Morshed et al. |
| 6,775,831 | B1 | 8/2004 | Carrasco et al. |
| 6,779,093 | B1 | 8/2004 | Gupta |
| 6,782,492 | B1 | 8/2004 | Nakaso |
| 6,823,511 | B1 | 11/2004 | McKenney et al. |
| 6,862,608 | B2 | 3/2005 | Buhlman et al. |
| 6,954,794 | B2 | 10/2005 | Rudd et al. |
| 6,968,372 | B1 | 11/2005 | Thompson et al. |
| 7,010,576 | B2 | 3/2006 | Bae |
| 7,020,736 | B1 | 3/2006 | Cherukuri |
| 7,031,989 | B2 | 4/2006 | Elmendorf et al. |
| 7,047,341 | B2 | 5/2006 | Jung |
| 7,047,521 | B2 | 5/2006 | Bunnell |
| 7,058,826 | B2 | 6/2006 | Fung |
| 7,082,604 | B2 | 7/2006 | Schneiderman |
| 7,206,827 | B2 | 4/2007 | Viswanath et al. |
| 7,228,543 | B2 * | 6/2007 | Baylis ............... 718/1 |
| 2002/0199172 | A1 | 12/2002 | Bunnell |
| 2003/0004924 | A1 | 1/2003 | Williams |
| 2003/0005407 | A1 | 1/2003 | Hines |
| 2003/0067912 | A1 | 4/2003 | Mead et al. |
| 2003/0105816 | A1 | 6/2003 | Goswami |
| 2004/0073828 | A1 | 4/2004 | Bronstein |
| 2004/0085963 | A1 * | 5/2004 | Ying ............... 370/394 |
| 2004/0093588 | A1 | 5/2004 | Gschwind et al. |
| 2004/0158819 | A1 | 8/2004 | Cuomo et al. |
| 2004/0163077 | A1 | 8/2004 | Dimpsey et al. |
| 2005/0039171 | A1 | 2/2005 | Avakian et al. |
| 2005/0086384 | A1 | 4/2005 | Ernst |
| 2005/0108481 | A1 | 5/2005 | Iyengar et al. |
| 2005/0240737 | A1 | 10/2005 | Holt |
| 2005/0257219 | A1 | 11/2005 | Holt |
| 2005/0262313 | A1 | 11/2005 | Holt |
| 2005/0262513 | A1 | 11/2005 | Holt |
| 2006/0020913 | A1 | 1/2006 | Holt |
| 2006/0080389 | A1 | 4/2006 | Powers et al. |
| 2006/0095483 | A1 | 5/2006 | Holt |
| 2006/0143350 | A1 | 6/2006 | Miloushev et al. |
| 2006/0167878 | A1 | 7/2006 | Hartman |
| 2006/0242464 | A1 | 10/2006 | Holt |
| 2006/0253844 | A1 | 11/2006 | Holt |
| 2006/0265703 | A1 | 11/2006 | Holt |
| 2006/0265704 | A1 | 11/2006 | Holt |
| 2006/0265705 | A1 | 11/2006 | Holt |
| 2008/0072238 | A1 | 3/2008 | Monnie et al. |
| 2008/0189700 | A1 | 8/2008 | Schmidt et al. |

FOREIGN PATENT DOCUMENTS

| | | |
|---|---|---|
| WO | WO95/08809 | 3/1995 |
| WO | WO98/58330 | 12/1998 |
| WO | WO02/44835 | 6/2002 |
| WO | WO03/083614 | 10/2003 |
| WO | WO03084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.

Bal, et al., "Experience with Distributed Programming in Orca", *IEEE CS International Conference on Computer Languages*, pp. 1-23, Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications on Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP'90, Feb. 1990.

Bressoud, T.C. TFT: "A Software System for Application-Transparent Fault Tolerance. Proc.", 28th Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9, Nov. 10-12, 2003, San Paulo, Brazil.

Dmitriev, "Profiling Java applications using code hotswapping and dynamic call graph revelation." Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA '93), pp. 144-155, May 16-19, 1993, San Diego, CA.

Gothe, et al., "The Distributed Ada Run-Time System DARTS." Software Prac. & Experience, vol. 21, No. 1, pp. 1249-1263, Aug. 4, 1989.

Haumacher, et al., "Transparent distributed threads for Java," Parallel & Distributed Proc. Symposium 2003, Proc. Int'l. pp. 22-26, Apr. 2003.

Puatu, "Distributed Garbage Collection of Active Objects with No Global Synchonisation"—Lecture Notes in Computer Science, Memory Management [online], XP008098868 ISSN: 0302-9743 ISBN: 978-3-540-55940-5-Retrieved from the internet URL:http//www.springerlink.com/content/5v 028411810p6m700/>, vol. 637, pp. 148-4694, Sep. 17-19, 1992, IWMM 92, St. Malo, France.

Larus, et al. "EEL: machine-independent executable editing. 1995 ACM SIGGPLAN '95." pp. 291-300, Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, May 25, 1993, pp. 491-498, WP010095684 ISBN:978-0-8186-3770-4.
Radovic, et al., "Removing the overhead from software-based shared memory." Prc. 2001 ACM/IEEE Conf. Supercomputing (CDrom), Denver CO., Nov. 10-16, 2001, Supercomputing '01. ACM Press. NY.
Russ, et al., "The hector distributed run-time environment", IEEEE Transactions on Parallel and Distributed Systems, vol. 9, No. 111998, May 22, 1998.
Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.
Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.
Supplementary European Search Report EP 06 79 0317 dated Mar. 5, 2009.
Co-pending U.S. Appl. No. 11/583,359, filed Oct. 18, 2006.
Co-pending U.S. Appl. No. 12/011,216, filed Jan. 23, 2008.
Co-pending U.S. Appl. No. 11/538,948, filed Oct. 18, 2006.
Co-pending U.S. Appl. No. 12/011,198, filed Jan. 23, 2008.
Co-pending U.S. Appl. No. 11/583,351, filed Oct. 18, 2006.
Co-pending U.S. Appl. No. 12/011,217, filed Jan. 23, 2008.
Co-pending U.S. Appl. No. 11/583,991, filed Oct. 18, 2006.
Co-pending U.S. Appl. No. 12/011,199, filed Jan. 23, 2008.
Co-pending U.S. Appl. No. 11/583,958, filed Oct. 18, 2006.
Co-pending U.S. Appl. No. 12/011,207, filed Jan. 23, 2008.
Co-pending U.S. Appl. No. 11/583,962, filed Oct. 18, 2006.
Co-pending U.S. Appl. No. 12/011,215, filed Jan. 23, 2008.
Co-pending U.S. Appl. No. 11/583,961, filed Oct. 18, 2006.
Co-pending U.S. Appl. No. 12/011,218, filed Jan. 23, 2008.
Co-pending U.S. Appl. No. 11/259,885, filed Oct. 25, 2005.
Co-pending U.S. Appl. No. 11/259,634, filed Oct. 25, 2005.
Co-pending U.S. Appl. No. 12/396,446, filed Mar. 2, 2009.
Co-pending U.S. Appl. No. 11/259,744, filed Oct. 25, 2005.
Co-pending U.S. Appl. No. 12/340,303, filed Dec. 19, 2008.
Co-pending U.S. Appl. No. 11/259,762, filed Oct. 25, 2005.
Co-pending U.S. Appl. No. 11/259,761, filed Oct. 25, 2005.
Co-pending U.S. Appl. No. 12/343,419, filed Dec. 23, 2008.
Co-pending U.S. Appl. No. 11/973,377, filed Oct. 5, 2007.
Co-pending U.S. Appl. No. 11/973,386, filed Oct. 5, 2007.
Co-pending U.S. Appl. No. 11/973,388, filed Oct. 5, 2007.
Co-pending U.S. Appl. No. 11/973,369, filed Oct. 5, 2007.
Co-pending U.S. Appl. No. 11/973,376, filed Oct. 5, 2007.
Co-pending U.S. Appl. No. 11/973,381, filed Oct. 5, 2007.
Co-pending U.S. Appl. No. 11/973,382, filed Oct. 5, 2007.
Co-pending U.S. Appl. No. 11/973,383, filed Oct. 5, 2007.
Co-pending U.S. Appl. No. 11/973,392, filed Oct. 5, 2007.
Co-pending U.S. Appl. No. 11/973,324, filed Oct. 5, 2007.
Co-pending U.S. Appl. No. 11/973,325, filed Oct. 5, 2007.
Co-pending U.S. Appl. No. 11/973,338, filed Oct. 5, 2007.
Co-pending U.S. Appl. No. 11/973,390, filed Oct. 5, 2007.
Co-pending U.S. Appl. No. 11/973,398, filed Oct. 5, 2007.
Co-pending U.S. Appl. No. 11/973,387, filed Oct. 5, 2007.
Co-pending U.S. Appl. No. 11/973,396, filed Oct. 5, 2007.
Co-pending U.S. Appl. No. 11/973,372, filed Oct. 5, 2007.
Co-pending U.S. Appl. No. 11/973,385, filed Oct. 5, 2007.
Co-pending U.S. Appl. No. 11/973,397, filed Oct. 5, 2007.
Co-pending U.S. Appl. No. 11/973,370, filed Oct. 5, 2007.
Co-pending U.S. Appl. No. 11/973,371, filed Oct. 5, 2007.
Co-pending U.S. Appl. No. 11/973,391, filed Oct. 5, 2007.
Co-pending U.S. Appl. No. 11/973,399, filed Oct. 5, 2007.
Co-pending U.S. Appl. No. 11/973,400, filed Oct. 5, 2007.
Co-pending U.S. Appl. No. 11/973,401, filed Oct. 5, 2007.
Co-pending U.S. Appl. No. 11/973,368, filed Oct. 5, 2007.
Co-pending U.S. Appl. No. 11/973,389, filed Oct. 5, 2007.
Co-pending U.S. Appl. No. 11/973,395, filed Oct. 5, 2007.
Co-pending U.S. Appl. No. 11/973,384, filed Oct. 5, 2007.
Co-pending U.S. Appl. No. 11/973,393, filed Oct. 5, 2007.
Co-pending U.S. Appl. No. 11/973,394, filed Oct. 5, 2007.
Co-pending U.S. Appl. No. 11/973,373, filed Oct. 5, 2007.
Co-pending U.S. Appl. No. 11/973,374, filed Oct. 5, 2007.
Co-pending U.S. Appl. No. 11/973,380, filed Oct. 5, 2007.
Co-pending U.S. Appl. No. 11/973,341, filed Oct. 5, 2007.
Co-pending U.S. Appl. No. 11/973,342, filed Oct. 5, 2007.
Co-pending U.S. Appl. No. 11/973,354, filed Oct. 5, 2007.
Co-pending U.S. Appl. No. 11/973,327, filed Oct. 5, 2007.
Co-pending U.S. Appl. No. 11/973,331, filed Oct. 5, 2007.
Co-pending U.S. Appl. No. 11/973,348, filed Oct. 5, 2007.
Co-pending U.S. Appl. No. 11/973,326, filed Oct. 5, 2007.
Co-pending U.S. Appl. No. 11/973,328, filed Oct. 5, 2007.
Co-pending U.S. Appl. No. 11/973,330, filed Oct. 5, 2007.
Co-pending U.S. Appl. No. 11/973,349, filed Oct. 5, 2007.
Co-pending U.S. Appl. No. 11/973,350, filed Oct. 5, 2007.
Co-pending U.S. Appl. No. 11/973,351, filed Oct. 5, 2007.
Co-pending U.S. Appl. No. 11/973,329, filed Oct. 5, 2007.
Co-pending U.S. Appl. No. 11/973,345, filed Oct. 5, 2007.
Co-pending U.S. Appl. No. 11/973,346, filed Oct. 5, 2007.
Co-pending U.S. Appl. No. 11/973,347, filed Oct. 5, 2007.
Co-pending U.S. Appl. No. 11/973,320, filed Oct. 5, 2007.
Co-pending U.S. Appl. No. 11/973,322, filed Oct. 5, 2007.
Co-pending U.S. Appl. No. 11/973,323, filed Oct. 5, 2007.
Co-pending U.S. Appl. No. 11/973,340, filed Oct. 5, 2007.
Co-pending U.S. Appl. No. 11/973,355, filed Oct. 5, 2007.
Co-pending U.S. Appl. No. 11/973,356, filed Oct. 5, 2007.
Co-pending U.S. Appl. No. 11/973,317, filed Oct. 5, 2007.
Co-pending U.S. Appl. No. 11/973,339, filed Oct. 5, 2007.
Co-pending U.S. Appl. No. 11/973,318, filed Oct. 5, 2007.
Co-pending U.S. Appl. No. 11/973,353, filed Oct. 5, 2007.
Co-pending U.S. Appl. No. 11/973,375, filed Oct. 5, 2007.
Co-pending U.S. Appl. No. 11/973,378, filed Oct. 5, 2007.
Co-pending U.S. Appl. No. 11/973,379, filed Oct. 5, 2007.
Co-pending U.S. Appl. No. 12/051,701, filed Mar. 19, 2008.
Co-pending U.S. Appl. No. 10/830,042, filed Apr. 23, 2004.
Co-pending U.S. Appl. No. 11/111,757, filed Apr. 22, 2005.
Co-pending U.S. Appl. No. 11/111,778, filed Apr. 22, 2005.
Co-pending U.S. Appl. No. 11/111,779, filed Apr. 22, 2005.
Co-pending U.S. Appl. No. 11/111,781, filed Apr. 22, 2005.
Co-pending U.S. Appl. No. 11/111,946, filed Apr. 22, 2005.
Co-pending U.S. Appl. No. 12/366,524, filed Feb. 5, 2009.
Co-pending U.S. Appl. No. 12/394,009, filed Feb. 26, 2009.
Co-pending U.S. Appl. No. 11/912,141, filed Oct. 9, 2008.
"Managing Update Conflicts in Bayou, a Weakly Connected Replicated Storage System" Terry et al., Operating Systems Review, vol. 29, No. 5, pp. 172-183, Fifteenth AC Symposium on Operating Systems Principles Conference, Date: Dec. 3-6, 1995.

* cited by examiner

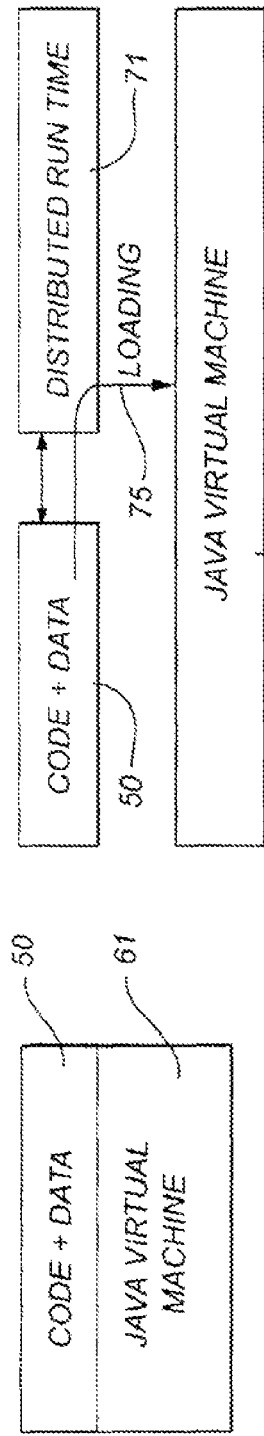
FIG. 1A
PRIOR ART
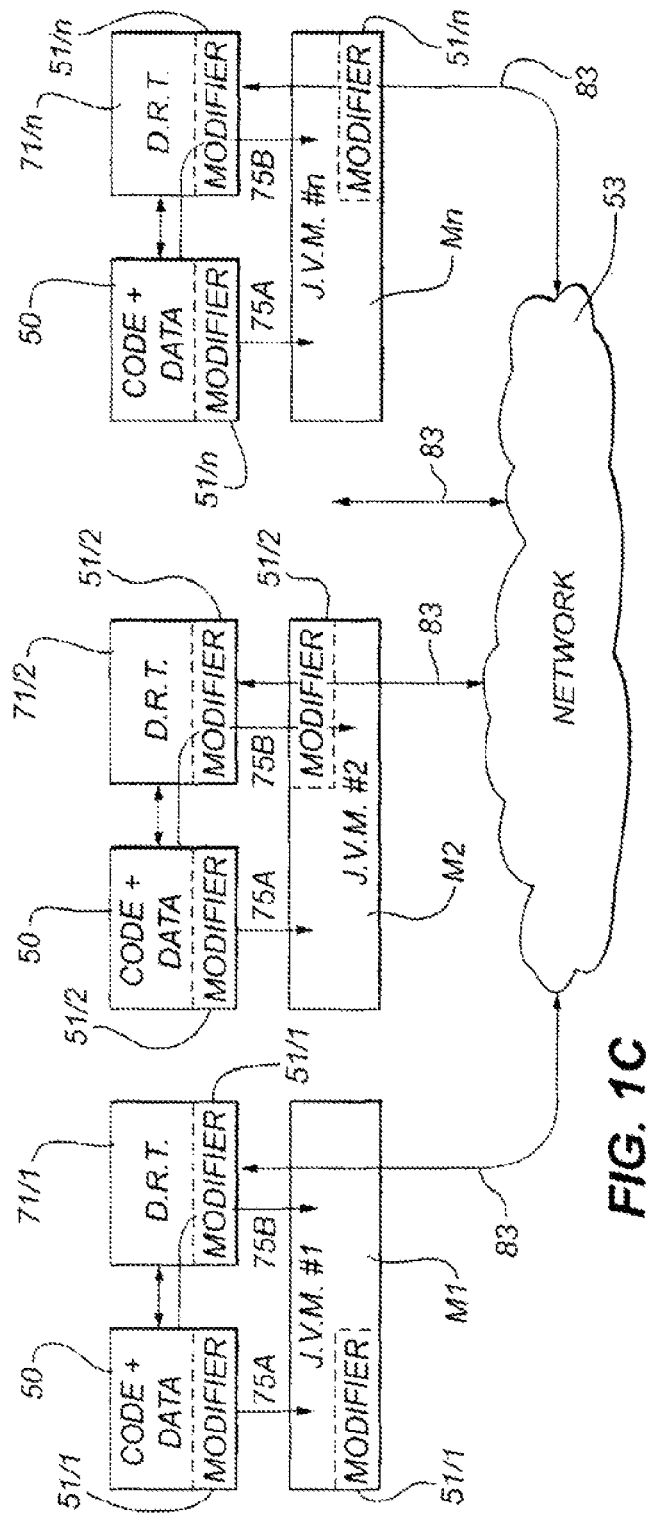
FIG. 1B
PRIOR ART
FIG. 1C

ASYNCHRONOUS DATA TRANSMISSION

CROSS-REFERENCE TO RELATED APPLICATIONS

The present application claims benefit under 35 USC 119(e) to U.S. Provisional Application Nos. 60/850,533 and 60/850,711, both filed 9 Oct. 2006. This application claims priority under 35 USC 119(a)-(d) to Australian Provisional Application Nos. 2006905530 and 2006905527, both filed on 5 Oct. 2006, each of which are hereby incorporated herein by reference.

This application is related to concurrently filed U.S. application Ser. No. 11/973,394 entitled "Asynchronous Data Transmission," and concurrently filed U.S. application Ser. No. 11/973,384 entitled "Asynchronous Data Transmission,", each of which are hereby incorporated herein by reference.

FIELD OF THE INVENTION

The present invention relates to data transmission and, in particular, to asynchronous data transmission.

BACKGROUND

Modern data transmission systems transmit data in packets or parcels of data each of which may be individually transmitted and each of which is normally assembled by the receiver.

In some instances, such as transmission of data which is to be assembled to form a movie or other sequential data or content, it is at least advantageous and often essential for the proper use and enjoyment of the received data or content that all the transmitted data be received correctly and be assembled in the correct order so that the data can be comprehended at the receiver. For example, when the data is a movie, video stream, music or other audio, or some form of sequential data where the order received is important, the assembled data or content should be assembled or reassembled in the correct sequential order. However, there are other types of data, for example stock exchange price data where it is not absolutely essential that every data packet transmitted be received and processed in the order in which they were transmitted. This is because, for example, in the event of a number of sales in quick succession for the same stock, it is only important that the latest data be received and any out of sequence packets received can be discarded since they represent historical data of no specific interest to the receiver.

Modern data transmission networks including the internet, suffer from various defects such as variable transmission times, variable transmission delays, latency and unordered delivery of packets, all of which can vary with time and with position on the network, and the like.

GENESIS OF THE INVENTION

The genesis of the present invention is a desire to provide a simplified transmission arrangement for data such as stock prices or replicated memory where the receipt of data packets of a sequence of data packets in the correct order of transmission, is less important than the receipt of the last transmitted packet.

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Applications Nos. PCT/AU2005/001641 (WO 2006/110,937) and PCT/AU2006/000532 (WO 2006/110,957) both in the name of the present applicant and both unpublished as at the priority date of the present application, also disclose further details. The contents of the specification of each of the above mentioned prior application(s) are hereby incorporated into the present specification by cross reference for all purposes.

Briefly stated, the abovementioned patent specification discloses that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

In many situations, the above-mentioned arrangements work satisfactorily. This applies particularly where the programmer is aware that there may be updating delays and so can adjust the flow of the program to account for this. However, the need to update each local memory when any change is made to any memory location, can create inconsistency where corresponding memory locations are being updated by multiple replica updates received and/or actioned out-of-order (e.g. in an order different to that in which they were issued/intended for transmission). This can establish a race condition or similar anomalous conditions. Such conditions can also arise in other computing, information processing, electronics, and electrical engineering situations. It is towards the detection and resolution of such an inconsistency or a race condition that the present invention is directed.

In accordance with a first aspect of the present invention there is disclosed a method of asynchronous transmission of data packets each forming part of a sequence of information and each intended to overwrite a previously transmitted packet of information, said method comprising the steps of:

(i) for each packet transmitting a data identifier, a data content and a packet count value, (ii) for each data packet, for each data identifier transmitted in sequence, incrementing said packet count value to indicate the position of said data packet in said sequence, (iii) on receipt of a data packet for any data identifier, overwriting the previously received data content with the currently received data content only if the currently received packet count value is greater than the previously received packet count value.

In accordance with a second aspect of the present invention there is disclosed a transmission system for asynchronous data packets each forming part of a sequence of information and each intended to overwrite a previously transmitted packet of information, and each packet comprising a data identifier, a data content and a packet count value, said system comprising a count valuer within a transmitter to determine the magnitude of the packet count value for each data packet, said count value indicating the position of said data packet in said sequence, and the or each receiver including a count comparison means to compare the currently received packet count value with the previously received packet count value and overwriting the previously received data content with the currently received data content only if the current received packet count exceeds the previously received packet count. Preferably the count comparison means is a comparator.

In accordance with a third aspect of the present invention there is disclosed a method of asynchronous transmission of data packets each forming part of a sequence of information and each intended to overwrite a previously transmitted packet of information, said method comprising the steps of:

(i) for each packet transmitting a data identifier, a data content, and a packet count value, and (ii) for each data packet, for each data identifier transmitted in sequence, incrementing said packet count value to indicate the position of said data packet in said sequence.

In accordance with a fourth aspect of the present invention there is disclosed a method of asynchronous reception of data packets each forming part of a sequence of information and each intended to overwrite a previously transmitted packet of information, said method comprising the steps of:

(i) receiving a data packet that includes a data identifier, a data content, and a packet count value, and (ii) in response to receipt of a data packet for any data identifier, overwriting a previously received data content with a currently received data content only if the currently received packet count value is greater than the previously received packet count value.

In accordance with a fifth aspect of the present invention there is disclosed a transmission system for asynchronous data packets each forming part of a sequence of information and each intended to overwrite a previously transmitted packet of information in an external receiver, and each packet comprising a data identifier, a data content and a packet count value, said system comprising a count valuer within a transmitter to determine the magnitude of the packet count value for each data packet, said count value indicating the position of said data packet in said sequence.

In accordance with a sixth aspect of the present invention there is disclosed a receiver system for asynchronous data packets each forming part of a sequence of information and each intended to overwrite a previously received packet of information stored in the receiver and sent by an external transmitter, and each packet comprising a data identifier, a data content and a packet count value, said system comprising a count valuer within the transmitter to determine the magnitude of the packet count value for each data packet, said count value indicating the position of said data packet in said sequence; and the receiver including a count comparison means to compare a currently received packet count value with a previously received packet count value and overwriting the previously received data content with the currently received data content only if the current received packet count exceeds the previously received packet count.

In accordance with a seventh aspect of the present invention there is disclosed a data packet signal structure comprising a data identifier, a data content, and a packet count value; the packet count value indicating the sequential position of said data packet in a sequence of separately transmitted data packet signals.

In accordance with an eighth aspect of the present invention there is disclosed a method of replica memory updating by a single computer in which a memory location having a specific location identifier and replicated on at least one other computer, is updated multiple times from a single source, said method comprising the steps of:

(i) utilizing an updating format for the signal or packet carrying out the updating, said format comprising the specific identifier of the memory location to be updated, the content with which said memory location is to be updated, and a resident updating count of the updating source, said count comprising a number indicative of the sequence of occasions on which the updating source has been updated inclusive of the current updating, (ii) storing for each replicated memory location the updating count of the previously sent or received updating, (iii) comparing the presently resident updating count associated with the replicated memory location to be updated with the updating count of any currently received updating signal or packet, and (iv) if the currently received updating count is greater than the presently resident updating count, not overwriting the associated replicated memory location with the currently received data content, and not overwriting the presently resident updating count with the currently received updating count, or (v) if the currently received updating count is less than the presently resident updating count, overwriting the associated replicated memory location with the currently received data content, and overwriting the presently resident updating count with the currently received updating count.

In accordance with a ninth aspect of the present invention there is disclosed a system for replica memory updating by a single computer, said system comprising at least one memory location having a specific location identifier and replicated on at least one other computer, and updated to remain substantially similar upon occasion of a computer modifying its replica value; a plurality of sources each of which can update said memory location(s) and each of which utilizes an updating format for the signal or packet carrying out the updating, said format comprising the specific identifier of the memory location to be updated, the content with which said memory location is to be updated, and a resident updating count of the updating source, said count comprising a number indicative of the sequence of occasions on which the updating source has been updated inclusive of the current updating; a storage means associated with each said memory location and in which the updating count of the previously received updating is stored; comparison means to compare the currently received updating count value with the corresponding presently resident updating count value and overwriting the associated replicated memory location with the currently received data content and overwriting the presently resident updating count with the currently received updating count, if the currently received updating count exceeds the presently resident updating count, or not overwriting the associated replicated memory location with the currently received data content and not overwriting the presently resident updating count with the currently received updating count, if the currently received updating count is less than the presently resident updating count. Preferably the count comparison means is a comparator.

BRIEF DESCRIPTION OF THE DRAWINGS

Preferred embodiments of the present invention will now be described with reference to the drawings in which:

FIG. 1A is a schematic illustration of a prior art computer arranged to operate JAVA code and thereby constitute a single JAVA virtual machine, FIG. 1B is a drawing similar to FIG. 1A but illustrating the initial loading of code, FIG. 1C illustrates the interconnection of a multiplicity of computers each being a JAVA virtual machine to form a multiple computer system, FIG. 2 schematically illustrates "n" application running computers to which at least one additional server machine X is connected as a server.

DETAILED DESCRIPTION

Figure 2:
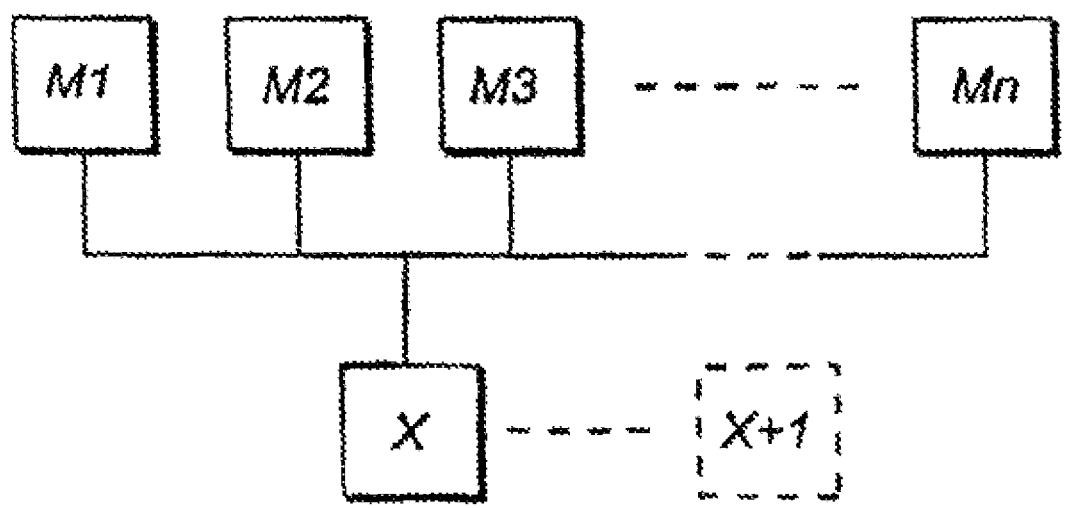

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

It is known in the prior art to provide a single computer or machine (produced by any one of various manufacturers and having an operating system operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine.

For further details, see "The JAVA Virtual Machine Specification" $2^{nd}$ Edition by T. Lindholm and F. Yellin of Sun Microsystems Inc of the USA which is incorporated herein by reference.

This conventional art arrangement of FIG. 1A is modified by the present applicant by the provision of an additional facility which is conveniently termed a "distributed run time" or a "distributed run time system" DRT 71 and as seen in FIG. 1B.

In FIGS. 1B and 1C, the application code 50 is loaded onto the Java Virtual Machine(s) M1, M2, . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. The runtime system typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2, . . . Mn. Moreover, the preferred distributed runtime 71 comes into operation during the loading procedure indicated by arrow 75A or 75B of the JAVA application 50 on each JAVA virtual machine 72 or machines JVM#1, JVM#2, . . . JVM#n of FIG. 1C. It will be appreciated in light of the description provided herein that although many examples and descriptions are provided relative to the JAVA language and JAVA virtual machines so that the reader may get the benefit of specific examples, there is no restriction to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 . . . Mn. However, the communications between each machine M1, M2 . . . Mn are as indicated by arrows 83, and although physically routed through the machine hardware, are advantageously controlled by the individual DRT's 71/1 . . . 71/n within each machine. Thus, in practice this may be conceptionalised as the DRT's 71/1, . . . 71/n communicating with each other via the network or other communications link 53 rather than the machines M1, M2 . . . Mn communicating directly themselves or with each other. Contemplated and included are either this direct communication between machines M1, M2 . . . Mn or DRT's 71/1, 71/2 . . . 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 . . . Mn. The application program 50 is written with the intention that it only operate on a single machine or computer. Essentially the modified structure is to replicate an identical memory structure and contents on each of the individual machines.

The term common application program is to be understood to mean an application program or application program code written to operate on a single machine, and loaded and/or executed in whole or in part on each one of the plurality of computers or machines M1, M2 . . . Mn, optionally on each one of some subset of the plurality of computers or machines M1, M2 . . . Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing the above arrangements may optionally be connected to or coupled with other computers, machines, information appliances, or the like that do not implement the above arrangements.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the code on each machine. Some dissimilarity between the programs may be permitted so long as the other requirements for interoperability, consistency, and coherency as described herein can be maintained. As it will become apparent hereafter, each of the machines M1, M2 . . . Mn and thus all of the machines M1, M2 . . . Mn have the same or substantially the same application code 50, usually with a modification that may be machine specific.

Before the loading of, or during the loading of, or at any time preceding the execution of, the application code 50 (or the relevant portion thereof) on each machine M1, M2 . . . Mn, each application code 50 is modified by a corresponding modifier 51 according to the same rules (or substantially the same rules since minor optimizing changes are permitted within each modifier 51/1, 51/2 . . . 51/n).

Each of the machines M1, M2 . . . Mn operates with the same (or substantially the same or similar) modifier 51 (in some embodiments implemented as a distributed run time or DRT71 and in other embodiments implemented as an adjunct to the code and data 50, and also able to be implemented within the JAVA virtual machine itself). Thus all of the machines M1, M2 . . . Mn have the same (or substantially the same or similar) modifier 51 for each modification required. A different modification, for example, may be required for memory management and replication, for initialization, for finalization, and/or for synchronization (though not all of these modification types may be required for all embodiments).

There are alternative implementations of the modifier 51 and the distributed run time 71. For example as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. Exactly how these functions or operations are implemented or divided between structural and/or procedural elements, or between computer program code or data structures, is not crucial.

However, in the arrangement illustrated in FIG. 1C, a plurality of individual computers or machines M1, M2 . . . Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including communications ports known or available as of the date of this application such as ETHERNET or INFINIBAND and extensions and improvements, thereto. Preferably the computers are provided with known communication ports (such as CISCO Power Connect 5224 Switches) which connect with the communications network 53.

As a consequence of the above described arrangement, if each of the machines M1, M2, . . . , Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, . . . , Mn are normally approximately equal but need not be.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple or dual core processor or machines manufactured by Intel, AMD, or others, or implemented on a single printed circuit board or even within a single chip or chip set.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the structure, method and computer program and computer program product are still applicable. Examples of computers and/or computing machines that do not utilize either classes and/or objects include for example, the x86 computer architecture manufactured by Intel Corporation others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

This analysis or scrutiny of the application code 50 can take place either prior to loading the application program code 50, or during the application program code 50 loading procedure, or even after the application program code 50 loading procedure. It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term "compilation" normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one arrangement, the analysis or scrutiny of the application code 50 takes place during the loading of the application program code such as by the operating system reading the application code 50 from the hard disk or other storage device or source and copying it into memory and preparing to begin execution of the application program code. In another arrangement, in a JAVA virtual machine, the analysis or scrutiny may take place during the class loading procedure of the java.lang.ClassLoader.loadClass method (e.g. "java.lang.ClassLoader.loadClass( )").

Alternatively, the analysis or scrutiny of the application code 50 may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code. All such modification routes are envisaged and also a combination of two, three or even more, of such routes.

The DRT or other code modifying means is responsible for creating or replication a memory structure and contents on each of the individual machines M1, M2 ... Mn that permits the plurality of machines to interoperate. In some arrangements this replicated memory structure will be identical. Whilst in other arrangements this memory structure will have portions that are identical and other portions that are not. In still other arrangements the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 ... Mn.

Therefore the terminology "one", "single", and "common" application code or program includes the situation where all machines M1, M2 ... Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine takes place via the network interconnecting the machines. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine. Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes.

The arrangement is transport, network, and communications path independent, and does not depend on how the communication between machines or DRTs takes place. Even electronic mail (email) exchanges between machines or DRTs may suffice for the communications.

Non-commercial operation of a prototype multiple computer system indicates that not every machine or computer in the system utilises or needs to refer to (eg have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

In connection with the above, it will be seen from FIG. 2 that there are a number of machines M1, M2, ... Mn, n being an integer greater than or equal to two, on which the application program 50 of FIG. 1 is being run substantially simultaneously, and there is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the above described arrangements, if desired. However this would result in generally undesirable complexity. If the machine X is not provided then its functions, such as housekeeping functions, are provided by one, or some, or all of the other machines.

Figure 3:
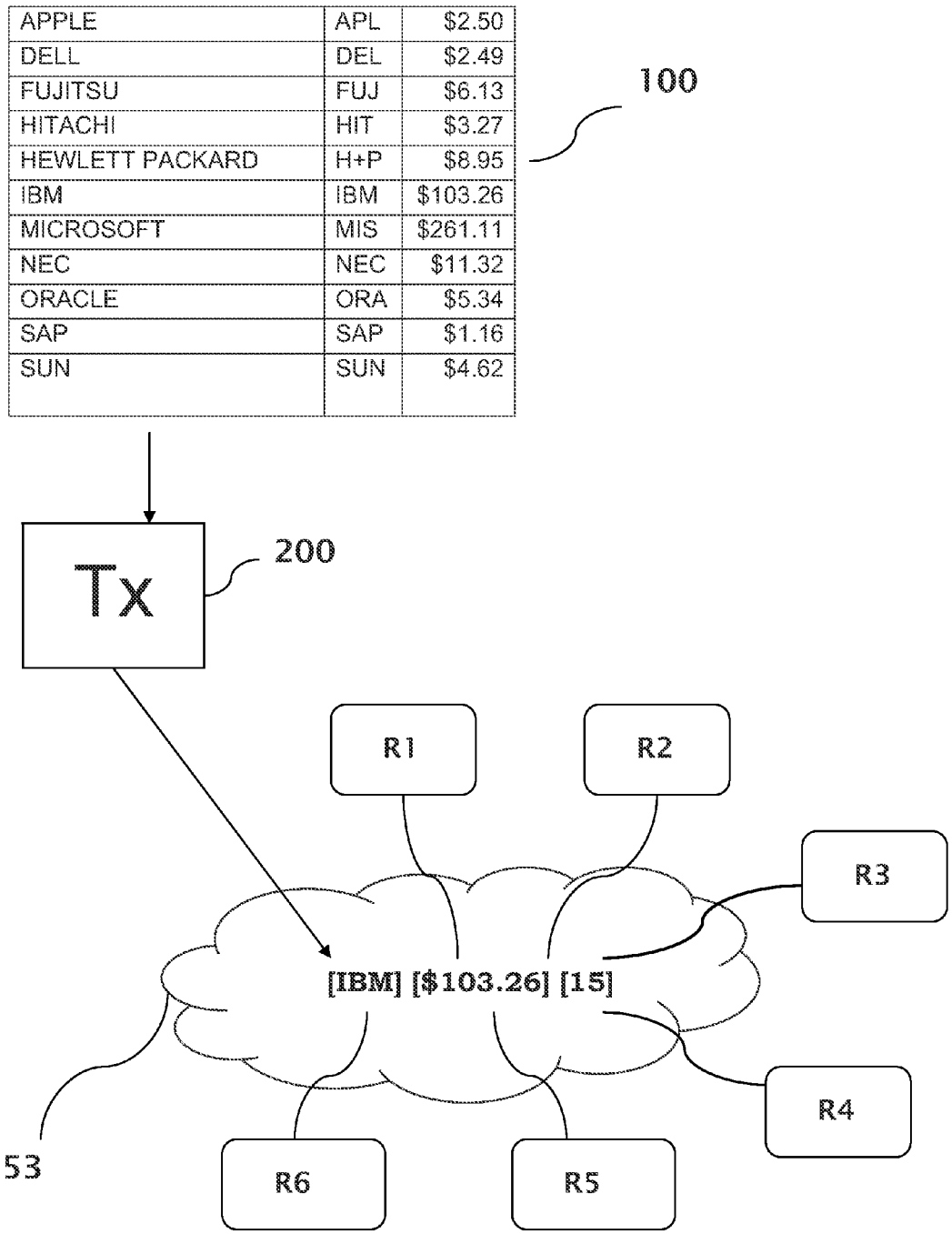
FIG. 3 is a schematic representation of stock exchange price transmission system in accordance with the preferred embodiment.

As seen in FIG. 3, a truncated portion of a stock exchange listing board is illustrated listing the names of eleven computing companies together with a three character abbreviation of the name and a current price which represents the last sale to be carried out at the stock exchange. The board 100 is connected to a transmitter 200 which transmits a stream of asynchronous data which corresponds to the sales which take place at the stock exchange. The transmission is said to be asynchronous in that the sales drive the transmissions, and if there are no sales, then there is no transmission since there is no data to be updated.

The transmitter 200 is connected to a plurality of receivers R1-R6 via means of a communication link or communications network 53 which can include the internet, Ethernets, and like digital communications links. Each packet of information transmitted takes the form of three parts. In this embodiment, the first part is a three character code indicating the identity of the stock in question, in the example of FIG. 3 the stock being IBM. The next part is the data which in this embodiment is the price of the last sale of the stock in question, which in the embodiment of FIG. 3 is $103.26. The third part is a packet count, which in the example of FIG. 3 is 15 which represents the $15^{th}$ sale of IBM stock since some predetermined time, for example the commencement of trading on a particular day.

At each of the receivers are R1-R6 is a digital computer, computing machine, information appliance, or like piece of equipment in which by means of a table, list, or other data structure claimed in memory and/or a display, a replica of the stock exchange board 1 is provided. The storage or presentation of the stock exchange board 100 may be altered to suit either the capabilities of the computer, computing machine, or information appliance and/or the preferences of the user of such device. In the table there is listed an address or identifier corresponding to each of the eleven stocks (in this example) and for each address there are two data storage facilities or storage elements, the first storing the price and the second storing the count value.

In the normal course of events, if the rate of sales is relatively slow and sales are distributed amongst many stocks, then each data packet transmitted by the transmitter 200 is received by each of the receivers R1-R6 in turn and so the message of FIG. 3 overwrites a previously transmitted message containing the same address identifier namely IBM, a previous price, and a previous count value, in this instance a previous count value of 14.

At each of the receivers, R1-R6 a comparison is made between the stored count value resulting from the previous transmission, and the count value of the just received data packet. Since in this example, a count value of 15 exceeds a count value of 14, the price of the last sale of the stock value $103.26 can be written over the previously transmitted value.

In the event that the pace of trading accelerates, it is possible depending upon the quality of the transmission system 53, for the sequence of transmitted packets for a particular stock to be received out of order by, for example, one or more of the individual receivers R1-R6. If, for example, the price of IBM stocks or shares has been steadily increasing during the day, then to display sale prices out of sequence would not convey the correct market information to the person subscribing to the transmission service. That is to say, if the prices were displayed in the order received, at some point a decrease in IBM stock would be displayed which would be contrary to the actual events happening at the stock exchange.

In order to prevent this problem arising, if the comparison carried out detects that the currently received packet count is less than the previously received packet count, then it discards the currently received data packet and does not cause the previously received data to be overwritten.

Figure 4:
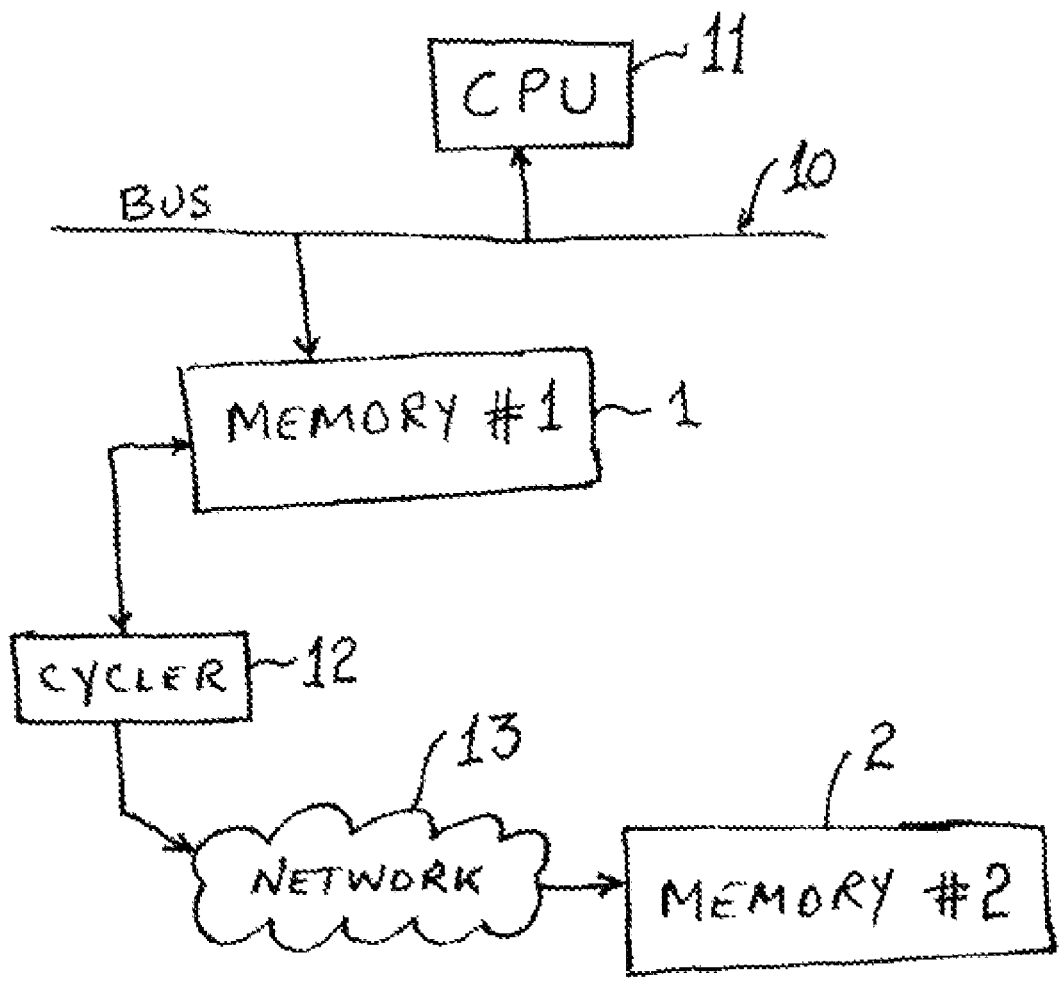
FIG. 4 is a schematic representation of a replicated memory arrangement.

Thus, in the event that receiver R3, for example, receives IBM sales data in the order of packet count 13, 15, 14, then the data packet having packet count 15 will successfully overwrite the content of the previously received price having a packet count of 13. However, when the message having the packet count 14 is received out of order, the comparison indicates that the currently received packet count 14 is less than the previously received packet count 15 and thus the late received data packet having packet count 14 is discarded Turning now to FIG. 4, a replicated memory scheme for a computer is illustrated. Here two memory devices 1 and 2 are provided. The first memory device 1 is an active memory device and is connected via the bus 10 to the central processing unit (CPU) 11 of the computer. As an alternative to the bus 10, the CPU 11 and memory 1 can be connected via another link such as a communications network.

The second memory device 2 is a passive memory store. A cycler 12 is connected to the first memory device 1 directly and to the second memory device 2 via a communications network 13. The function of the cycler 12 is to sequentially step through each of the memory locations of the first memory device and transmit the current contents thereof to the second memory device 2 to provide a back-up copy. However, the cycler 12 need not operate sequentially nor need it necessarily interrogate all memory locations. The cycler 12 can operate on a data queue, for example.

The same considerations as to later transmitted memory contents overwriting early transmitted memory contents as for FIG. 3 apply. So too does the discarding of any early transmitted but later received memory contents which may have been delayed by the latency or ordering of the network 13, for example. Thus the same data transmission protocol as used in FIG. 3 can be used in the arrangement of FIG. 4.

It will be apparent to those skilled in the art that the concept of incrementing the packet count and discarding any message with a lower packet count is entirely arbitrary and therefore, if desired, the packet count can be decremented for successive data packets. Naturally, in this situation data packets are discarded if the currently received packet count is greater than the previously received packet count (not less than as is the case for packet count incrementations).

It will be appreciated in light of the description provide herein that the components and method steps on the transmitter side may be separated from the components and method steps on the receiver side, and that embodiments of the invention may be directed separately to the transmitter side, and/or to the receiver side, and/or to a combination of the transmitter and receiver sides without limitation.

Figure 26:
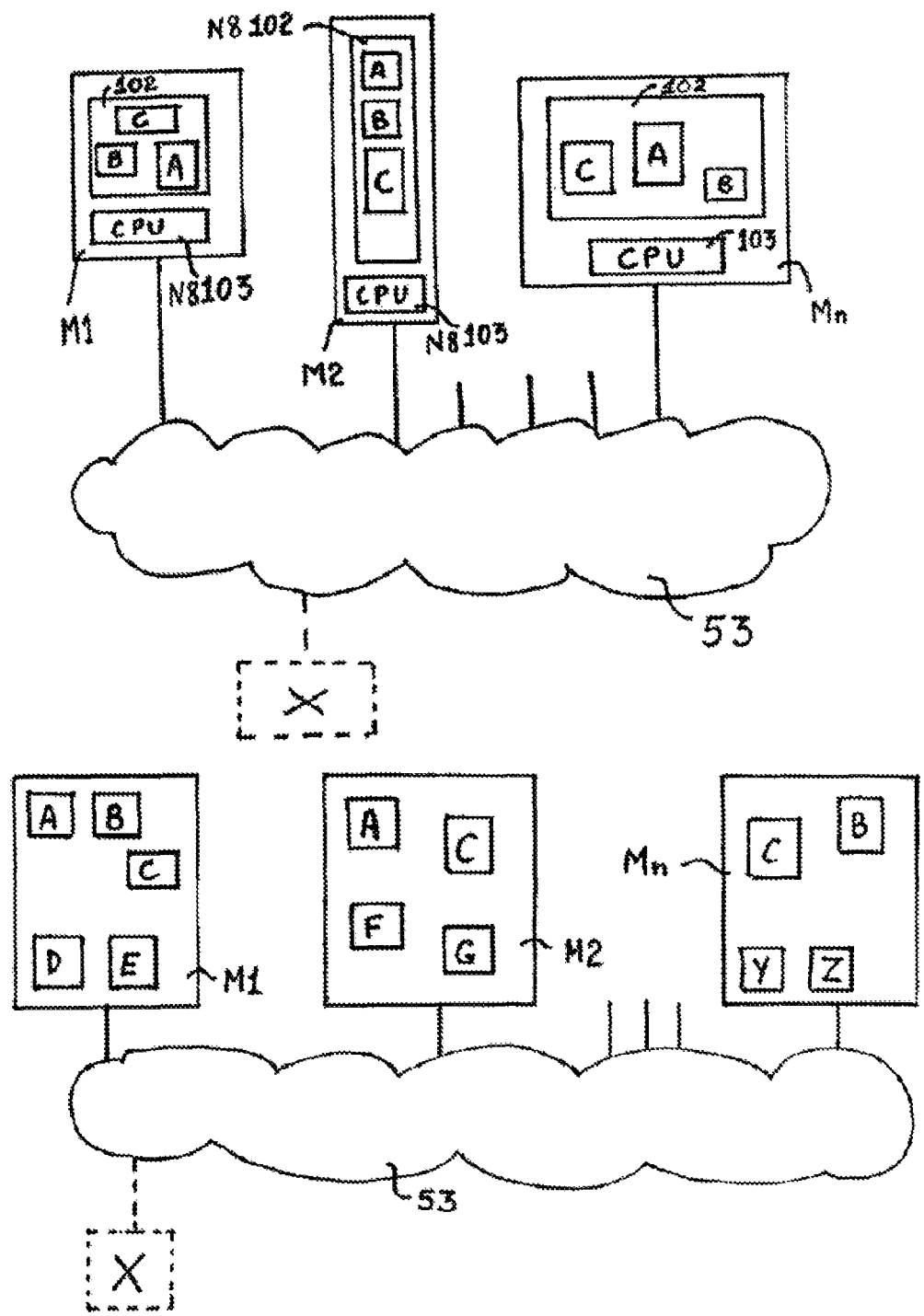
FIGS. 26, 27 and 28 illustrate two arrangements of replicated shared memory multiple computer systems.

FIG. 26 is a schematic diagram of a replicated shared memory system. In FIG. 26 three machines are shown, of a total of "n" machines (n being an integer greater than one) that is machines M1, M2, . . . Mn. Additionally, a communications network 53 is shown interconnecting the three machines and a preferable (but optional) server machine X which can also be provided and which is indicated by broken lines. In each of the individual machines, there exists a memory N8102 and a CPU N8103. In each memory N8102 there exists three memory locations, a memory location A, a memory location B, and a memory location C. Each of these three memory locations is replicated in a memory N8102 of each machine.

This arrangement of the replicated shared memory system allows a single application program written for, and intended to be run on, a single machine, to be substantially simultaneously executed on a plurality of machines, each with independent local memories, accessible only by the corresponding portion of the application program executing on that machine, and interconnected via the network 53. In International Patent Application No. PCT/AU2005/001641 (WO2006/110,937) to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 (WO2006/110,957) in the name of the present applicant, a technique is disclosed to detect modifications or manipulations made to a replicated memory location, such as a write to a replicated memory location A by machine M1 and correspondingly propagate this changed value written by machine M1 to the other machines M2 . . .

Mn which each have a local replica of memory location A. This result is achieved by of detecting write instructions in the executable object code of the application to be run that write to a replicated memory location, such as memory location A, and modifying the executable object code of the application program, at the point corresponding to each such detected write operation, such that new instructions are inserted to additionally record, mark, tag, or by some such other recording means indicate that the value of the written memory location has changed.

Figure 27:
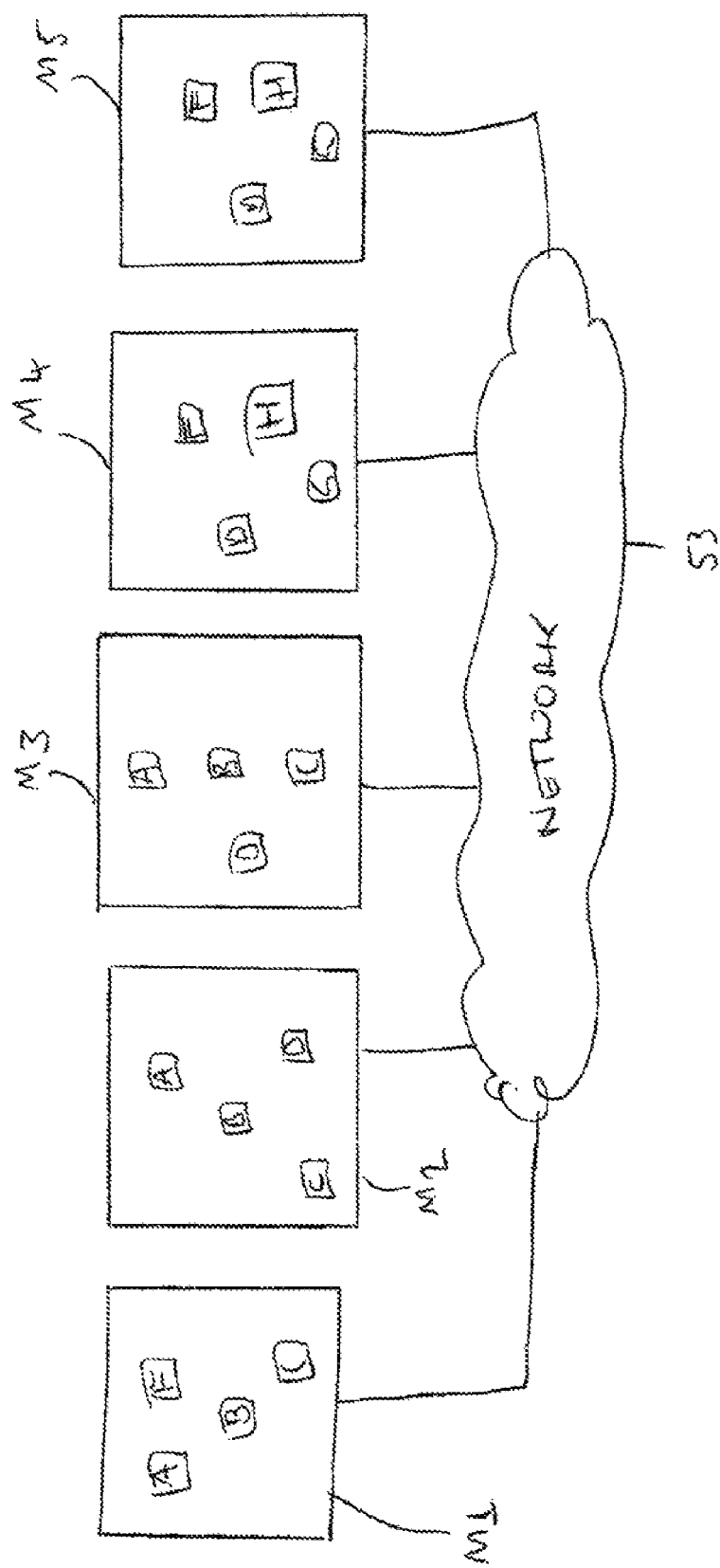

An alternative arrangement is that illustrated in FIG. 27 and termed partial or hybrid replicated shared memory (RSM). Here memory location A is replicated on computers or machines M1 and M2, memory location B is replicated on machines M1 and Mn, and memory location C is replicated on machines M1, M2 and Mn. However, the memory locations D and E are present only on machine M1, the memory locations F and G are present only on machine M2, and the memory locations Y and Z are present only on machine Mn. Such an arrangement is disclosed in International Patent Application No. PCT/AU2006/001447 published under WO 2007/041762 (and to which U.S. patent application Ser. No. 11/583, 958. In such a partial or hybrid RSM systems changes made by one computer to memory locations which are not replicated on any other computer do not need to be updated at all. Furthermore, a change made by any one computer to a memory location which is only replicated on some computers of the multiple computer system need only be propagated or updated to those some computers (and not to all other computers).

Consequently, for both RSM and partial RSM, a background thread task or process is able to, at a later stage, propagate the changed value to the other machines which also replicate the written to memory location, such that subject to an update and propagation delay, the memory contents of the written to memory location on all of the machines on which a replica exists, are substantially identical. Various other alternative embodiments are also disclosed in the abovementioned specification. Whilst the above methods are adequate for application programs which write infrequently to replicated memory locations, the method is prone to inherent inefficiencies in those application programs which write frequently to replicated memory locations.

All described embodiments and arrangements of the present invention are equally applicable to replicated shared memory systems, whether partially replicated or not. Specifically, partially replicated shared memory arrangements where some plurality of memory locations are replicated on some subset of the total machines operating in the replicated shared memory arrangement, themselves may constitute a replicated shared memory arrangement for the purposes of this invention.

Figure 5:
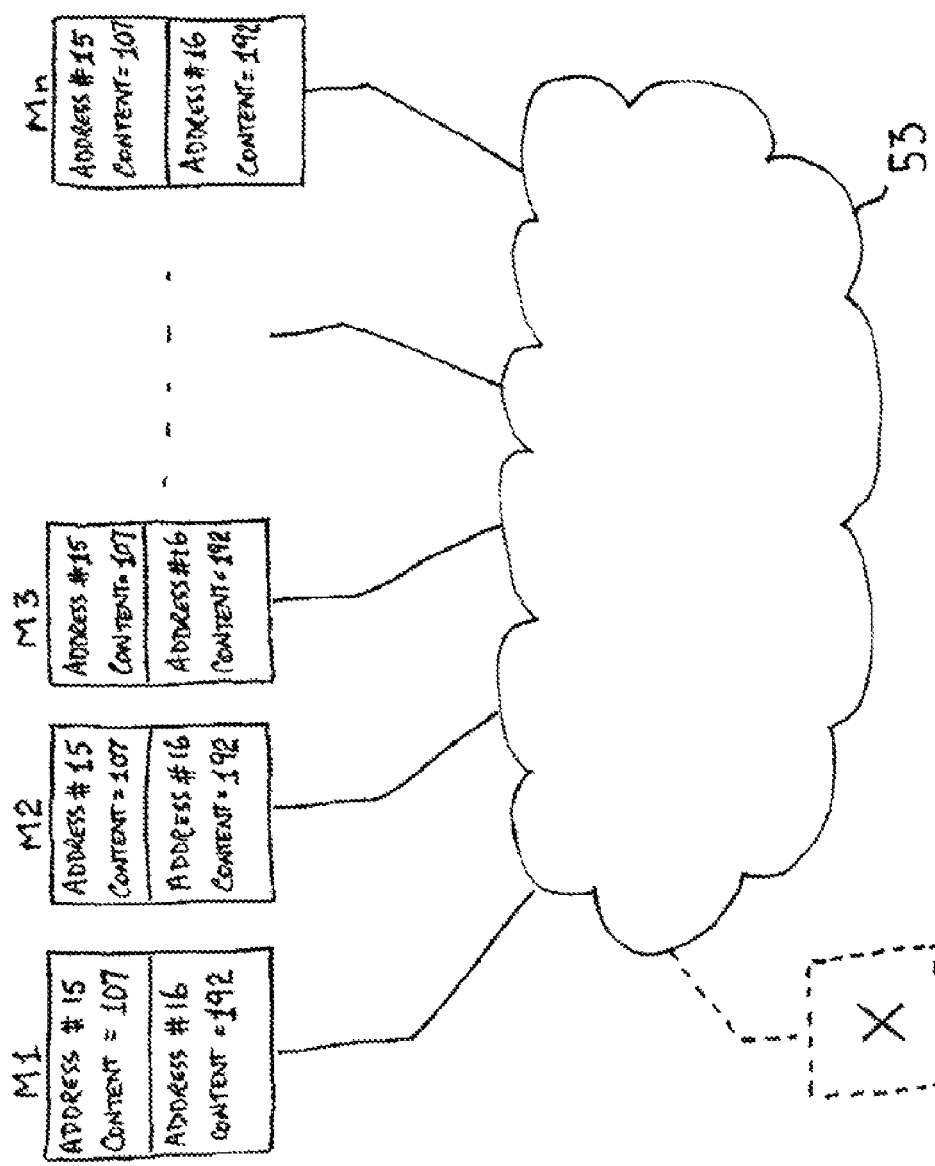
FIGS. 5, 6 and 7 illustrate the steps of in due course updating memory locations.

In FIG. 5 a number, "n", of application running computers or machines M1, M2, M3 . . . Mn are provided and, if desired, a server machine X can also be provided. Since the server machine is not essential it is indicated in phantom in FIG. 5. All the machines M1-Mn, and X if present, are interconnected in some fashion, preferably via a commodity communications network 53. In each of the application running machines, there are replicated memory locations which, for the sake of this discussion, will be restricted to two in number and which have addresses/identifiers of #15 and #16 respectively (but which need not be sequential). Each replicated memory location has a content or value which in some instances can include code but again for the purposes of this discussion will be deemed to constitute merely a number having a numerical value. The content of replica memory location/address #15 is the value (number) 107 and the content of replica memory location/address #16 is the value (number) 192. Each of the n application running machines has the two replicated memory locations and each replica memory location in each machine has substantially the same content or number.

Turning now to FIG. [ ]6, the situation which arises when a change in the content of a specific replicated memory location of one of the machines occurs, is explained. For the purposes of this description, it is assumed that machine M1 in executing its portion of the application program 50, carries out a memory write which results in the content of replica memory location/address #15 of machine M1 being changed from the value (number) 107 to the value (number) 211. This change is then notified (updated) to all other machines M2, M3 . . . Mn via the network 53, such as in accordance with the above mentioned specifications and/or description for updating of replicated memory locations. This is schematically illustrated in FIG. [ ]6 by the sending of an update notification from machine M1 to all the other machines on which a corresponding replica memory location resides, of the identity or address of the modified replica memory location with the changed content, and also the new changed content. This message is schematically illustrated as message 61 in FIG. [ ]6.

Figure 7:
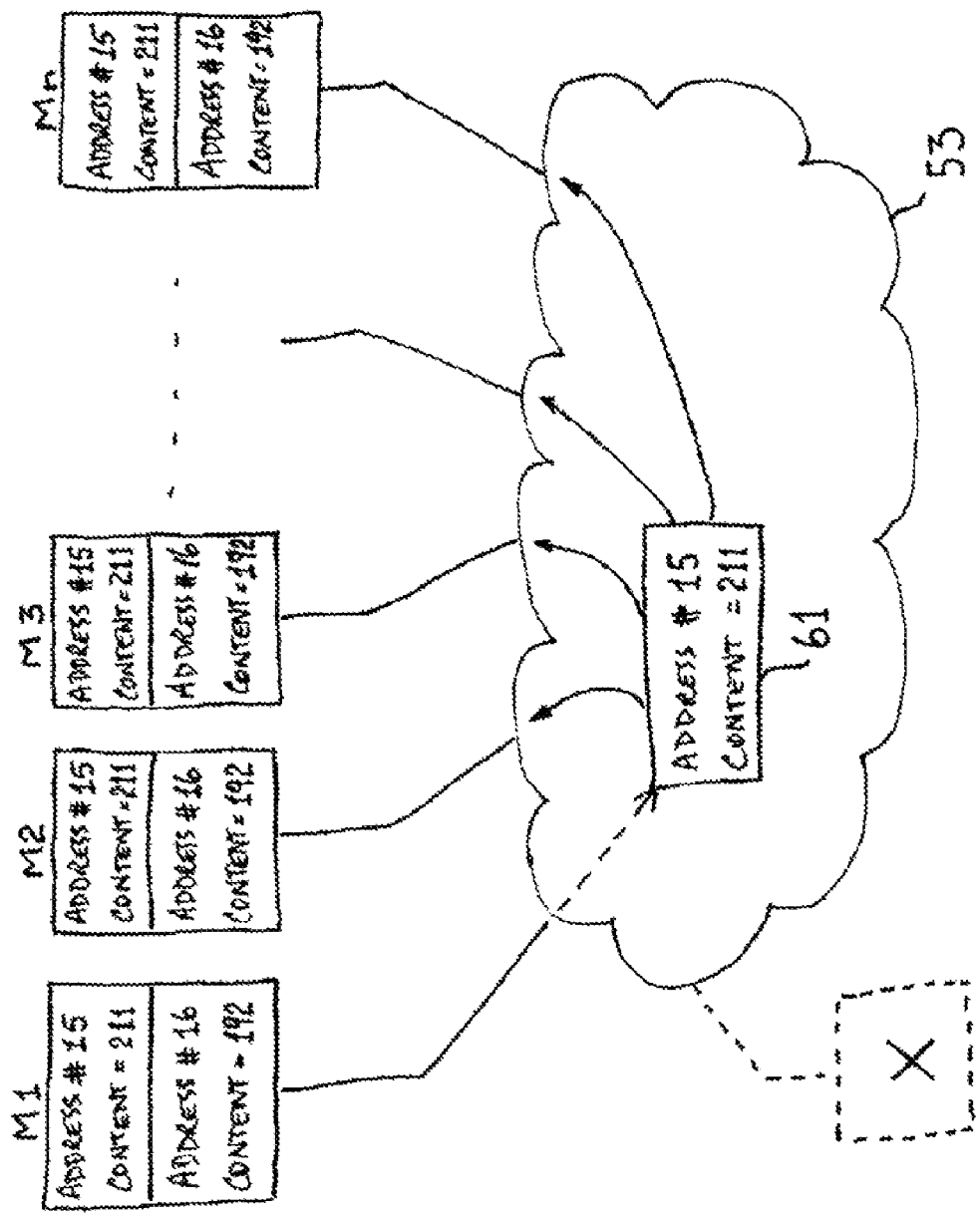

In FIG. 7, the message 61 from machine M1 of FIG. [ ]6 has passed through the network 53 and been received by each of the other machines M2, M3 . . . Mn, which on receipt of the message 61 utilize an overwrite means or arrangement to store the changed content 211 in the local replica memory location corresponding to address #15. In this connection it should be understood that the actual address in each of the machines M1-Mn may be different from each other machine but that each of the replica memory locations has a substantially similar global identifier or global address. Preferably, the local memory address and the global memory identifier/address are recorded or tabulated either in tables maintained by each of the machines M1-Mn, or in the server machine X. In FIG. 7, the updating has been successfully carried out and all machines M2, M3 . . . Mn have been consistently updated to take into account the change brought about by (and within) machine M1.

Figure 6:
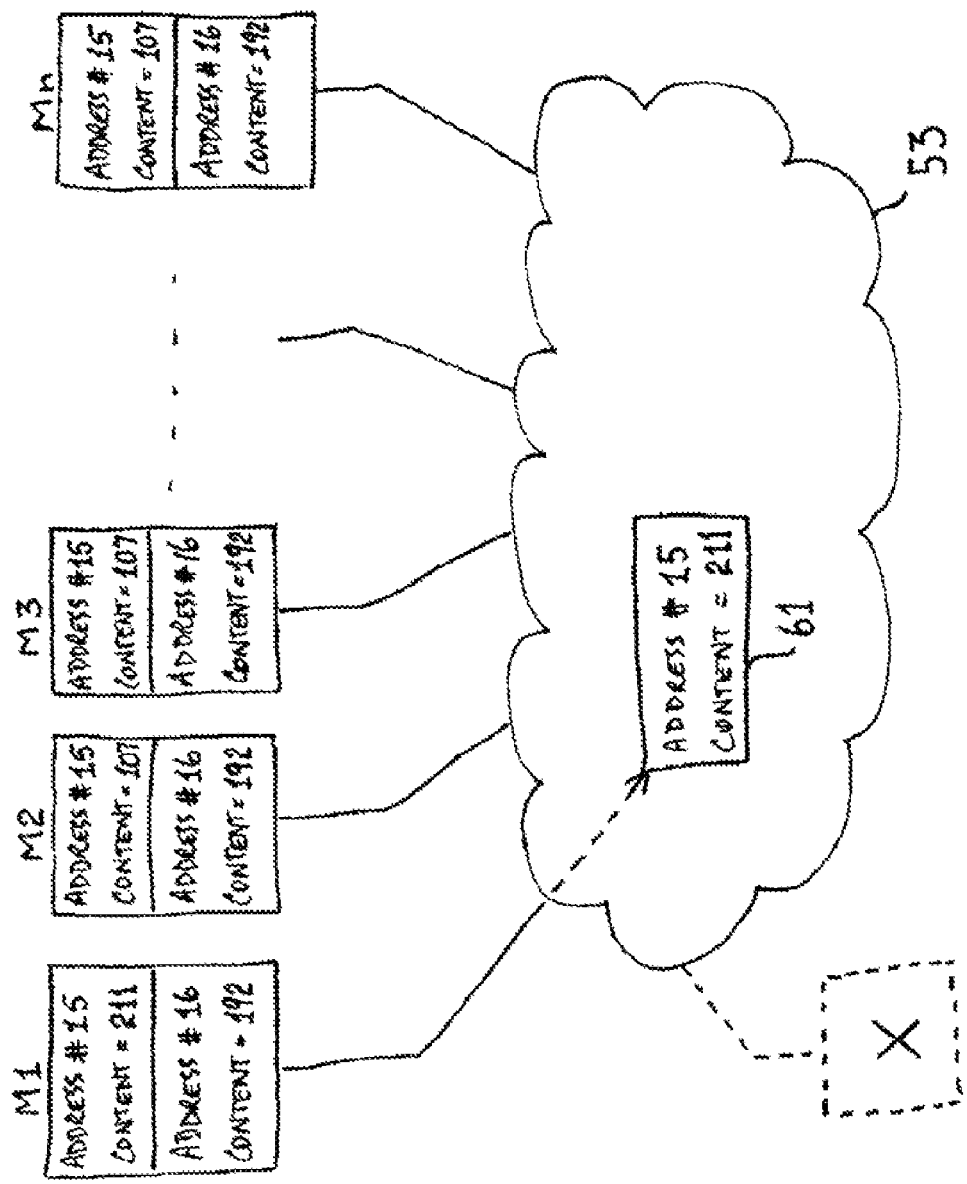
Figure 19:
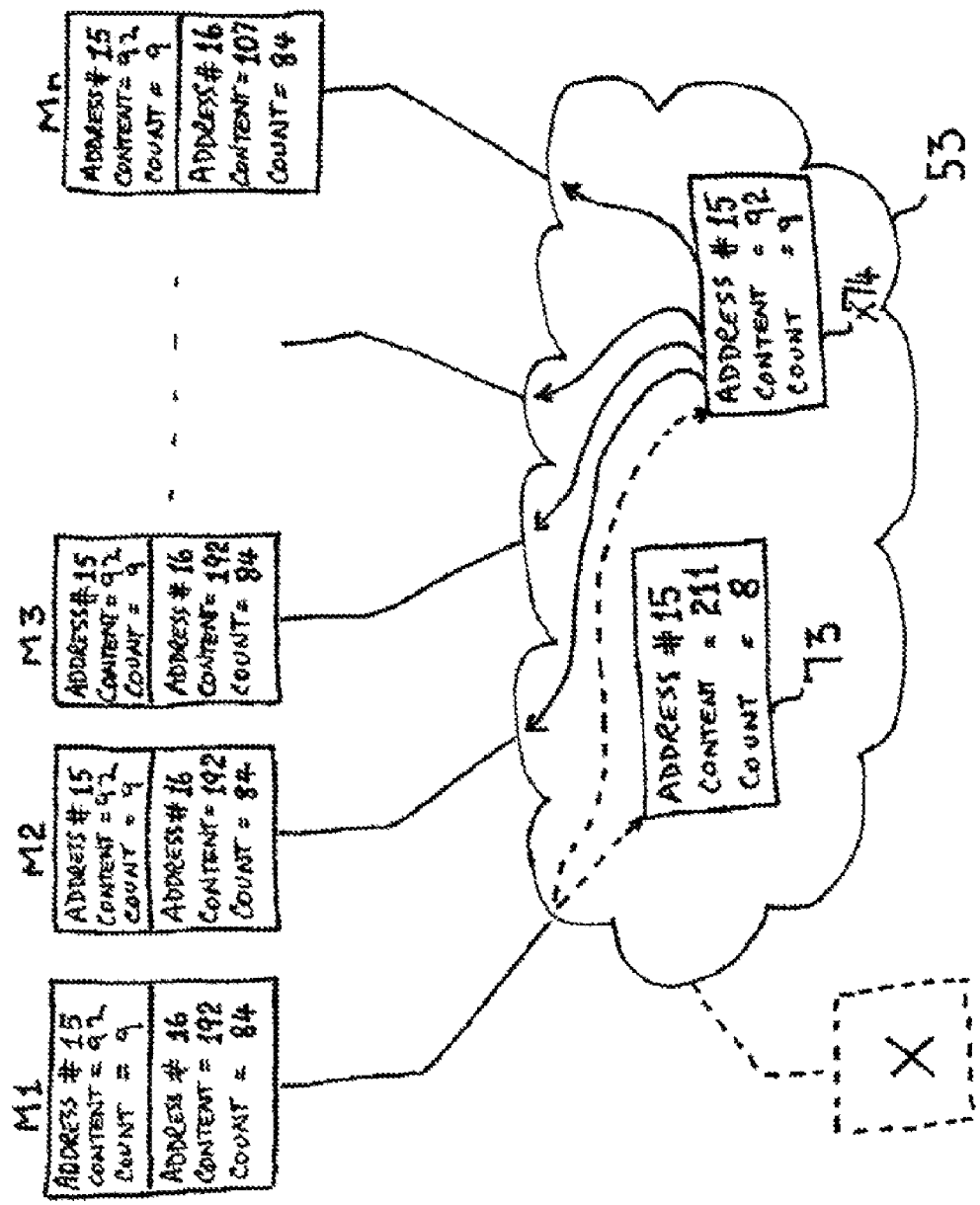
FIGS. 19, 20, 21, 22, 23 and 24 illustrate various time graphs of replica update transmissions.

Turning now to FIG. 19, the example of FIGS. 6-7 is collectively illustrated in a time-diagram. Here, machine M1 transmits replica memory update N101 (which corresponds to replica update 61 of FIGS. 6 and 7) at time-unit 1, with the updated value "211" of address #15, to machines M2, M3 . . . Mn on which corresponding replica memory locations reside. However, as is indicated in FIG. 19, transmission N101 does not arrive at the receiving machines M2-Mn immediately (that is, at the same time-unit 1 of transmission). Instead, each receiving machine is indicated to receive replica update transmission N101 at time-unit 5 by the arrows shown for each machine M2-Mn.

Thus, FIG. 19 illustrates a time-delay that typically results between transmission and receipt of a replica memory update, due to latency and delay of the communications network used to interconnect and transmit the replica memory updates between the multiple computers of the multiple computer system. This period of delay, N101, represents the "transmission latency/delay" between the sending of replica update transmission N101 by machine M1, and the receipt of the same replica update transmission N101 by machines M2-Mn.

Following transmission N101 at time-unit 1, at time-unit 5 the receiving machines M2, M3 . . . Mn each independently receive the transmission N101, and update their local corresponding replica memory locations of address #15 with the received updated replica value "211" of transmission N101.

Thus in the circumstances where only a single update at a time is transmitted of a replica memory address(es)/location(s) with changed value(s) or content, then no conflict or inconsistency arises (or will arise) between the values of the replicated memory locations on all the machines M1, M2, M3 . . . Mn.

Figure 20:
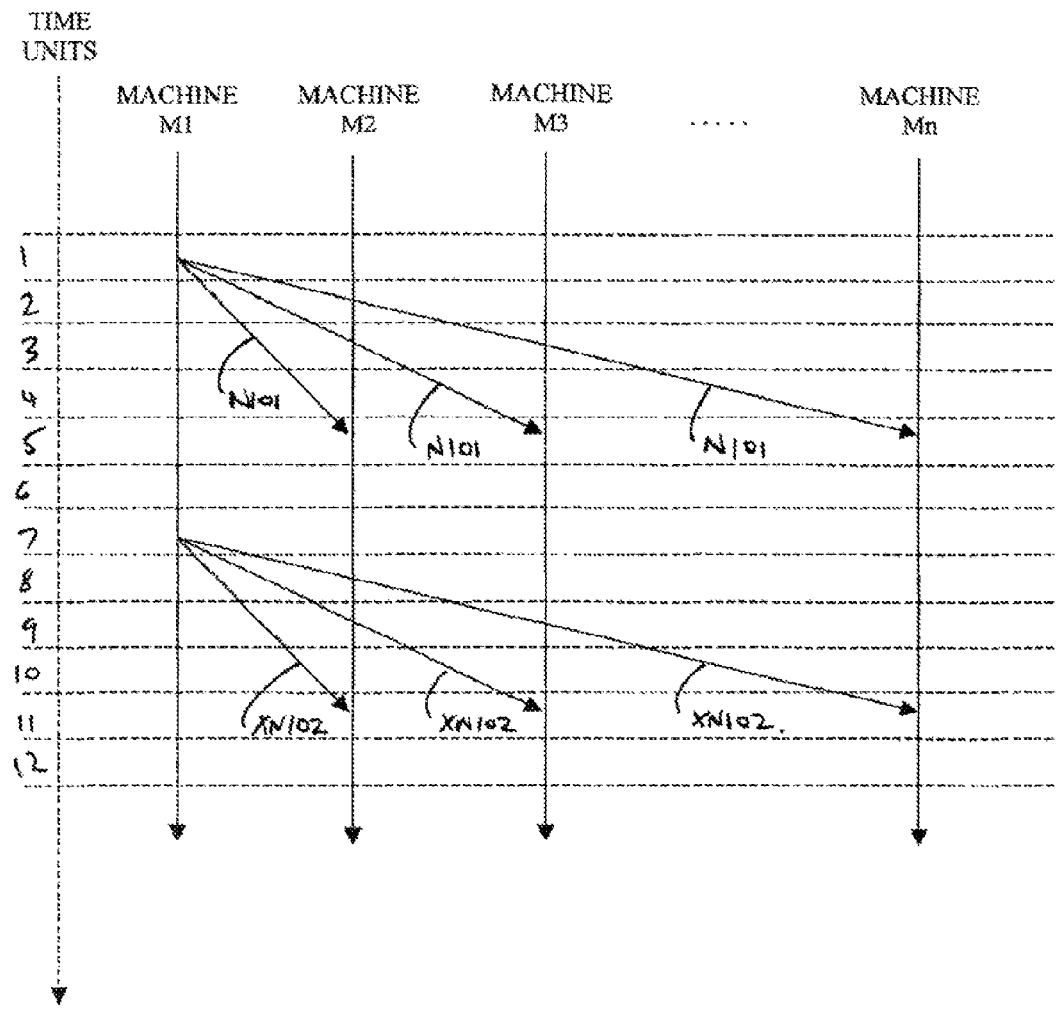

For example, consider FIG. 20. FIG. 20 follows on from FIG. 19, where at time-unit 7, and following receipt of transmission N101, machine M1 transmits a second replica memory update XN102, with the updated value "999" of address #15, to machines M2, M3, M4 . . . Mn. As all machines M2-Mn are indicated to have received transmission N101 prior to transmission XN102, then no potential inconsistency or conflict will arise between transmissions N101 and XN102 (such as for example transmission XN201 being received and/or actioned before transmission N101). Thus, consistent and coherent updating of replicated memory locations is preserved in cases where only a single replica memory update transmission is sent at a time to update corresponding replica memory locations of other machines.

Figure 8:
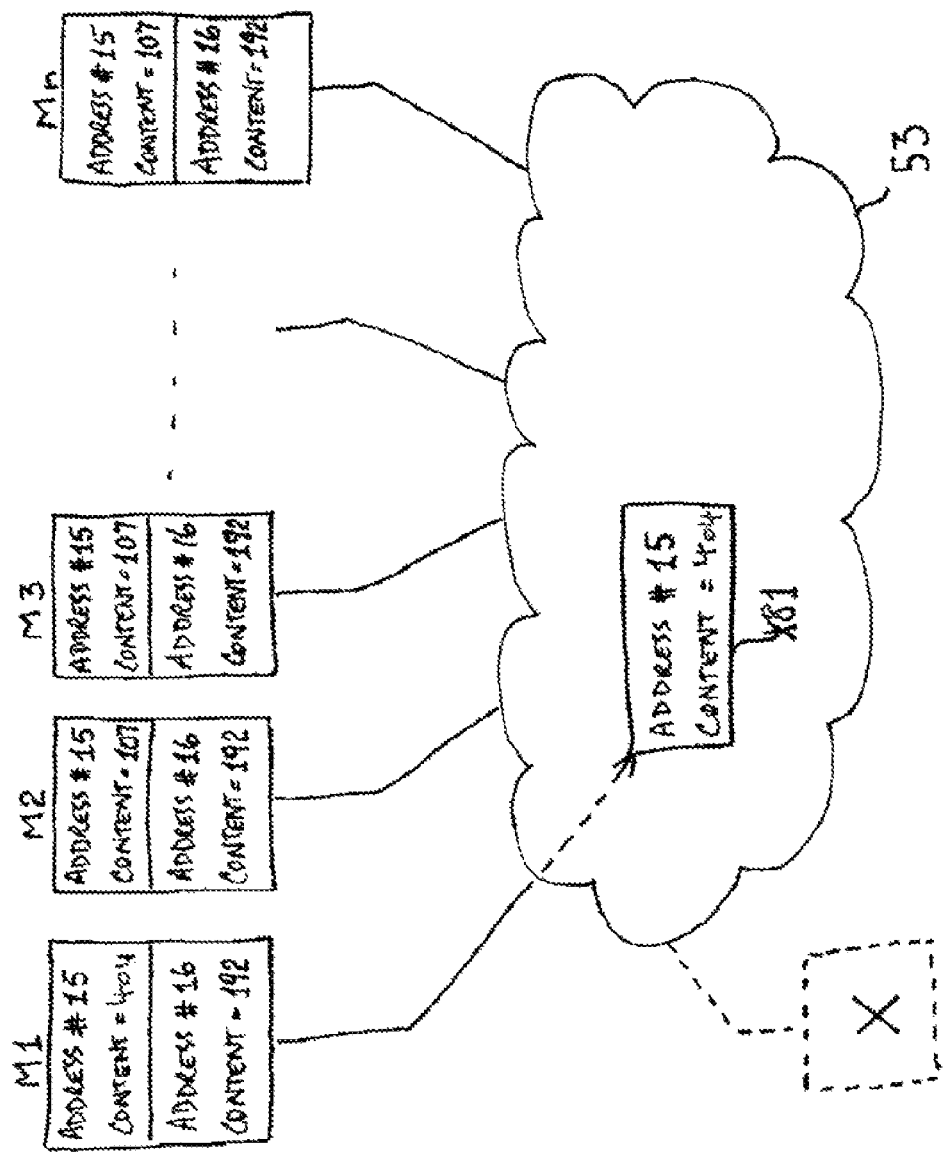
FIGS. 8, 9, 10 and 11 illustrate the stages by which contention/inconsistency can occur.
Figure 9:
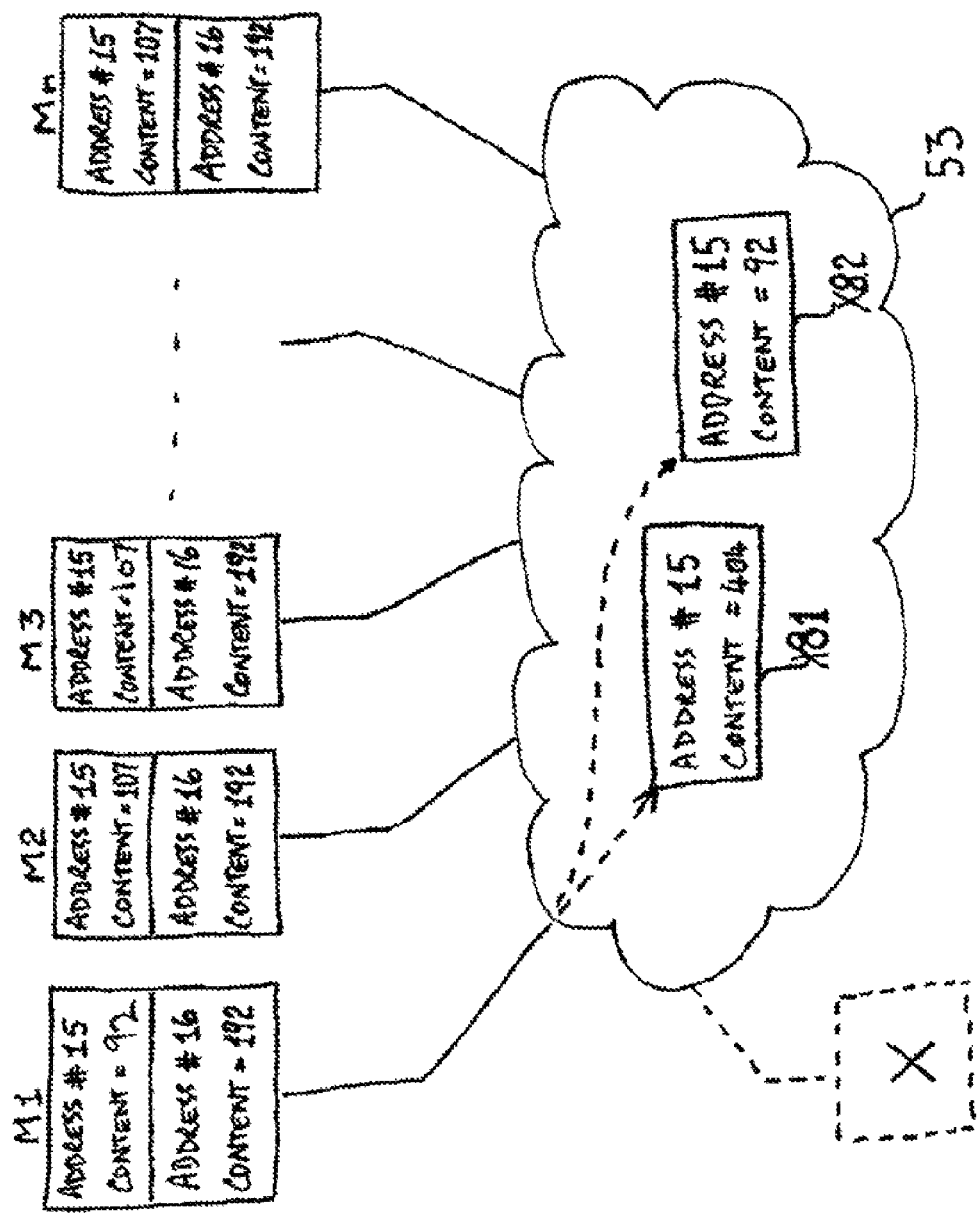

However, it is possible for the content of a single replica memory location/address, say address #15, to be modified (written-to) multiple times by a single machine (for example where such multiple writes take place quickly or frequently or in close intervals but not necessarily in immediate succession), causing to be sent more than one replica update transmission for such multiply written-to replicated memory location (e.g. such multiple transmissions comprising different values of the multiple values written-to such replicated memory location). In the example to be described hereafter the first new content of replica memory location/address #15 written by machine M1 is the value/number 404, and the second new content of the same replica memory location/address #15 of machine M1 is the value/number 92. As a consequence of machine M1's execution of the application program 50, the first value "404" is written to replicated memory location/address #15 and a short time later (for example, 1 millisecond) the second value "92" is written to the same replicated memory location/address #15. Machine M1 after modifying the replica memory location/address #15 for the first time, sends a first update notification/transmission X81 comprising the first written value of "404" to all the other machines via the network 53, followed shortly after (for example, 1 millisecond later) by a second update notification/transmission X82 comprising the second (and last/latest) written value "92" to all the other machines via the network 53. These two update notifications are intended to update the corresponding replica memory locations of all other machines in the manner indicated in FIGS. 8 and 9, where update X81 comprises the first value written to replicated memory location/address #15, and update X82 comprises the last value (e.g, the latest value) written to replicated memory location/address #15.

Figure 10:
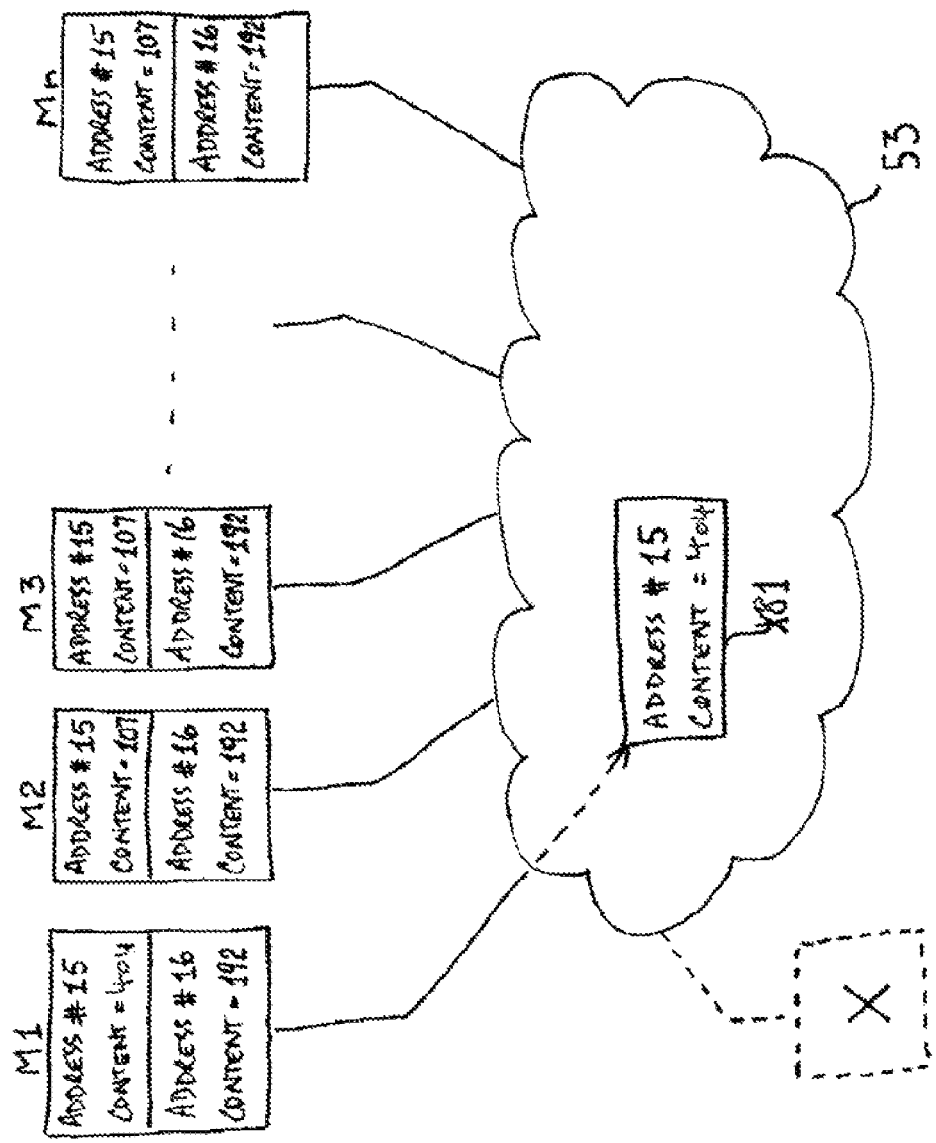

In FIG. 10 is indicated the case where replica update transmission X82, though sent by machine M1 later than (e.g. after) replica update transmission X81, is received by machines M2-Mn ahead of replica update transmission X81. Such a case as this may arise where and/or when the communications network 53 interconnecting the plural machines M1-Mn is not an ordered-delivery network, or does not ensure/guarantee the ordered-delivery of transmissions—that is, does not ensure/guarantee the delivery of transmissions (for example, packets, cells, frames, messages, and the like) in a same or identical order to that in which they were sent. Consequently, for such networks 53 which are not ordered-delivery networks, or for which ordered-delivery of transmissions (such as of packets, cells, frames, messages, and the like) is not ensured/guaranteed, then the case of FIG. 10 is possible where a later sent replica update transmission X82 is received ahead of the earlier sent replica update transmission X81.

Also, such case indicated in FIG. 10 where replica update transmission X82 is indicated to be received and actioned ahead of replica update transmission X81, may arise due to un-ordered processing of received packets by receiving machines. For example, it is known in the prior art that it is possible for receiving machines to process and action received packets in an order which is different to the order in which they were received from the network 53. The consequence of such "out-of-order" processing/actioning of received packets by receiving machines, may also cause the situation illustrated in FIG. 10, where replica update transmission X82 is indicated to have been received and processed/actioned resulting in the updating of local corresponding replica memory locations/addresses #15 with value "92", ahead of the receipt and similar processing/actioning of replica update transmission X81.

Similarly, such case indicated in FIG. 10 where replica update transmission X82 is indicated to be received and actioned ahead of replica update transmission X81, may arise due to un-ordered transmission of packets awaiting transmission by a sending machine.

Finally, any combination of the above "out-of-order" and/or un-ordered transmission and/or receipt of replica update transmissions, may cause or result in the situation illustrated in FIG. 10. Ultimately, regardless of whatever the cause of the later sent replica update transmission X82 being received and processed/actioned (that is, causing the local corresponding replica memory location/address #15 of each receiving machine to be updated with the value "92") ahead of the earlier sent replica update transmission X81, is not important in the consideration of FIGS. 10 and 11.

Thus, in FIG. 10, machine M1 has transmitted in order a first replica memory update X81 comprising the first changed (written) content/value of replica memory location/address #15 (that is, value/number 404), and a second replica update transmission X82 comprising the second changed (written) content/value of replica memory location/address #15 (that is, value/number 92).

However, as indicated in FIG. 10, machines M2-Mn each receive replica update message/transmission X82 from machine M1 ahead of replica update transmission X81. Therefore in accordance with the replica updating method of FIG. 7, each receiving machine updates its value/content of replica memory location/address #15 with the received updated value/number 92 of replica update transmission X82.

Figure 11:
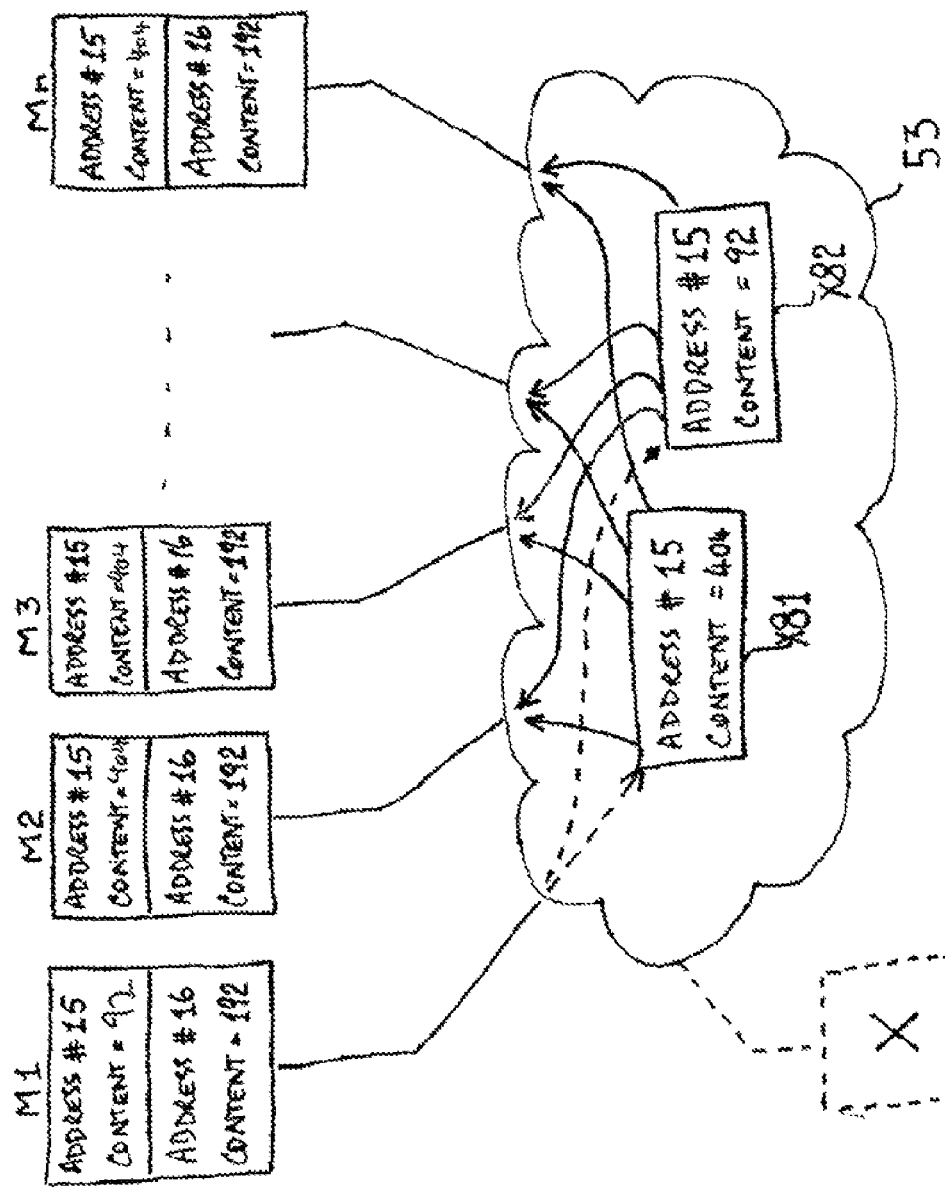

Turning next to FIG. 11, the receipt and processing/actioning of replica update transmission X81 is indicated. Specifically, following receipt and processing/actioning of replica update transmission X82 by machines M2-Mn in Fig. X7A, in FIG. 11 machines M2-Mn receive the earlier sent replica update transmission X81 and proceed to process/actioning replica update transmission X81 accordingly. FIG. 11 indicates the result of the receipt and processing/actioning of replica update transmission X81 after the receipt and processing/actioning of replica update transmission X82 of FIG. 10. In particular, as indicated in FIG. 11, the value/content "92" of the local corresponding replica memory location/address #15 of machines M2-Mn is replaced with the received value "404" of replica update transmission X81.

However also indicated in FIG. 11, is the value/content of replica memory location/address #15 of machine M1 which was the transmitting machine of replica update transmissions X81 and X82. Specifically, the value/content of replica memory location/address #15 of machine M1 is "92" corresponding to the last/latest value written-to address #15 and transmitted by machine M1, whilst the value/content of address #15 of machines M2-Mn is "404" corresponding to the last received replica update transmission of each machine (which was transmission X81).

Clearly, the consequence of the circumstances described above in relation to FIGS. 10 and 11 is that the memory values/contents for the corresponding replica memory locations/addresses #15 of the plural machines M1-Mn are no longer consistent. Specifically, machine M1 has the last written value "92" for replica memory location/address #15 and to which transmission X82 corresponds, whilst the remaining machines M2-Mn each independently have the value "404" for the same corresponding replica memory locations/addresses. Clearly, such a situation of different and/or inconsistent values for same corresponding replica memory locations is undesirable and will or may result in inconsistent and/or undesirable behaviour of the application program and/or between the plural machines M1-Mn. It follows that in circumstances where multiple updating messages for a same replicated memory location are sent/issued by one or more sending machines, but for which it is not guaranteed or able to be guaranteed that such multiple transmission will be received and processed/actioned by all receiving machines in order of transmission (such as may be caused for example by a communication network 53 which does not ensure/guarantee ordered delivery of transmissions/packets/frames/cells/messages/etc to all receiving machines, or a receiving machine which does not ensure/guarantee processing/actioning of received transmissions in the order in which they were received, or a sending machine(s) which does not ensure/guarantee transmission of messages/etc in the order in which they were issued/intended for transmission), then it is not possible to guarantee that the replicated memory locations on all of the machines M1, M2 . . . Mn will be updated in a consistent and coherent manner, and consequently that inconsistent contents or values for a same replicated memory location(s) may result between receiving and/or sending machines. Therefore the desirable behaviour of consistently updated replicated memory locations of plural machines, and the desirable state of consistent replicated memory locations of plural machines, is not achieved and/or is not guaranteed to be achieved.

Figure 21:
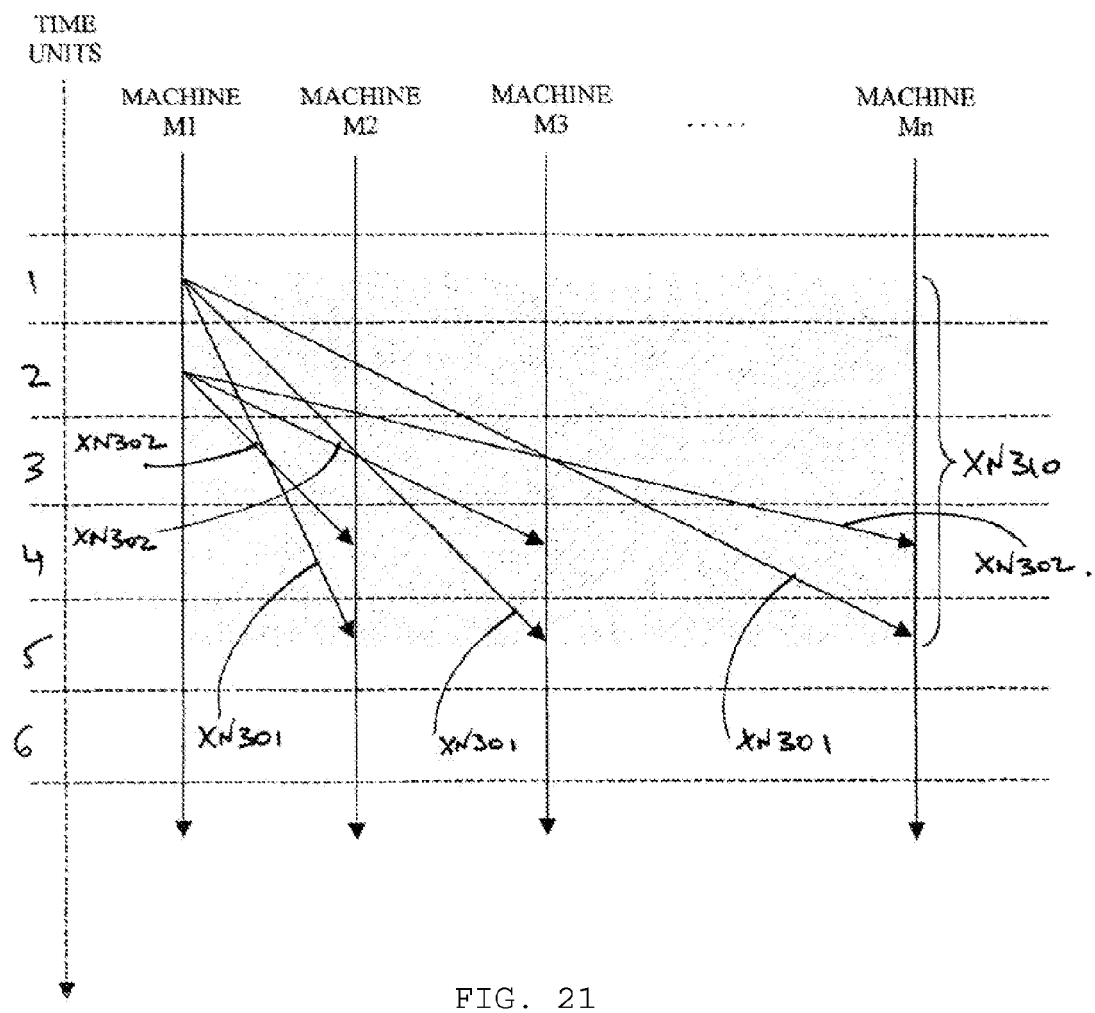

It will be apparent that such contention/inconsistency arises because of differences in timing caused by latency/delay and/or ordering of network transmissions. FIG. 21 illustrates how such latency/delay of network transmissions can cause the "contention/inconsistency" case of FIGS. 8, 9, 10 and 11.

Turning thus to FIG. 21, the example of FIGS. 8, 90 10 and 11 is collectively illustrated in a time-diagram. Here, at time-unit 1, machine M1 transmits replica memory update XN301 (which corresponds to replica update X81 of FIG. 8, X6B, X7A, and X7B), with the updated value "404" of address #15, to machines M2, M3 . . . Mn on which corresponding replica memory locations reside. A short time later (time unit 2), the second replica update transmission XN302 (which corresponds to replica update X82 of FIGS. 9, 10 and 11), comprising a further updated value "92" of the same address #15, is sent to machines M2-Mn on which corresponding replica memory locations reside.

However, as is indicated in FIG. 21, transmissions XN301 and XN302 do not arrive at the receiving machines immediately (that is, at time-units 1 and 2 of transmission respectively), or in the order in which they were transmitted (that is, XN301 preceding XN302). Instead, each receiving machine is indicated to receive replica update transmissions XN302 at time-unit 4, and transmission XN301 at time-unit 5, by the arrows shown for each machine M2-Mn.

The problem of such "out-of-order" replica update transmissions of FIGS. 8, 9, 10 and 11, arises for example due to the latency and delay of network communication through the network 53 interconnecting the multiple computers. Specifically, where there is a latency/delay (e.g. XN310 of FIG. 21) between transmission and receipt of given replica update transmission, such delay represents a "contention/inconsistency window" of such given replica update transmission of a first transmitting machine (e.g. machine M1), as further/multiple replica updates for a same replicated memory location transmitted by such first machine prior to receipt of such given replica update transmission by all receiving machines, and/or earlier sent transmissions yet to be received at the time of such given transmission, may potentially be received and/or actioned by receiving machine(s) in an order different to that in which they were sent. Such a "contention window" is indicated as the shaded or cross-hatched area XN310 of FIG. 21 XN3.

Consequently, two or more replica update transmission(s) for a same replicated memory location(s) transmitted during such a "contention window", may be, or will be, at risk of "conflicting" with one another if received and/or actioned by one or more receiving machines "out-of-order" (that is, in an order different to that in which such plural transmissions were issued/intended for transmission), thus potentially resulting in inconsistent updating of such replicated memory location (s) of the plural machines if undetected and/or uncorrected (as is indicated in Fig X7B). To this effect, FIG. 21 illustrates the case of machine M1 of FIGS. 8, 9, 10 and 11 transmitting two replica memory updates for a same replicated memory location (address #15) during such "contention window"—that is, transmitting a first replica memory update (XN301) for a specific replicated memory location (address #15), followed by a second replica memory update (XN302) for the same specific replicated memory location (address #15) prior to receipt and/or actioning of such first transmission by one or more or all receiving machines.

The time-delay XN310 that results between transmission and receipt of replica update transmission XN301, due to latency and delay of the communications network used to interconnect and transmit the replica memory updates between the multiple computers of the multiple computer system, represents a "contention window" where potential other transmissions for the same replicated memory location may potentially be received and/or actioned "out-of-order" by one or more receiving machines. This period of delay, XN310, represents the "transmission latency/delay" between the sending of replica update transmission XN301 by machine M1, and the receipt and/or actioning of such replica update transmission by the receiving machines.

Therefore, in order to overcome the risk of inconsistent replica updating of FIGS. 8, 9, 10 and 11, it is necessary to conceive a method for consistent updating of replica memory locations when one or more replica update transmissions for a same replicated memory location/address were transmitted prior to the receipt and/or actioning of all previously sent update transmissions for the same replicated memory location by the same machine.

Most solutions of such contention/inconsistency problems rely upon time stamping or a synchronizing clock signal (or other synchronization means) which is common to all machines/computers (entities) involved. However, in the multiple computer environment in which the preferred embodiment of the present invention arises, there is no synchronizing signal common to all the computers (as each computer is independent). Similarly, although each computer has its own internal time keeping mechanism, or clock, these are not synchronized (and even if they could be, would not reliably stay synchronized since each clock may run at a slightly different rate or speed, potentially resulting in undesirable clock-skew and/or clock-drift between the plural machines). Thus solutions based on time or attempted synchronization between plural machines are bound to be complex and/or inefficient and/or are not likely to succeed or will/may result in undesirable/unsatisfactory overhead. Instead, the preferred embodiment utilizes the concept of sequence, rather than time.

In conceiving of a means or method to overcome the above-described undesirable behaviour, it is desirable that such solution not impose significant overhead on the operation of the multiple computer system—either in terms of additional communication overhead (such as additional transmissions in order to detect the potential for conflicting/inconsistent updates/updating, or avoid such inconsistent/conflicting updates from occurring in the first place), or in terms of additional or delayed processing by sending and/or receiving machine(s) (such as additional or delayed processing by receiving machines of one or more received transmissions, or additional or delayed processing by sending machines of one or more to-be-sent transmissions).

For example, it is desirable that receiving machines be permitted to receive and action packets/transmissions in any order (including an order different to the order in which such transmission/packets were sent), and potentially different orders for the same plural transmissions on different receiving machines. This is desirable, because a requirement to process/action received transmissions in specific/fixed orders imposes additional undesirable overhead and delay in processing of received transmissions, such as for example delayed processing/actioning of a later sent but earlier received transmission until receipt and processing/actioning of an earlier sent but later received (or yet-to-be-received) transmission.

Specifically, one example of a prior art method of addressing the above described problem would be to associate with each transmission a transmission time-stamp, and cause each receiving machine to store received replica update transmissions in a temporary buffer memory to delay the actioning of such received replica update transmissions. Specifically, such received update transmissions are stored in such a temporary buffer memory for some period of time (for example one second) in which the receiving machine waits for potentially one or more earlier sent but later received replica update transmissions to be received (that is for example, transmissions with an earlier time-stamp). If no such earlier sent but later received replica update transmissions are received within such period of time, then the received transmission(s) stored in the temporary buffer memory may be proceeded to be actioned (where such actioning results in the updating of replica memory locations of the receiving machine). Alternatively, if one or more earlier sent but later received replica update transmissions are received, then processing/actioning such earlier sent but later received replica update transmissions ahead of such later sent but earlier received replica update transmissions. However, such prior art method is undesirable as additional delay (namely, storing received transmissions in a temporary buffer memory and not processing/actioning them for a period of time) is caused by such prior art method. Thus, this represents an undesirable overhead/delay to the timely updating of replica memory locations of plural machines of a replicated shared memory arrangement.

A second alternative prior art arrangement of addressing the abovedescribed problem is to associate with each transmission a transmission number indicative of the number of preceding transmissions sent by a transmitting machine. Consequently, on each receiving machine would be maintained a record of the last sequential received transmission number from a transmitting machine, so that if a later transmission is received with a transmission number which is not the next sequential transmission to be received be a receiving machine, then delaying processing of such received later transmission until receipt and actioning of any/all preceding transmissions. However, such prior art method is also undesirable as additional delay is caused by the postponed/delayed processing of such later transmissions until all preceding transmissions have been received and processed/actioned. Thus, this too represents an undesirable overhead/delay to the timely updating of replica memory locations of plural machines of a replicated shared memory arrangement.

Figure 12:
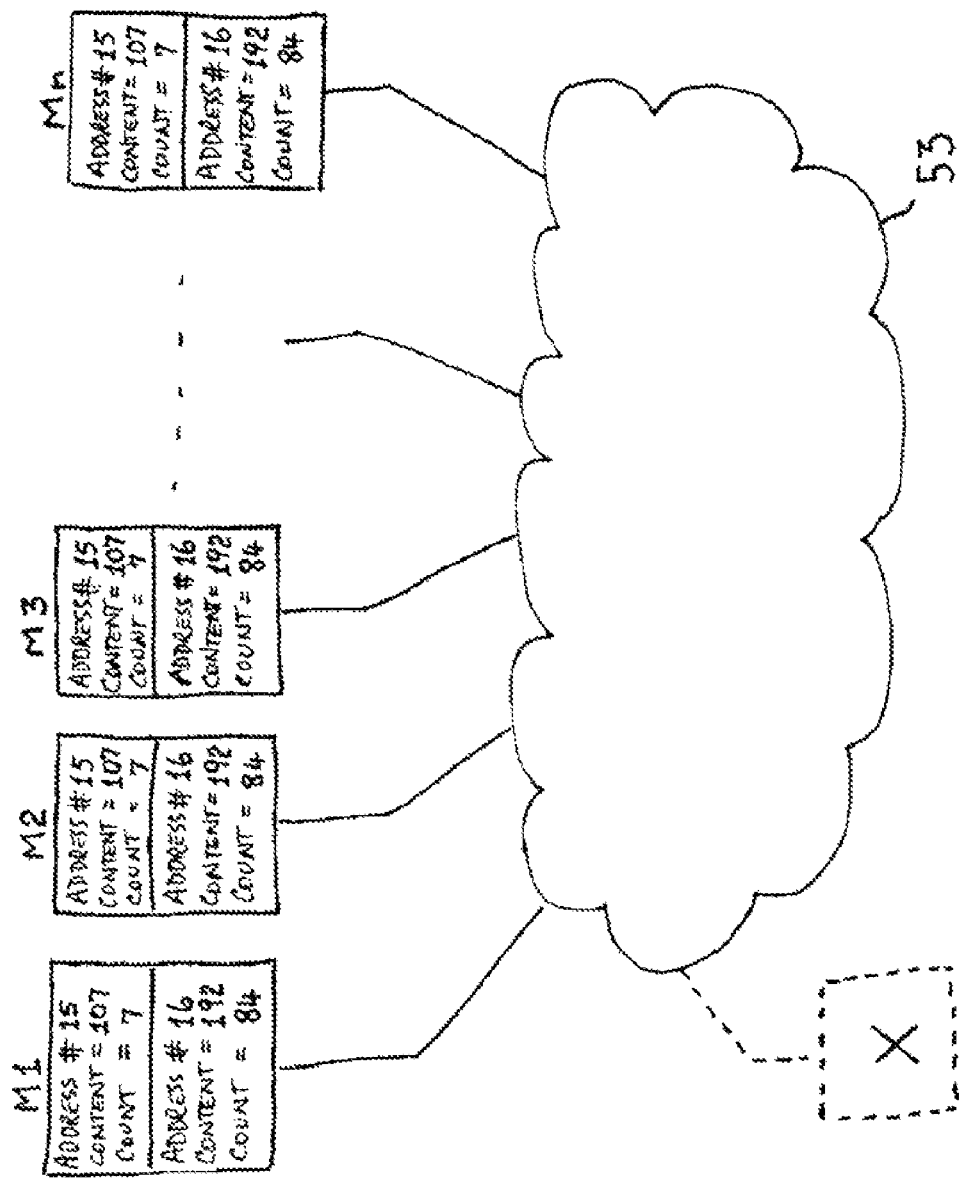
FIGS. 12, 13 and 14, and 15, 16, 17 and 18 illustrate the stages of an embodiment whereby contention can be detected.

In accordance with a first embodiment of the present invention, this problem is addressed (no pun intended) by the introduction of a "count value" (or logical sequencing value) associated with each replicated memory location (or alternatively two or more replicated memory locations of a related set of replicated memory locations). The modified position is schematically illustrated in FIG. 12 where each of the replicated memory locations/addresses #15 and #16 is provided with a "count value". In the particular instance illustrated in FIG. 12, the content of replicated memory location/address #15 is 107 and its "count value" is 7 whilst the content of replicated memory location/address #16 is 192 and its "count value" is 84.

Figure 13:
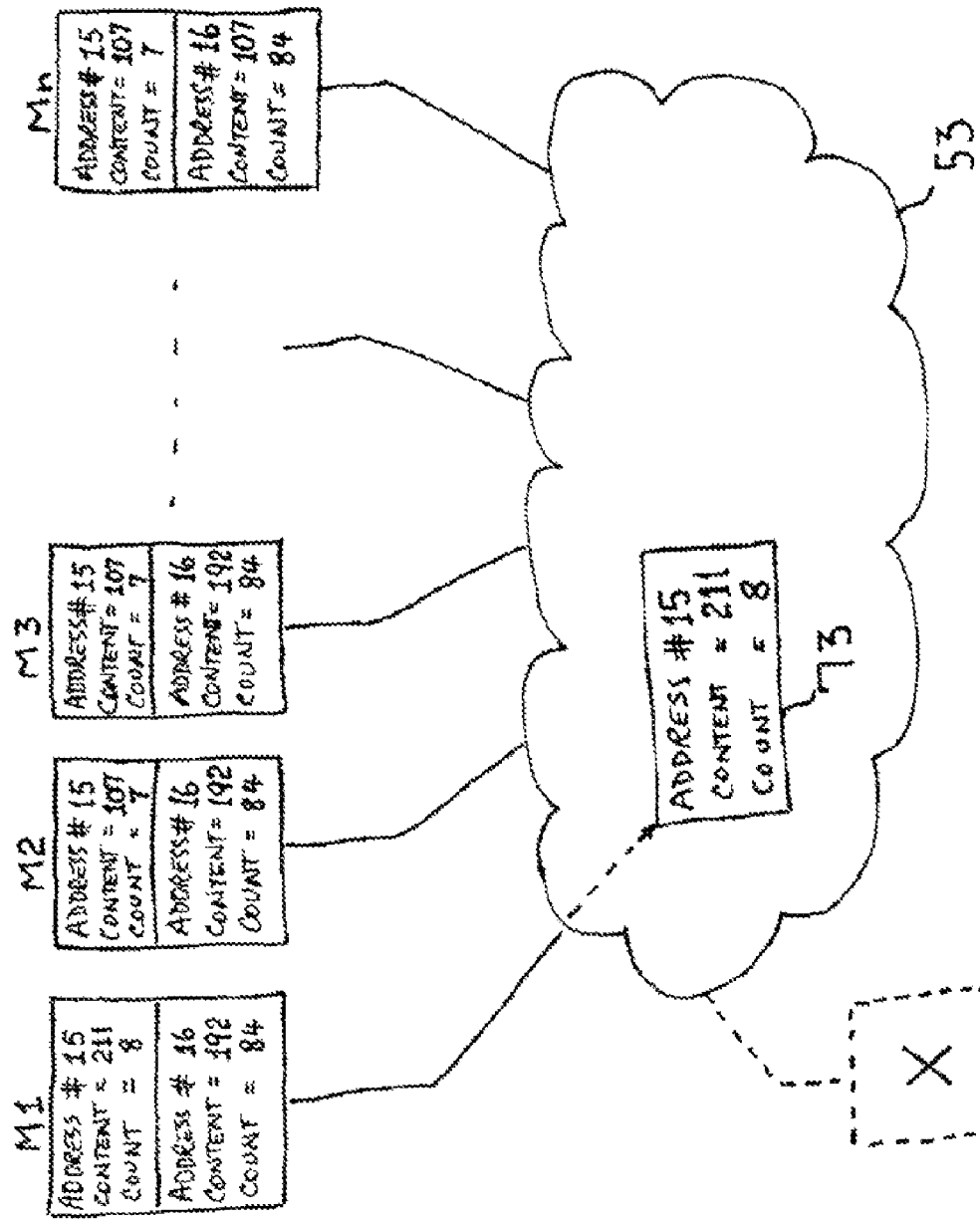

In FIG. 13, the operation of machine M1 causes the content of address #15 to be changed from 107 to 211. Following such write operation, such as upon transmission of message 73 (or some time prior to transmission of message 73), the count value associated with address #15 is incremented from 7 to 8. This indicates that message 73 is the next logical update message in the sequence of update messages of address #15 known to machine M1 at the time of transmission of message 73. Machine M1 then sends a message 73 via the network 53 to all other application running machines M2, M3 . . . Mn to instruct them to update their content for their corresponding replica memory location/address #15.

Figure 14:
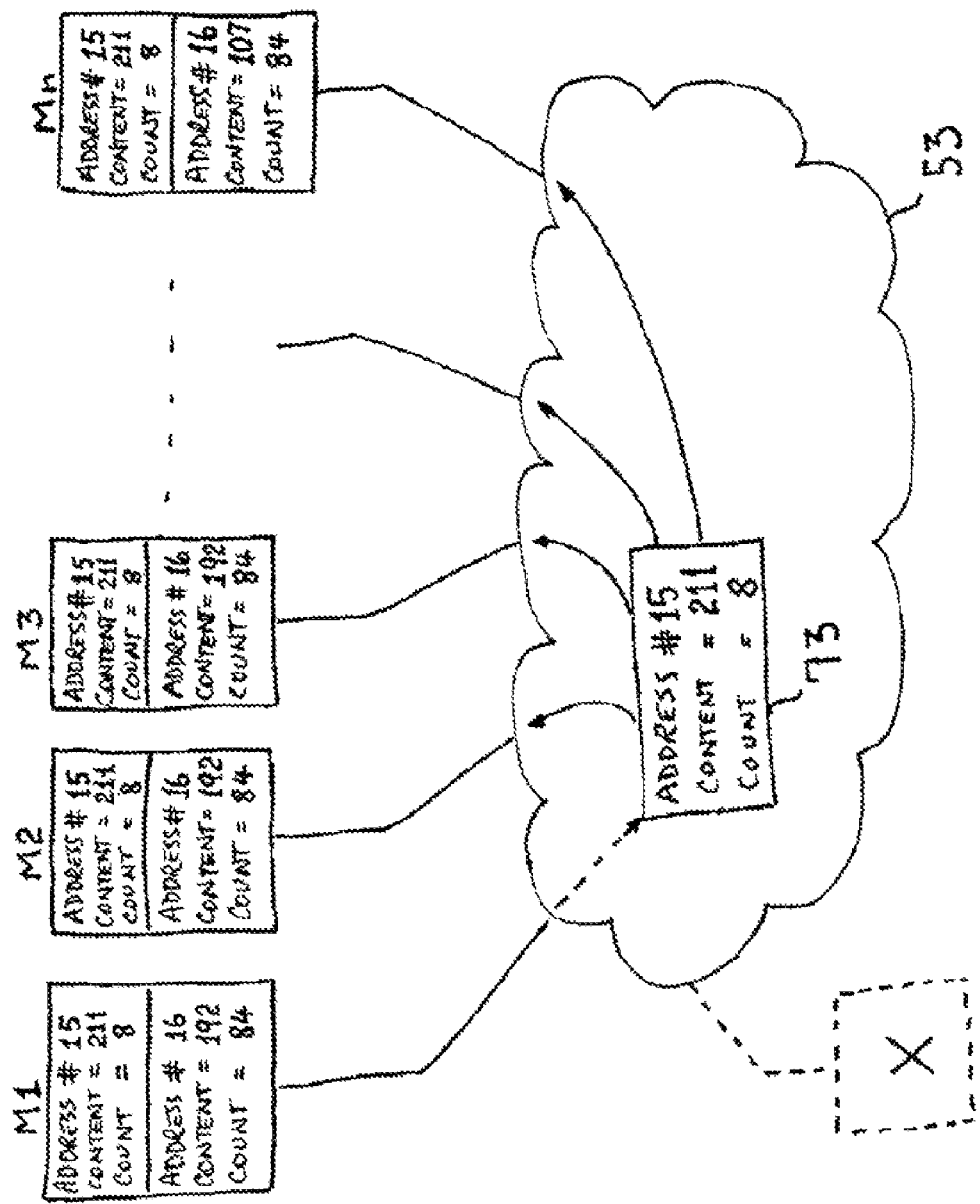

This is exactly what happens as illustrated in FIG. 14 in which the single message 73 is received by all of the other machines M2, M3 . . . Mn so that address #15 for all these receiving machines is updated with the new content 211, and the new count value 8. Thus, FIG. 14 indicates the receipt of message 73 by all other machines M2 . . . Mn, and the "actioning" of such received message 73 in accordance with the methods of this embodiment resulting in the updated "count value" of "8" for the replica memory locations of machines M2 . . . Mn. How exactly the count value for each of the replica memory locations/addresses #15 has been changed or overwritten to indicate that a change in content has occurred, will now be explained.

Specifically, upon receipt of message 73, taking the form of an identifier of a replicated memory location(s), an associated updated value of the identified replicated memory location(s), and an associated contention value(s) (that is, a "count value" or a "logical sequence value"), such associated contention value(s) may be used to aid in the detection of a potential update conflict or inconsistency that may arise between two or more update messages for a same replicated memory location.

The use of the "count value" in accordance with the methods described herewith, allows the condition of conflicting or inconsistent updates for a same replicated memory location to be detected independently by each receiving machine of a plurality of machines. Specifically, the associating of a "count value" with a replicated memory location makes it possible to detect whether a received replica update transmission comprises a value which is newer than or older than the current value of the corresponding local/resident replica memory location. In otherwords, the association of a "count value" with a replicated memory location makes it possible to receive and process/action replica update transmissions for a same replicated memory location "out-of-order" (that is, receive and action replica update transmission in an order different to that in which they were sent), by ensuring/guaranteeing that "older update values" (for example, earlier sent but later received replica update transmissions) do not overwrite/replace "newer update values" (for example, later sent but earlier received replica update transmission), and thereby maintaining consistency between corresponding replica memory locations of the plural machines.

Such a problem may arise for example, due to the latency and delay of network communication through the network 53, where such latency/delay between transmission and receipt of a replica update transmission may result in "out-of-order" receipt and/or actioning of such transmitted replica updates. Such network/transmission latency/delay may be described as a "contention window", as multiple replica updates for a same replicated memory location in transmission during the period of such "contention window" may be received and/or actioned by receiving machine(s) in an order different to that in which they were sent. Such an "out-of-order" transmission situation is illustrated in FIGS. 11 and 21.

Thus, through the use of a "count value" associated with a replicated memory location, where such "count value" indicates an approximate known update count of a replicated memory location by a transmitting machine, the occurrence of two or more update transmissions for a same replicated memory location being transmitted and/or received and/or actioned "out-of-order" (that is, in an order different to that in which they were issued/intended for transmission), is able to be detected, and thus the potential inconsistency and/or conflict that may arise from such "out-of-order" transmissions may be detected and inconsistent replica updating of the plural machines avoided.

How exactly "count value(s)" may be utilised during transmission of replica memory updates (utilizing such "count value(s)") to achieve this result, will now be described. Firstly, after a replicated memory location (such as memory location "A") is updated, such as written-to, or modified, during operation of the application program of a first machine (such as machine M1), then the updated value of such written-to replicated memory location is signalled or queued to be updated to other corresponding replica memory locations of one or more other machines of the plurality, so that such corresponding replica memory locations, subject to a updating and transmission delay, will remain substantially similar.

Sometime after such replicated memory location "A" has been written-to, and preferably before the corresponding replica update transmission has taken place, the local/resident "count value" associated with the written-to replicated memory location (that is, the local copy of the "count value" on machine M1 associated with replicated memory location "A") is incremented, and the incremented value is consequently stored to overwrite the previous local/resident "count value" (that is, the local/resident "count value" is incremented, and then overwritten with the incremented "count value").

Either at substantially the same time as the "count value" is incremented, or at a later time, an updating transmission is prepared for the network 53. Such updating transmission preferably comprises three "contents" or "payloads" or "values", that is a first content/payload/value identifying the written-to replicated memory location (for example, replicated memory location "A"), the second content/payload/value comprising the updated (changed) value of the written-to replicated memory location (that is, the current value(s) of the written-to replicated memory location), and finally the third content/payload/value comprising the incremented "count value" associated with the written-to replicated memory location.

Preferably, a single replica update transmission comprises all three "contents", "payloads" or "values" in a single message, packet, cell, frame, or transmission, however this is not necessary and instead each of the three "contents"/"payloads"/"values" may be transmitted in two, three or more different messages, packets, cells, frames, or transmissions—such as each "content"/"payload"/"value" in a different transmission. Alternatively, two "contents"/"payloads"/"values" may be transmitted in a single first transmission and the third remaining "content"/"payload"/"values" in a second transmission. Further alternatively, other combinations or alternative multiple transmission and/or pairing/coupling arrangements of the three "contents"/"payloads"/"values" may be anticipated by one skilled in the computing arts, and are to be included within the scope of the present invention.

Importantly, the "count value" of a specific replicated memory location is incremented only once per replica update transmission of such replicated memory location, and not upon each occasion at which the specific replicated memory location is written-to by the application program of the local machine. Restated, the "count value" is only incremented upon occasion of a replica update transmission and not upon occasion of a write operation by the application program of the local machine to the associated replicated memory location. Consequently, regardless of how many times a replicated memory location is written-to by the application program of the local machine prior to a replica update transmission, the "count value" is only incremented once per replica update transmission. For example, where a replicated memory location is written-to 5 times by the application program of the local machine (such as by the application program executing a loop which writes to the same replicated memory location 5 times), but only a single replica update transmission of the last written-to value is transmitted (that is, the value of the $5^{th}$ and last write operation), then the "count value" associated with the written-to replicated memory location is incremented once corresponding to the single replica update transmission.

How exactly the "count value" is utilised during receipt of replica update transmissions comprising a "count value" will now be described. The following steps upon receipt of a replica update transmission comprising an associated "count value", are to take place on each receiving machine of the plurality of machines of a replicated shared memory arrangement on which a corresponding replica memory location resides. Importantly, the following steps are operable independently and autonomously by each machine (that is, are to preferably operate independently and autonomously by each receiving machine), such that no re-transmissions, conflict requests, or any other "resolving" or "correcting" or "detecting" transmissions between two or more machines are required or will take place in order to detect potentially conflicting/inconsistent/"out-of-order" transmissions. This is particularly advantageous as each receiving machine is therefore able to operate independently and autonomously of each other machine with respect to receiving and actioning replica memory updates comprising "count value(s)", and detecting "conflicting"/"contending"/"out-of-order" transmissions.

Firstly, a replica updating transmission having an identity of a replicated memory location to be updated, the changed value to be used to update the corresponding replica memory locations of the other machine(s), and finally an associated "count value", is received by a machine (for example, machine M2). Before the local corresponding replica memory location may be updated with the received changed value, the following steps must take place in order to ensure the consistent and "un-conflicted" updating of replica memory locations, and detect potentially "conflicting"/"contending" updates.

Firstly, the received associated "count value" is compared to the local/resident "count value" corresponding to the replica memory location to which the received replica update transmission relates. If the received "count value" of the received update transmission is greater than the local/resident "count value", then the changed value of the received replica update transmission is deemed to be a "newer" value (that is, a more recent value) than the local/resident value of the local corresponding replica memory location. Consequently, it is desirable to update the local corresponding replica memory location with the received changed value. Thus, upon occasion of updating (overwriting) the local corresponding replica memory location with the received value, so too is the associated local "count value" also updated (overwritten) with the received "count value". Such a first case as this is the most common case for replica memory update transmission, and represents an "un-conflicted"/"un-contended"/(or as yet un-contended/un-conflicted) and/or "consistent" replica update transmission.

On the other hand, if the received "count value" of the received update transmission is less than the local/resident "count value", then the changed value of the received replica update transmission is deemed to be an "older" value than the local/resident value of the local corresponding replica memory location. Consequently, it is not desirable to update the local corresponding replica memory location with the received changed value (as such value is a "stale" value), and as a result the received changed value may be disregarded or discarded.

Furthermore again, the abovedescribed methods achieve the desired aim of being able to detect "out-of-order"/conflicting replica update transmissions without requiring re-transmissions by one, some, or all of the transmitting machine(s) of the affected (that is, conflicting) transmissions.

Thus, the abovedescribed methods disclose a system of transmitting replica memory updates in such a manner in which consideration or allowance or special handling or other special steps (such as requiring the use of "ordered-delivery" networks, or requiring receipt and/or actioning of received replica update transmissions to take place in an identical order to that in which they were transmitted) during transmission for preventing "out-of-order" transmission and/or receipt and/or processing/actioning of replica update messages, is not required. In other words, the above described use of associated "count value(s)" with replicated memory locations, makes it possible to transmit "self-contained" replica memory updates to all receiving machines, where the values/information of such "self-contained" replica memory updates comprise all the necessary information to ensure that potential "out-of-order" processing/actioning of such replica update transmission(s) will not result in inconsistent replica memory of receiving machine(s). Importantly, such "self-contained" replica memory updates comprising "count values", may be transmitted by a sending machine without regard for the order in which such transmission(s) will be received and/or actioned by one or more receiving machines, as such "self-contained" replica update transmissions (including "count values") contain all the necessary information to ensure the consistent updating of replica memory locations of receiving machine(s) regardless of the order in which such transmissions are received and/or actioned.

Consequently, each transmitting and/or receiving machine is able to operate independently and unfettered, and without requiring "ordered-delivery" networks, and/or ordered receipt of replica memory update transmissions, and/or ordered processing/actioning of received replica memory update transmissions, or the like, and instead each transmitting and/or receiving machine may transmit and/or receive and/or action replica memory updates in any order (and potentially different orders on different machines) without regard for potential replica-inconsistency resulting from such "out-of-order" transmission and/or receipt and/or actioning, as the use of the abovedescribed methods are able to detect potential conflicting "out-of-order" replica update transmissions on each receiving machine independently of each other machine, and thereby ensure the consistent updating of corresponding replica memory locations of the plural machines.

Thus, it will be appreciated, that the abovedescribed methods for replica update transmission (comprising "count values") achieves a desired operating arrangement which allows the "out-of-order" transmission and/or receipt and/or actioning of replica memory update transmissions by machines of a replicated shared memory arrangement, whilst ensuring the consistent updating of corresponding replica memory locations of the plural machines. As a result, through the use of "count values" as described above, transmitting machines may send multiple replica memory updates for a same replicated memory location in any order, and communications network(s) interconnecting the plural machines may transmit such replica memory updates to receiving machines in any order (including different orders on different receiving machines), and receiving machines may receive and/or action such replica memory updates in any order without causing or resulting in replica-inconsistency between the corresponding replica memory locations of the plural machines.

Furthermore, it will be appreciated that the abovedescribed methods for replica update transmission (having "count values") achieves an additional desired operating arrangement in which re-transmissions, re-tried transmissions, stalled transmissions or the like do not result from a condition of "out-of-order" transmission and/or receipt of replica memory updates for a same replicated memory location.

Furthermore again, it will be appreciated that the abovedescribed methods for replica update transmission (having "count values") achieves an additional desired operating arrangement in which replica memory updates received "out-of-order" by a receiving machine are not required to be buffered or cached, and that the actioning/processing (potentially resulting in updating of local corresponding replica memory locations) of such "out-of-order" replica memory updates are not required to be delayed or stalled, and instead such "out-of-order" replica memory updates may be actioned/processed immediately upon receipt by receiving machine(s) regardless of transmission or receipt order.

Furthermore again, the abovedescribed methods for replica update transmission achieves a further desired operating arrangement/result in which, upon occasion of two or more "out-of-order" replica update transmissions (such as a first earlier sent but later received replica update transmission of machine M1 for replicated memory location "A", and second later sent but earlier received replica update transmission of machine M1 for the same replicated memory location "A"), that further ongoing replica update transmissions by machine M1 for either or both of the same replicated memory location "A", or any other replicated memory location(s), may continue in an uninterrupted and unhindered manner—specifically, without causing further/later replica memory update transmissions (including further/later update transmissions of replicated memory location "A") following such "out-of-order"/"conflicting" transmission(s) to be stalled, interrupted or delayed.

Furthermore again, the abovedescribed methods for replica update transmission achieves a further desired operating arrangement/result in which, upon occasion of two or more "out-of-order" replica update transmissions (such as a first earlier sent but later received replica update transmission of machine M1 for replicated memory location "A", and second later sent but earlier received replica update transmission of machine M1 for the same replicated memory location "A"), will not effect the replica memory update transmissions of any other machine (for example, machines M2 . . . Mn) whether such other transmissions apply/relate to replicated memory location "A" or not. Thus, transmissions of other machines (for example, machines M2 . . . Mn) are able to also proceed and take place in an uninterrupted, unhindered and unfettered manner in the presence of (for example, substantially simultaneously to) two or more "out-of-order"/conflicting transmissions (such as of machine M1), even when such other transmissions of machines M2 . . . Mn relate/apply to replicated memory location "A".

Thus, the abovedescribed methods of consistent updating of replica memory locations in the presence of "out-of-order" replica update transmissions addresses various problems.

Altogether, the operation of a multiple computer system having transmitting and receiving machines, and utilising the abovedescribed "count value" to consistently update replica memory locations in the presence of "out-of-order"/conflicting replica memory updates, will now be explained.

Figure 22:
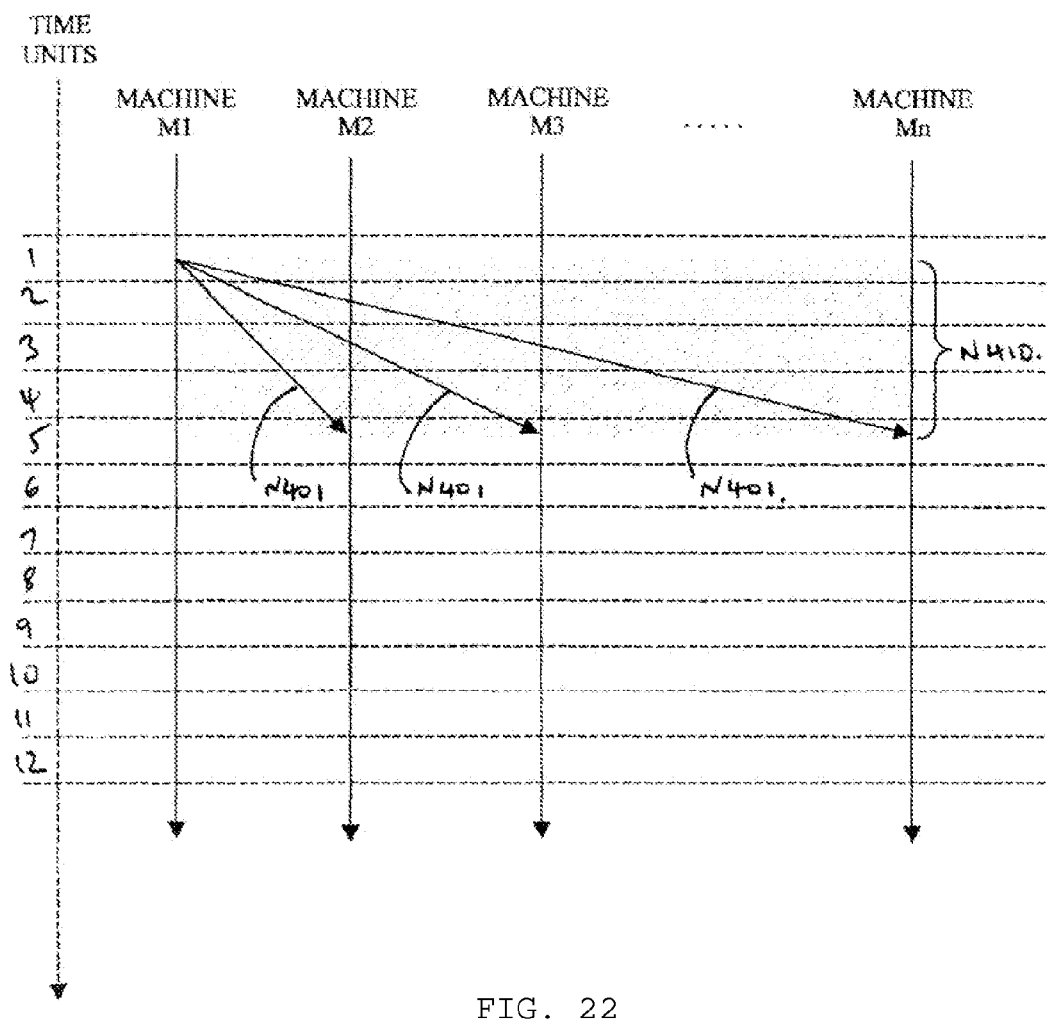

Turning now to FIG. 22, the example of FIGS. 13 and 14 is collectively illustrated in a time-diagram. Here, machine M1 transmits replica memory update N401 (which corresponds to replica update 73 of FIGS. 13 and 14) at time-unit 1, with the updated value "211" of address #15 and the contention value ("count value") of "8", to machines M2, M3 . . . Mn on which corresponding replica memory locations reside.

Corresponding to transmission N401 by machine M1, in accordance with the abovedescribed rules the "count value" of machine M1 of the updated replicated memory location/address #15 is incremented by 1 to become "8" (that is, the resident "count value" of "7" is incremented to become the new "count value" of "8"). Replica memory update N401 is then transmitted to machines M2-Mn, comprising the updated value "211" of the written-to replicated memory location of machine M1 (that is, replicated memory location/address #15), the identity of the replicated memory location to which the updated value corresponds (that is, replicated memory location/address #15), and the associated incremented "count value" of the replicated memory location to which the updated value corresponds (that is, the new resident "count value" of "8").

However, as is indicated in FIG. 22, transmission N401 does not arrive at the receiving machines M2-Mn immediately (that is, at the same time-unit 1 of transmission). Instead, each receiving machine is indicated to receive replica update transmission N401 at time-unit 5 by the arrows shown for each machine M2-Mn. Thus, FIG. 22 illustrates a time-delay N410 that typically results between transmission and receipt of a replica memory update, due to latency and delay of the communications network used to interconnect and transmit the replica memory updates between the multiple computers of the multiple computer system. This period of delay, N410, represents the "transmission latency/delay" between the sending or replica update transmission N401 by machine M1, and the receipt of the same replica update transmission N401 by machines M2-Mn.

Following transmission N401 by machine M1, the receiving machines M2-Mn each independently receive the transmission N401, and proceed to independently "action" the received transmission according to the abovedescribed rules. Specifically, by comparing the "count value" of the received transmission N401 with the resident (local) "count value" of the corresponding replica memory location of each receiving machine (which is indicated to be "7" for all machines), it is able to be determined that the received "count value" of transmission N401 (that is, the count value "8") is greater than the resident "count value" of the corresponding replica memory location of each machine (that is, the resident count value "7").

As a result, the determination is made that the received updated value of transmission N401 is a newer value than the resident value of machines M2-Mn, and therefore receiving machines M2-Mn are permitted to update their local corresponding replica memory locations with the received updated replica value. Accordingly then, each receiving machine M2-Mn replaces the resident (local) "count value" of the local corresponding replica memory location with the received "count value" of transmission N401 (that is, overwrites the resident "count value" of "7" with the received "count value" of "8"), and updates the local corresponding replica memory location with the received updated replica memory location value (that is, overwrites the previous value "107" with the received value "211").

Thus, the use of the "count value" as described, allows a determination to be made at the receiving machines M2-Mn that the transmitted replica update N401 of machine M1 is newer than the local resident value of each receiving machine. Therefore, machines M2-Mn are able to be successfully updated in a consistent and coherent manner with the updated replica value of transmission N401, and the aim of consistent and coherent updating of replicated memory location(s) is achieved.

Figure 23:
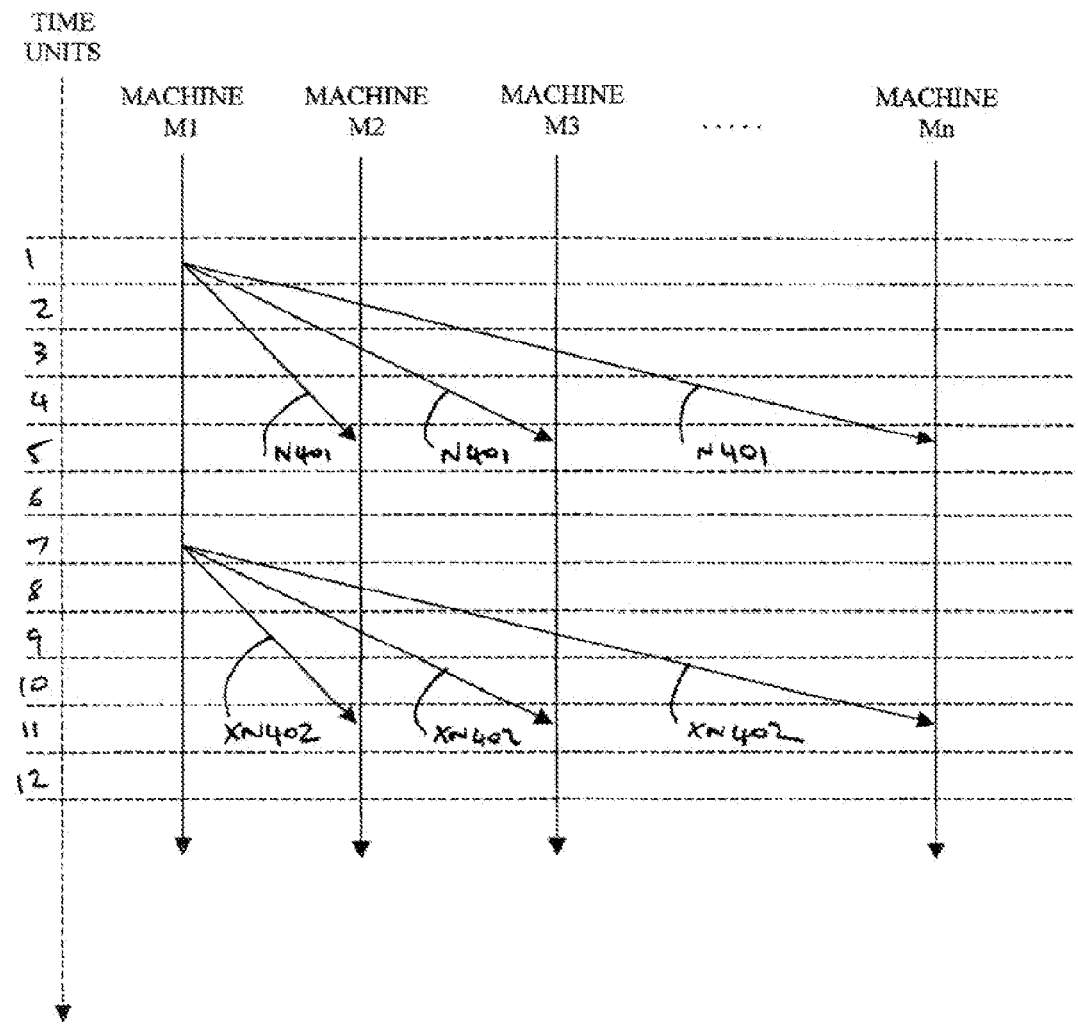

For example, consider FIG. 23. FIG. 23 follows on from FIG. 22, where at time-unit 7, and following receipt of transmission N401, machine M1 transmits replica memory update XN402, with the updated value "999" of address #15 and the updated "count value" of "9", to machines M2, M3, M4 . . . Mn. Specifically, the further transmissions XN402 by machine M1 to machines M1, M2, M4 . . . Mn is a transmission of a further updated value generated by the operation of machine M1 for the same replicated memory location updated by transmission N401 (that is, replicated memory location/address #15).

Corresponding to transmission XN402 by machine M1, in accordance with the abovedescribed rules the "count value" of machine M1 of the updated replicated memory location/address #15 is incremented by 1 to become "9" (that is, the resident "count value" of "8" is incremented to become the new "count value" of "9"). Replica memory update XN402 is then transmitted to machines M2, M3, M4 . . . Mn, comprising the updated value "999" of the written-to replicated memory location of machine M1 (that is, replicated memory location/address #15), the identity of the replicated memory location to which the updated value corresponds (that is, replicated memory location/address #15), and the associated incremented "count value" of the replicated memory location to which the updated value corresponds (that is, the new resident "count value" of "9").

Next, at time-unit 11 is indicated that machines M2, M3, M4 . . . Mn receive transmission XN402, and proceed to independently "action" the received transmission according to abovedescribed rules in a similar manner to the actioning of the received transmission N401 by machines M2-Mn. Specifically, by comparing the "count value" of the received transmission XN402 with the resident (local) "count value" of the corresponding replica memory location of each receiving machine (which is indicated to be "8" for all machines), it is able to be determined that the received "count value" of transmission XN402 (that is, the count value "9") is greater than the resident "count value" of the corresponding replica memory location of each machine (that is, the resident count value "8").

As a result, the determination is made that the received updated value of transmission XN402 is a newer value than the resident value of machines M2, M3, M4-Mn, and therefore machines M2, M3, M4-Mn are permitted to update their local corresponding replica memory locations with the received updated replica value. Accordingly then, each receiving machine M2, M3, M4-Mn replaces the resident (local) "count value" of the local corresponding replica memory location with the received "count value" of transmission XN402 (that is, overwrites the resident "count value" of "8" with the received "count value" of "9"), and updates the local corresponding replica memory location with the received updated replica memory location value (that is, overwrites the previous value "211" with the received value "999").

Thus, the use of the "count value" as described, allows a determination to be made at the receiving machines M2, M3, M4 . . . Mn that the transmitted replica update XN402 of machine M1 is newer than the local resident value of each receiving machine. Therefore, machines M2, M3, M4 . . . Mn are able to be successfully updated in a consistent and coherent manner with the updated replica value of transmission XN402, and substantially consistent and coherent updating of replicated memory location(s) is achieved.

Critically, what is accomplished through the use of an associated "count value" for each replica memory location (or set of replica memory locations), is that such "count value" may be used to signal when a replica update is newer or older than a replica memory location value already resident on a receiving machine. As can be seen in FIGS. 22 and 22, the first transmission N401 of machine M1 has a count value of "8", which is subsequently received by machines M2-Mn. Some time subsequent to the receipt of transmission N401 by the receiving machines M2-Mn (e.g. time-unit 7), machine M1 transmits a second replica update XN402 of a new value for the same replicated memory location of transmission N401 (that is, replicated memory location/address #15), and consequently associates with such transmission XN402 a new "count value" of "9", indicating that such transmission XN402 is "newer" (or "later") than transmission N401 (which had a "count value" of "8").

As a result, by using the abovedescribed methods, it is able to be ensured that for example were transmission N401 to be received by a machine (such as machine M2) after receipt of transmission XN402 by the same machine (e.g. machine M2), that the "late" received transmission N401 would not cause the replica memory location value of machine M2 (in which is stored the value of the previously received transmission XN402) to be overwritten with the "older" (or "earlier") value of transmission N401. This is because, in accordance with abovedescribed operation of "count values", the resident "count value" of machine M2 for replicated memory location/address #15 after receipt of transmission XN402 would have been overwritten to become "9". Therefore upon receiving transmission N401 with a "count value" of "8" after receipt and actioning of transmission XN402, in accordance with the abovedescribed "count value" rules, such received transmission N401 would not cause the local replica memory location #15 of machine M2 to be updated with the received updated value of transmission N401 as the "count value" of transmission N401 would be less than the resident "count value" of "9" resulting from the previous receipt and actioning of transmission XN402. Thus, consistent and coherent replica updating is achieved.

Figure 15:
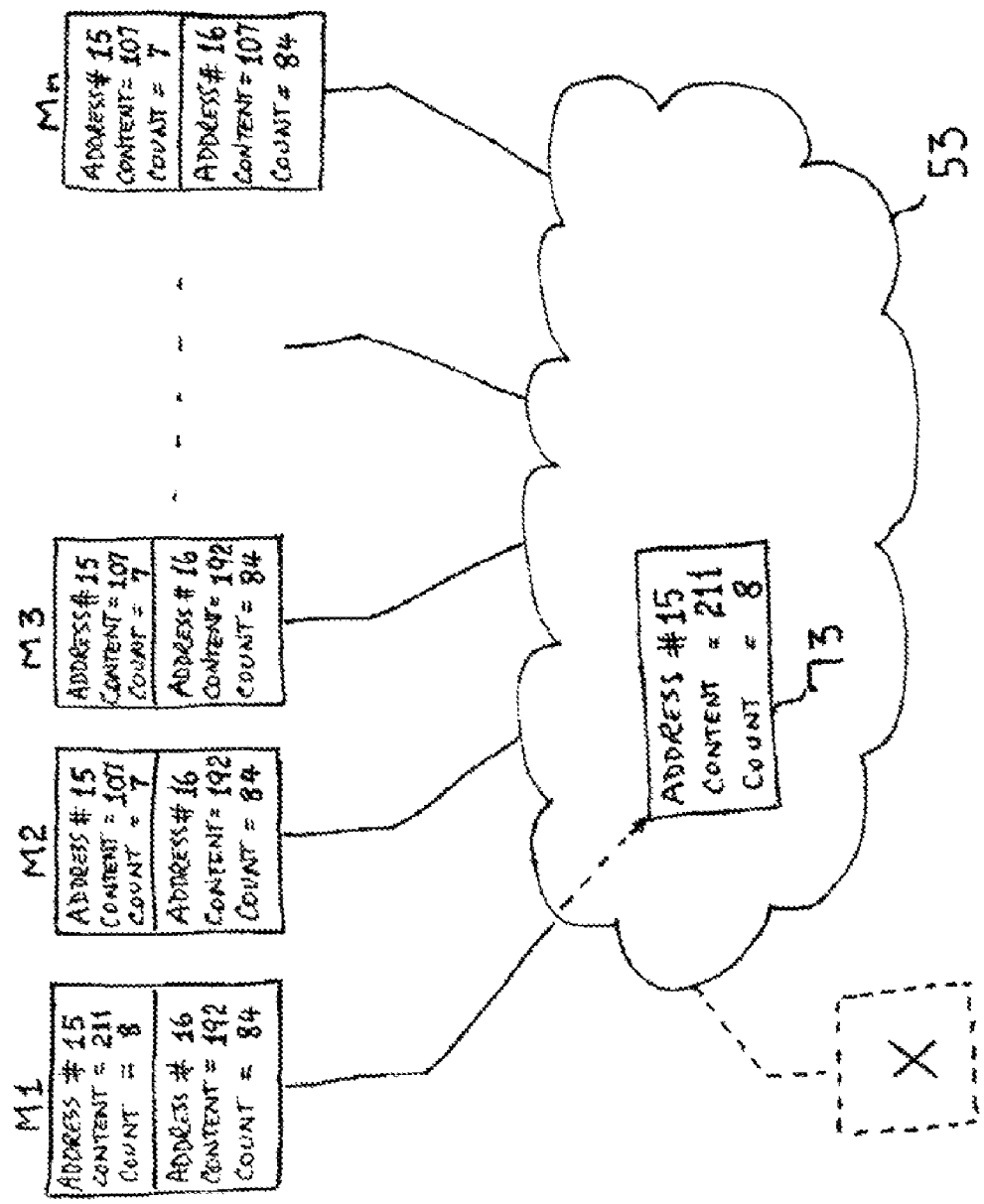
Figure 16:
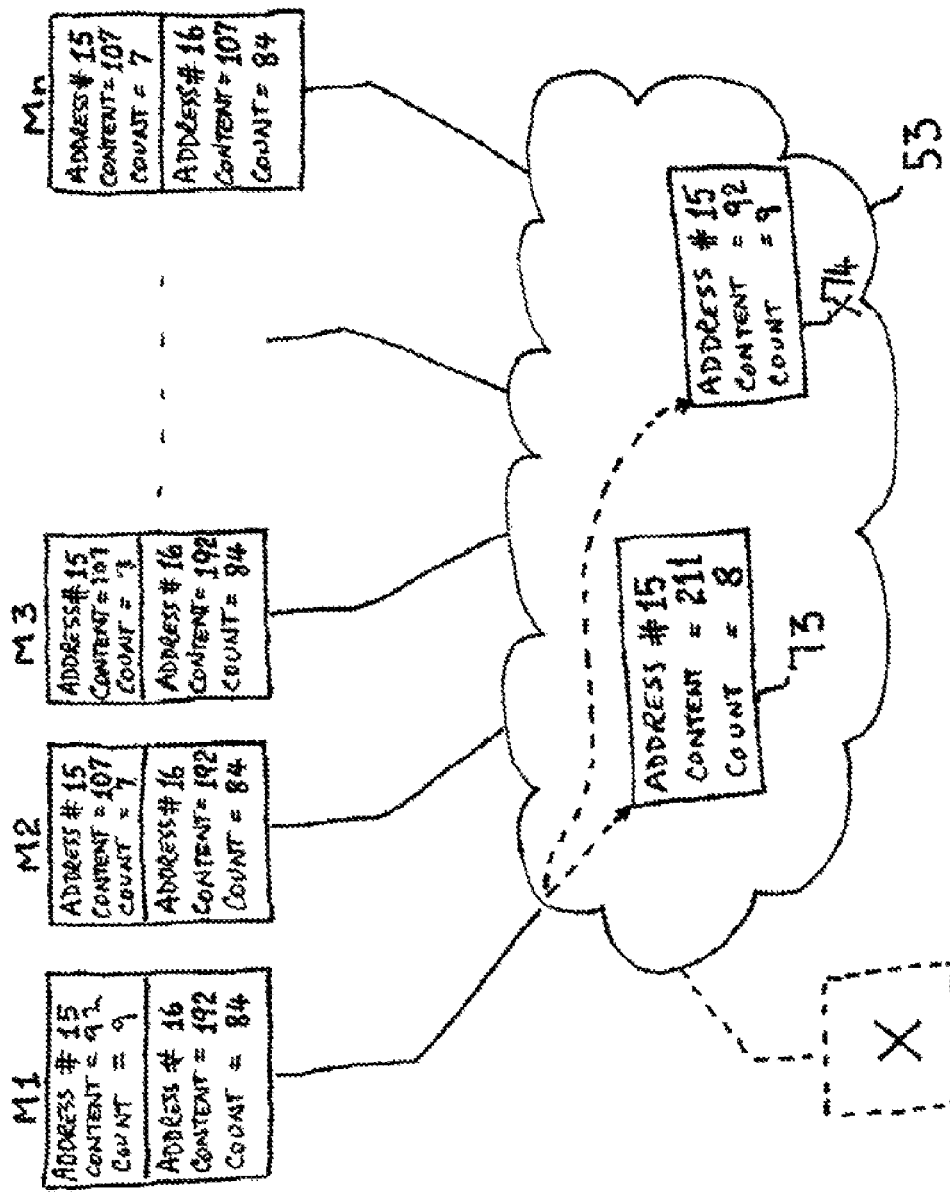

FIGS. 15 and 16 illustrates what happens in the circumstance discussed above in relation to FIGS. 8 and 9 where the content of a single replica memory location/address is modified (written-to) multiple times by a single machine (for example where such multiple writes take place quickly or frequently or in close intervals by not necessarily in immediate succession), causing to be sent more than one replica update transmissions for such multiply written-to replicated memory location (e.g. such multiple transmissions comprising different values of the multiple values written-to such replicated memory location). As in FIG. 14, machine M1 in executing its portion of the application program causes the contents of replicated memory location/address #15 to be written with a new content "211". As a result, the "count value" associated with replicated memory location/address #15 is incremented from "7" to "8", and message 73 is sent via the network 53 to all other machines M2, M3, . . . Mn comprising the updated value of replicated memory location/address #15 (that is, "211"), the identity of the written-to replicated memory location (that is, address #15), and the associated incremented "count value" (that is, "8"). Shortly after, as illustrated in FIG. 16, machine M1 writes a new content "92" to the same replicated memory location/address #15, and as a result similarly increments its "count value" from "8" to "9" and sends a message X74 containing these particulars (that is, the identity of the written-to replicated memory location, the updated value of the written-to replicated memory location, and the associated incremented "count value") to all other machines M2, M3, M4, M5, . . . Mn. This is the situation illustrated in FIGS. 15 and 16.

Figure 17:
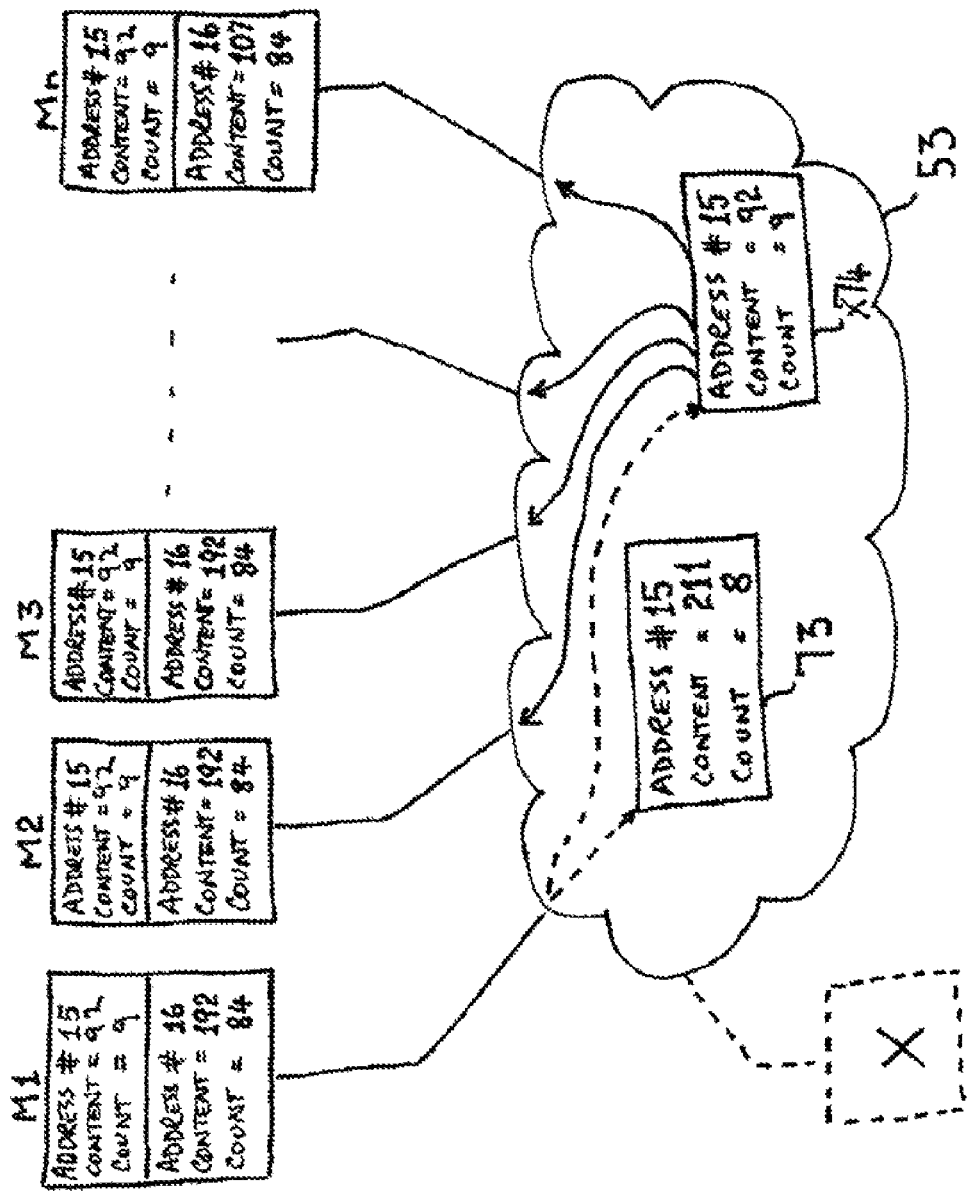
Figure 18:
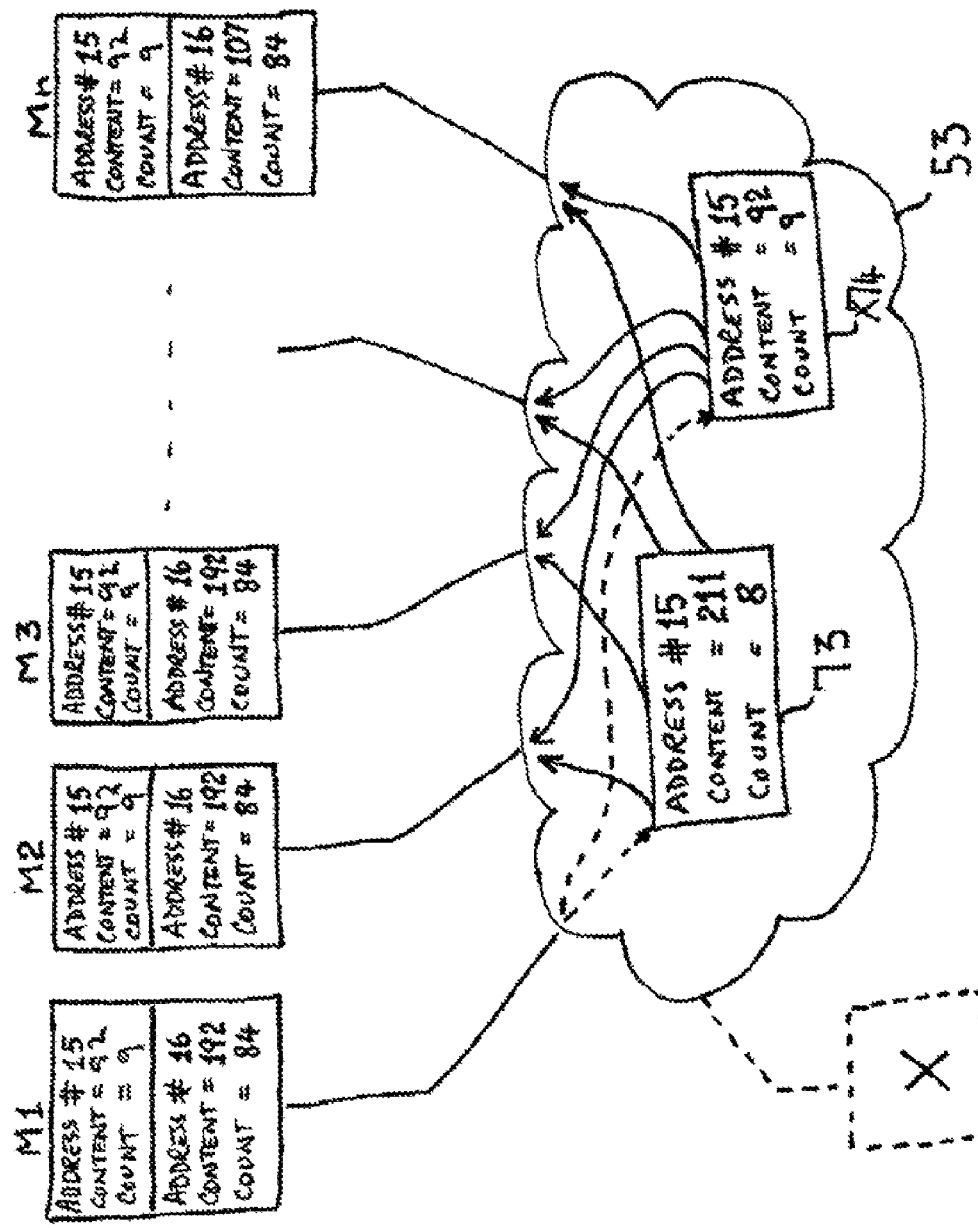

The consequence of the situation illustrated in FIGS. 15 and 16 is illustrated in FIGS. 17 and 18. As in FIGS. 10 and 11, machines M2, M3, M4, M5 . . . Mn which did not initiate any/either message, first receive message X74, and proceed to "action" such first received transmission X74 in accordance with the abovedescribed methods. As in FIG. 10, FIG. 17 indicates the case where replica update transmission X74, though sent by machine M1 later than (e.g. after) replica update transmission 73, is received by machines M2-Mn ahead of replica update transmission 73.

Specifically, upon receipt of message X74 by each of the receiving machines M2-Mn, such first received message X74 will cause the updating of the local corresponding replica memory location of each receiving machine, as such first received message X74 has a "count value" of "9" which is greater than the resident "count value" of "7" of the receiving machines (that is, the value of the first received transmission X74 is deemed newer than current value of the local corresponding replica memory location). Though the "count value" of the first received transmission X74 is "2" values higher than the local/resident "count value" of each receiving machine, the local corresponding replica memory locations of each receiving machine are permitted to be updated even though no replica memory update with a "count value" of "8" has been received.

Therefore, in actioning the first received message/transmission X74, the resident "count value" of each receiving machine will be caused to be overwritten/replaced from "7" to "9", and the local corresponding replica memory location of each receiving machine will be update/replaced (e.g. overwritten) with the received updated value of the first received transmission X74. Consequently, following such actioning of the first received transmission X74, the updated content/value stored at the local replica memory location of each receiving machine corresponding to replicated memory location/address #15 will be "92", and the associated local/resident "count value" will be "9".

However, in FIG. 18, upon occasion of each receiving machine M2, M3, M4, M5 . . . Mn receiving transmission/message 73, and proceeding to "action" such second received transmission in accordance with the abovedescribed methods, a condition of "conflict"/"contention" will be detected between the "count value" of the second received transmission 73 and the corresponding local/resident "count value" of each receiving machine. Specifically, in actioning the second received message/transmission 73, a comparison of the resident "count value" (with a value of "9"), and the "count value" of the second received transmission 73 (with a value of "8"), will result in a determination that the second received transmission 73 is older than the local/resident "count value" of each receiving machine (which is "9"), and therefore the updated replica value of transmission 73 is older than the local/resident replica value. Therefore, upon receipt and actioning of the second received transmission/message 73, each receiving machine M2, M3, M4, M5 . . . Mn is able to detect and signal a potential condition/risk of "inconsistency" between the second received transmission 73 and the local/resident value of each receiving machine, by detecting that the "count value" of the second received transmission 73 is less than the local/resident "count value" of each receiving machine, and therefore discard the updated received value of the second received transmission 73 and not update local corresponding replica memory location(s) which such second received value. As a result, the situation of inconsistent updating of replica memory locations illustrated in FIGS. 10 and 11 is avoided, so that replica update transmissions received "out-of-order" do not result in or cause inconsistency between corresponding replica memory locations of receiving machines.

It will thus be appreciated that the machines M2, M3, M4, M5, . . . Mn having received message X74 first, and thereby having an updated "count value" of "9" (resulting from the actioning of such first received message X74), when they each receive the second message 73 will have a resident "count value" which is greater than the "count value" of the second received message 73. Thus these receiving machines may discard the updated value of such second received transmission 73, and not cause to be updated the local corresponding replica memory location of each receiving machine with such discarded value 73.

Thus, by comparing the resident "count value" with the "count value" of the first received message X74 (by means of a comparator, for example) machines M2-Mn are able to determine that such updated replica value of message/transmission X74 is newer than the local/resident value of the corresponding replica memory location, by a determination that the "count value" of the first received message X74 (which is a value of "9") is greater than the resident "count value" (which is a value of "7").

Next, by comparing the resident "count value" with the received "count value" of message 73 (by means of a comparator, for example) machines M2-Mn are able to detect and signal that a "conflict"/"contention" situation has arisen because each detects the situation where the incoming message X73 contains a "count value" (that is, a "count value" of "8") which is less than the existing state of the resident "count value" associated with replicated memory location/address #15 (which is a "count value" of "9", as was updated by the first received transmission X74).

It will thus be appreciated that each of the receiving machines M2-Mn, having received message X74, and thereby having an updated "count value" of "9" (resulting from the receipt and actioning of message X74), when they receive message 73 will have a resident "count value" which is greater than the "count value" of the second received message 73. Furthermore, it will also be appreciated that each of the receiving machines M2-Mn, having received messages 73 and X74, will have a content/value and "count value" of replicated memory location/address #15 which is consistent with the content/value and "count value" of machine M1. Thus these receiving machines, have avoided the situation of inconsistent replica updating illustrated in FIGS. 10 and 11.

Figure 24:
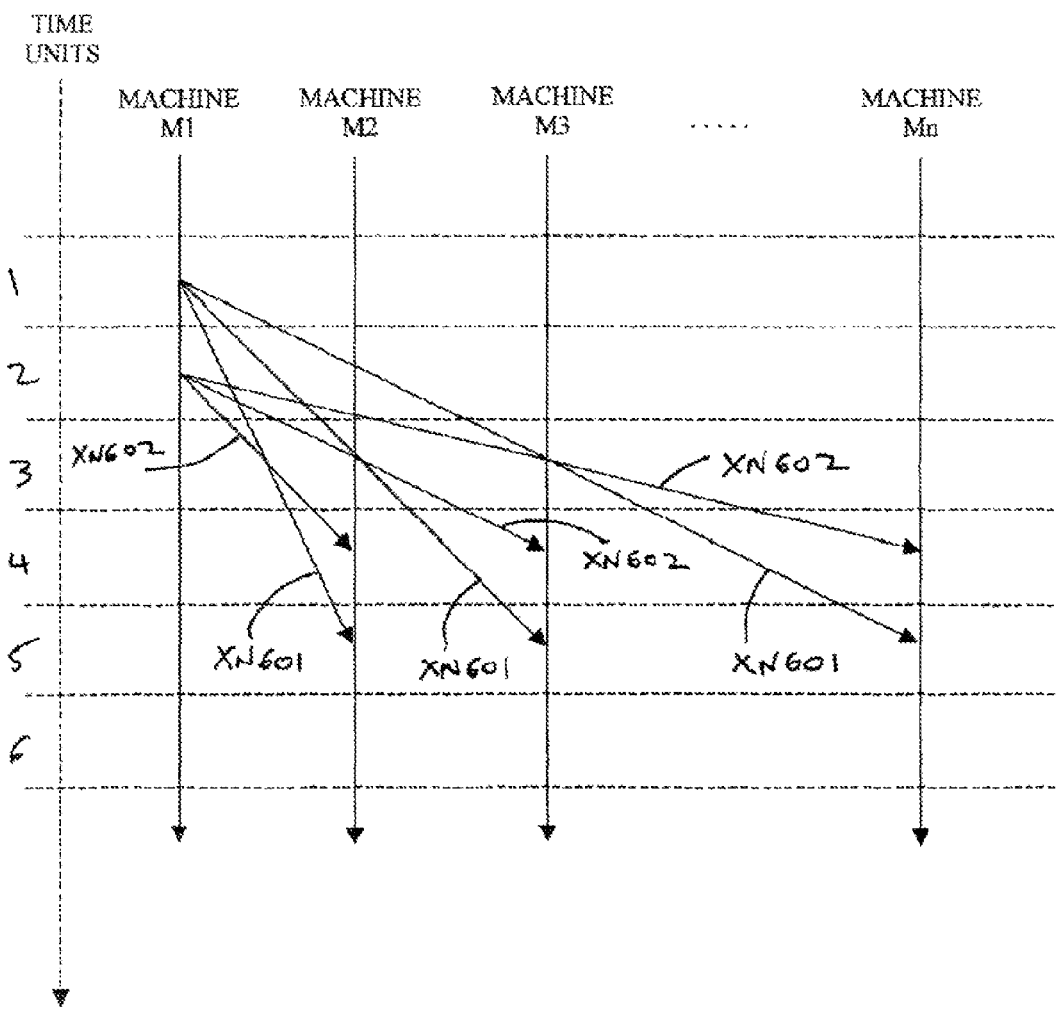

Turning thus to FIG. 24, the example of FIGS. 15, 16, 17 and 18 is collectively illustrated in a time-diagram. Here, machine M1 transmits (at time unit 1) replica memory update XN601 (which corresponds to replica update 73 of FIGS. 15, 16, 17 and 18), with the updated value "211" of address #15 and the contention value ("count value") of "8", to machines M2, M3 . . . Mn on which corresponding replica memory locations reside. Sometime later (that is, at time-unit 2), machine M1 transmits a further replica memory update XN602 (which corresponds to replica update X74 of FIGS. 16, 17 and 18), with the updated value "92" of the same address #15 and the contention value ("count value") of "8", to machines M2, M3, M4 . . . Mn on which corresponding replica memory locations reside.

However, as is indicated in FIG. 24, transmissions XN601 and N602 do not arrive at the receiving machines immediately (that is, at the same time-unit 1 of transmission). Instead, each receiving machine is indicated to receive replica update transmission XN602 at time-unit 4, followed by transmission XN602 at time-unit 5, by the arrows shown for each machine M1-Mn.

However, unlike the case of FIGS. 8, 9, 10 and 77, the use of the associated "count values" for transmissions XN601 and XN602, together with the resident "count values" of each receiving machine, is able to detect that the second of the received replicate update transmissions (that is, transmission XN601) is and older replica value than the resident replica value of each receiving machine, therefore discarding such older received value of transmission XN601 and not causing the local corresponding replica memory location to be updated. Specifically, regardless of the order in which replica update transmissions XN601 and XN602 are ultimately received, each receiving machine is independently able to ensure/guarantee the consistent updating of the local corresponding replica memory location to which such two replica updates relate, thereby ensuring consistency between corresponding replica memory locations of the plural machines is maintained.

Thus, by using the abovedescribed methods to associate "count value(s)" with replicated memory location(s), and by using the rules described herein for the operation and comparison of such "count value(s)", consistent updating of replica memory locations of plural machines may be achieved, and detection of "out-of-order"/conflicting/contending replica update transmissions may also achieved.

Thus it will be seen from the above example that the provision of the "count value(s)" in conjunction/association with replicated memory location(s) provides a means by which potential inconsistencies/conflicts resulting from "out-of-order" transmission and/or receipt and/or actioning of replica memory updates can be detected, and consistent updating of replicated memory locations be achieved/ensured. This is a first step in ensuring that the replicated memory structure remains consistent.

Additionally, it will also be seen from the above examples that the provision of the "count value(s)" in conjunction/association with replicated memory location(s) provides a means by which replica memory updates may be received and/or actioned "out-of-order" (that is, later sent but earlier received replica update transmissions may be processed/actioned ahead of earlier sent but later received replica update transmissions of a same replicated memory location), without requiring such "out-of-order" replica memory updates to be buffered, delayed, stalled, or otherwise caused to be received and/or actioned in a sequentially consistent manner.

Thus the provision of the "count value" and the provision of a simple rule, namely that incoming messages with updating content of a replicated memory location are valid if the resident "count value" is less than the received "count value", but are in "conflict" if the resident "count value" is greater than the received "count value", enables "out-of-order"/"conflicting" replica update transmissions to be detected and inconsistent updating of replicated memory locations avoided.

Thus, as illustrated in FIGS. 15, 16, 17, 18 and 24, multiple replica update messages/transmissions for a same replicated memory location may be received and/or actioned in any order (including an order different to that in which they were issued/intended for transmission), without resulting in potential inconsistency between corresponding replica memory locations of the plural machines (for example, as happened in the case of Fig X7B).

Figure 25:
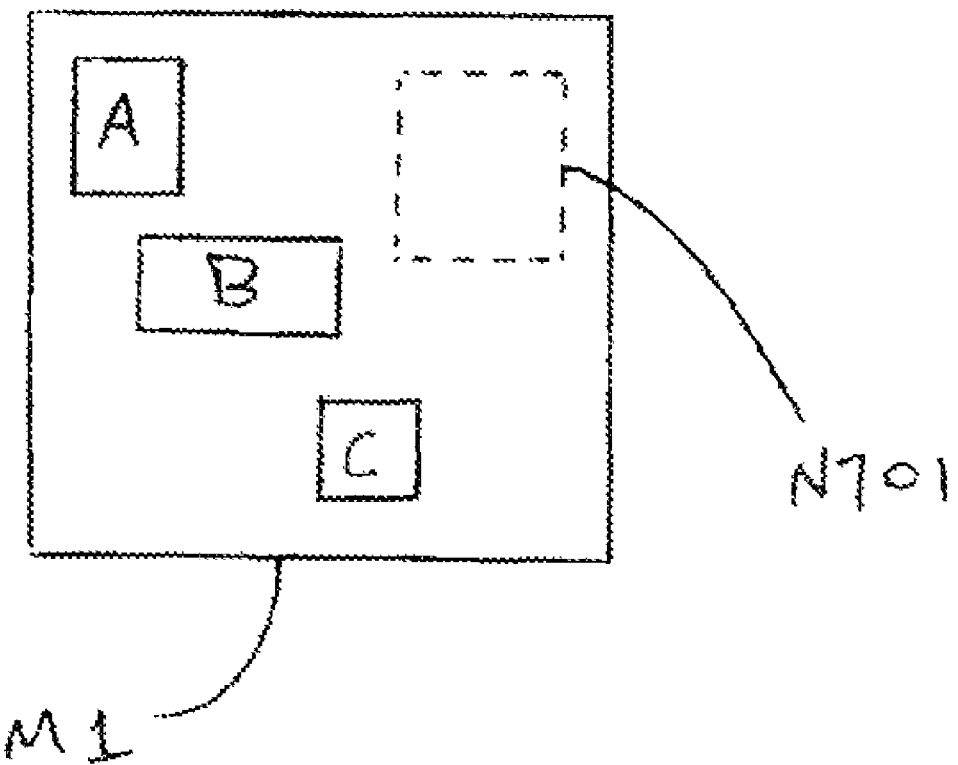
FIG. 25 illustrates a preferred arrangement of storing "count values"

Additionally a preferred further improved arrangement is provided by the technique of storing "count values" corresponding to replicated memory locations. Specifically, it is envisaged of preferably storing "count vales" in such a manner so as to be inaccessible by the application program such as by the application program code. FIG. 25 describes this further preferred storage arrangement.

FIG. 25 depicts a single machine M1 of the plurality of machines depicted in FIG. 2. The other machines (M2-M4) have been omitted from this drawing for simplicity of illustration, though the depiction of the preferred storage arrangement of FIG. 25 is applicable to all such machines of such a plurality (such as machines M2-Mn of FIG. 2), as well as any other replicated, distributed, or multiple computer system arrangement.

Specifically, indicated in FIG. 25 is the memory of machine M1 in which is indicated a non-application memory region N701, indicated as a dotted square. Such memory is preferably inaccessible to the application program executing on machine M1, in contrast to memory locations A, B and C, and the dotted outline is used in this drawing to indicate this and differentiate it from the accessible memory locations A, B and C.

In the preferred arrangement depicted in FIG. 25, the "count value(s)" are stored in such a non-application memory region, so as to be inaccessible to the application program and application program code.

Various memory arrangements and methods for non-application-accessible memory regions are know in the prior art, such as using virtual memory, pages, and memory management units (MMUs) to create memory spaces or regions or address-ranges inaccessible to specific instructions or code (such as for example application program code). Other arrangements are also known in the prior art, such as through the use of namespaces, software or application domains, virtual machines, and segregated/independent memory heaps, and all such memory partitioning, segregation and/or memory access-control methods and arrangements are to be included within the scope of the present invention.

Such an arrangement is preferable so that the "count values" stored in the non-application memory region N701 are not able to be tampered with, edited, manipulated, modified, destroyed, deleted or otherwise interfered with by the application program or application program code in an unauthorized, unintended, unexpected or unsupported manner.

Though only a single non-application memory region is indicated in FIG. 25, more than one non-application memory region may be used, and any such multi-region arrangement is to be considered included within the scope of the present invention.

In at least one embodiment of this invention, one, some, or all "count value(s)" of a single machine, may be stored in internal memory, main memory, system memory, real-memory, virtual-memory, volatile memory, cache memory, or any other primary storage or other memory/storage of such single machine as may be directly accessed (or accessible) to/by the central processing unit(s) of the single machine.

Alternatively, in at least one further alternative embodiment of this invention, one, some, or all "count value(s)" of a single machine, may be stored in external memory, flash memory, non-volatile memory, or any other secondary storage or other memory/storage of such single machine as may not be directly accessed (or accessible) to/by the central processing unit(s) of the single machine (such as for example, magnetic or optical disk drives, tape drives, flash drives, or the like).

Alternatively again, in at least one further alternative embodiment of this invention, some first subset of all "count value(s)" of a single machine may be stored in internal memory, main memory, system memory, real-memory, virtual-memory, volatile memory, cache memory, or any other primary storage or other memory/storage of such single machine as may be directly accessed (or accessible) to/by the central processing unit(s) of the single machine, and some other second subset of all "count value(s)" of the single machine may be stored in external memory, flash memory, non-volatile memory, or any other secondary storage or other memory/storage of such single machine as may not be directly accessed (or accessible) to/by the central processing unit(s) of the single machine (such as for example, magnetic or optical disk drives, tape drives, flash drives, or the like). Further alternatively again, in at least one further alternative embodiment of this invention, "count value(s)" of such first subset and such second subset may be moved between/amongst (e.g. moved from or to) such first and second subsets, and thereby also moved between/amongst (e.g. moved from or to) such internal memory (e.g. primary storage) and such external memory (e.g. secondary storage).

Importantly, the above-described method of actioning replica update messages having a "count value" associated with an updated value of a replicated memory location, makes possible the detection, or the ability to detect, the occurrence of two or more conflicting replica update messages for a same replicated memory location. Furthermore, such "actioning" of received replica update messages by each receiving machine may occur independently of each other machine (and potentially at different times and/or different orders on different machines), and without additional communication, confirmation, acknowledgement or other communications of or between such machines to achieve the actioning of each received transmission.

For a plurality of corresponding replica memory locations of a plurality of machines (one of each corresponding replica memory locations on each one of such machines), there is only a single "count value", and not multiple "per-machine" count-values—such as for example, a unique "count value" of machine M1 for replica memory location A, and a second and different "count value" of machine M2 for replica memory location A. As a result, each machine does not need to store multiple "count values" for a single replica memory location (such as for example machine M1 storing a copy of machine M1's "count value" for replica memory location A, as well as storing a local copy of machine M2's "count value" for replica memory location A, as well as storing a local copy of machine M3's "count value" for replica memory location A etc.), nor transmit with each replica update transmission more than one "count value" for a single replica memory location. Consequently, as the number of machines comprising the plurality grows, there is not a corresponding growth of plural "count values" of a single replicated memory location required to be maintained. Specifically, only one "count value" is maintained for all corresponding replica memory locations of all machines, and not one "count value" for each machine on which a corresponding replica memory location resides. Therefore, as the number of machines in the plurality grows, there is not a growth of per-machine "count-values" for replicated memory locations.

Alternative associations and correspondences between "count value(s)" and replicated memory location(s) are also provided. Specifically, in addition to the above described "one-to-one" association of a single "count value" with each single replicated memory location, alternative arrangements are provided where a single "count value" may be associated with two or more replicated memory locations. For example, a single "count value" may be stored and/or transmitted for a related set of replicated memory locations, such as plural replicated memory locations having an array data structure, or an object, or a class, or a "struct", or a virtual memory page, or other structured data type comprising two or more related and/or associated replicated memory locations.

Preferably, "count value(s)" are not stored and/or operated for non-replicated memory locations or non-replica memory locations (that is, memory location(s) which are not replicated on two or machines and updated to remain substantially similar). Consequently, "count values" are preferably not stored for such non-replicated memory locations and/or non-replica memory locations.

Also preferably, "count value(s)" corresponding to a specific replicated memory location (or set of replicated memory location(s)) are only stored and/or operated on those machines on which such specific replicated memory location is replicated (that is, on those machines on which a corresponding local replica memory location resides).

Preferably, when a replicated memory location which is replicated on some number of machines (such as for example machines M1-M3), is additionally replicated on a further machine (such as a machine M4), then a local/resident "count value" is created on such further machine (e.g. machine M4) corresponding to such additionally replicated memory location, and initialised with a substantially similar value of at least one of the "count value(s)" of the other machines on which the additionally replicated memory location was already replicated (e.g. machines M1-M3). Preferably, such process of creating and initialising a "count value" on such further machine (e.g. machine M4) does not cause the "count value(s)" of any other machine (e.g. machines M1-M3) to be incremented, updated or changed. Thereafter, replica update transmissions may be sent and received by all machines (including the further machine on which the replicated memory location was additionally replicated) on which a corresponding replica memory location resides (e.g. machines M1-M4), in accordance with the above-described methods and arrangements.

Preferably, when a non-replicated memory location of a first machine (such as for example machine M1), is replicated on one or more further machines (such as a machines M2-M4), then a local/resident "count value" is created corresponding to such replicated memory location on both of such first machine (e.g. machine M1) and such further machines (e.g. machines M2-M4), and initialised with a substantially similar initial value. Preferably such initial value is zero (ie "0"), however any other alternative initial values may be used so long as such alternative initial value is substantially similar across all such corresponding resident "count values" of all machines (e.g. machines M1-M4). Preferably also, such process of creating and initialising a "count value" on such first machine (e.g. machine M1) and such further machines (e.g. machines M2-M4) does not cause the initial "count value(s)" to be incremented, updated or changed. Thereafter, replica update transmissions may be sent and received by all machines (including the first machine and further machine (s)) on which a corresponding replica memory location resides (e.g. machines M1-M4), in accordance with the above-described methods and arrangements.

The foregoing describes only some embodiments of the present invention and modifications, obvious to those skilled in the computing arts, can be made thereto without departing from the scope of the present invention. For example, reference to JAVA includes both the JAVA language and also JAVA platform and architecture.

Similarly, the "count values" described above are integers but this need not be the case. Fractional "count values" (i.e. using a float or floating point arithmetic or decimal fraction) are possible but are undesirably complex.

It will also be appreciated to those skilled in the art that rather than incrementing the "count value" for successive messages, the "count value" could be decremented instead. This would result in later messages being identified by lower "count values" rather than higher "count values" as described above.

In the various embodiments of the present invention described above, local/resident "count value(s)" of written-to replicated memory location(s) are described to be incremented by a value of "1" prior to, or upon occasion of, a replica update transmission by a sending machine being transmitted. Such incremented "count value" is also described to be stored to overwrite/replace the previous local/resident "count value" of the transmitting machine (e.g. that is, the local/resident "count value" from the which the incremented "count value" was calculated). However, it is not a requirement of the present invention that such incremented "count values" must be incremented by a value of "1". Instead, alternative arrangements of the present invention are anticipated where such incremented "count value(s)" may be (or have been) incremented by a value of more than "1" (for example, "2", or "10", or "100"). Specifically, exactly what increment value is chosen to be employed to increment a "count value" is not important for this invention, so long as the resulting "incremented count value" is greater than the previous local/resident "count value".

Furthermore, alternative arrangements to incrementing the resident "count value" are also provided. Specifically, it is not a requirement of the present invention that such updated "count value(s)" of a replica update transmission must be incremented, and instead any other method or means or arrangement may be substituted to achieve the result of updated "count value(s)" which are greater than the previous local/resident "count value(s)". Consequently, what is important is that corresponding to a replica update transmission being transmitted, that such replica update transmission comprises an "updated count value" which is greater than the previous known "local/resident count value" of the transmitting machine (such as may be known for example at the time of transmission, or alternatively as may be known at a time when the replica update transmission is prepared for, or begins preparation for, transmission), and also that such previous known "local/resident count value" of the transmitting machine is overwritten/replaced with the transmitted "updated count value".

The term "distributed runtime system", "distributed runtime", or "DRT" and such similar terms used herein are intended to capture or include within their scope any application support system (potentially of hardware, or firmware, or software, or combination and potentially comprising code, or data, or operations or combination) to facilitate, enable, and/or otherwise support the operation of an application program written for a single machine (e.g. written for a single logical shared-memory machine) to instead operate on a multiple computer system with independent local memories and operating in a replicated shared memory arrangement. Such DRT or other "application support software" may take many forms, including being either partially or completely implemented in hardware, firmware, software, or various combinations therein.

The methods of this invention described herein are preferably implemented in such an application support system, such as DRT described in International Patent Application No. PCT/AU2005/000580 published under WO 2005/103926 (and to which U.S. patent application Ser. No. 111/111,946, however this is not a requirement of this invention. Alternatively, an implementation of the methods of this invention may comprise a functional or effective application support system (such as a DRT described in the abovementioned PCT specification) either in isolation, or in combination with other softwares, hardwares, firmwares, or other methods of any of the above incorporated specifications, or combinations therein.

The reader is directed to the abovementioned PCT specification for a full description, explanation and examples of a distributed runtime system (DRT) generally, and more specifically a distributed runtime system for the modification of application program code suitable for operation on a multiple computer system with independent local memories functioning as a replicated shared memory arrangement, and the subsequent operation of such modified application program code on such multiple computer system with independent local memories operating as a replicated shared memory arrangement.

Also, the reader is directed to the abovementioned PCT specification for further explanation, examples, and description of various provided methods and means which may be used to modify application program code during loading or at other times.

Also, the reader is directed to the abovementioned PCT specification for further explanation, examples, and description of various provided methods and means which may be used to modify application program code suitable for operation on a multiple computer system with independent local memories and operating as a replicated shared memory arrangement.

Finally, the reader is directed to the abovementioned PCT specification for further explanation, examples, and description of various provided methods and means which may be used to operate replicated memories of a replicated shared memory arrangement, such as updating of replicated memories when one of such replicated memories is written-to or modified.

In alternative multicomputer arrangements, such as distributed shared memory arrangements and more general distributed computing arrangements, the above described methods may still be applicable, advantageous, and used. Specifically, any multi-computer arrangement where replica, "replica-like", duplicate, mirror, cached or copied memory locations exist, such as any multiple computer arrangement where memory locations (singular or plural), objects, classes, libraries, packages etc are resident on a plurality of connected machines and preferably updated to remain consistent, then the abovedescribed methods are applicable. For example, distributed computing arrangements of a plurality of machines (such as distributed shared memory arrangements) with cached memory locations resident on two or more machines and optionally updated to remain consistent comprise a functional "replicated memory system" with regard to such cached memory locations, and is to be included within the scope of the present invention. Thus, it is to be understood that the aforementioned methods apply to such alternative multiple computer arrangements. The above disclosed methods may be applied in such "functional replicated memory systems" (such as distributed shared memory systems with caches) mutatis mutandis.

It is also provided and envisaged that any of the described functions or operations described as being performed by an optional server machine X (or multiple optional server machines) may instead be performed by any one or more than one of the other participating machines of the plurality (such as machines M1, M2, M3 . . . Mn of FIG. 1).

Alternatively or in combination, it is also further provided and envisaged that any of the described functions or operations described as being performed by an optional server machine X (or multiple optional server machines) may instead be partially performed by (for example broken up amongst) any one or more of the other participating machines of the plurality, such that the plurality of machines taken together accomplish the described functions or operations described as being performed by an optional machine X. For example, the described functions or operations described as being performed by an optional server machine X may broken up amongst one or more of the participating machines of the plurality.

Further alternatively or in combination, it is also further anticipated and envisaged that any of the described functions or operations described as being performed by an optional server machine X (or multiple optional server machines) may instead be performed or accomplished by a combination of an optional server machine X (or multiple optional server machines) and any one or more of the other participating machines of the plurality (such as machines M1, M2, M3 . . .

Mn), such that the plurality of machines and optional server machines taken together accomplish the described functions or operations described as being performed by an optional single machine X. For example, the described functions or operations described as being performed by an optional server machine X may broken up amongst one or more of an optional server machine X and one or more of the participating machines of the plurality.

Various record storage and transmission arrangements may be used when implementing this invention. One such record or data storage and transmission arrangement is to use "tables", or other similar data storage structures. Regardless of the specific record or data storage and transmission arrangements used, what is important is that the replicated written-to memory locations are able to be identified, and their updated values (and identity) are to be transmitted to other machines (preferably machines of which a local replica of the written-to memory locations reside) so as to allow the receiving machines to store the received updated memory values to the corresponding local replica memory locations.

Thus, the methods of this invention are not to be restricted to any of the specific described record or data storage or transmission arrangements, but rather any record or data storage or transmission arrangement which is able to accomplish the methods of this invention may be used.

Specifically with reference to the described example of a "table", the use of a "table" storage or transmission arrangement (and the use of the term "table" generally) is illustrative only and to be understood to include within its scope any comparable or functionally equivalent record or data storage or transmission means or method, such as may be used to implement the methods of this invention.

The terms "object" and "class" used herein are derived from the JAVA environment and are intended to embrace similar terms derived from different environments, such as modules, components, packages, structs, libraries, and the like.

The use of the term "object" and "class" used herein is intended to embrace any association of one or more memory locations. Specifically for example, the term "object" and "class" is intended to include within its scope any association of plural memory locations, such as a related set of memory locations (such as, one or more memory locations comprising an array data structure, one or more memory locations comprising a struct, one or more memory locations comprising a related set of variables, or the like).

Reference to JAVA in the above description and drawings includes, together or independently, the JAVA language, the JAVA platform, the JAVA architecture, and the JAVA virtual machine. Additionally, the present invention is equally applicable mutatis mutandis to other non-JAVA computer languages (including for example, but not limited to any one or more of, programming languages, source-code languages, intermediate-code languages, object-code languages, machine-code languages, assembly-code languages, or any other code languages), machines (including for example, but not limited to any one or more of, virtual machines, abstract machines, real machines, and the like), computer architectures (including for example, but not limited to any one or more of, real computer/machine architectures, or virtual computer/machine architectures, or abstract computer/machine architectures, or microarchitectures, or instruction set architectures, or the like), or platforms (including for example, but not limited to any one or more of, computer/computing platforms, or operating systems, or programming languages, or runtime libraries, or the like).

Examples of such programming languages include procedural programming languages, or declarative programming languages, or object-oriented programming languages. Further examples of such programming languages include the Microsoft.NET language(s) (such as Visual BASIC, Visual BASIC.NET, Visual C/C++, Visual C/C++.NET, C#, C#.NET, etc), FORTRAN, C/C++, Objective C, COBOL, BASIC, Ruby, Python, etc.

Examples of such machines include the JAVA Virtual Machine, the Microsoft .NET CLR, virtual machine monitors, hypervisors, VMWare, Xen, and the like.

Examples of such computer architectures include, Intel Corporation's x86 computer architecture and instruction set architecture, Intel Corporation's NetBurst microarchitecture, Intel Corporation's Core microarchitecture, Sun Microsystems' SPARC computer architecture and instruction set architecture, Sun Microsystems' UltraSPARC III microarchitecture, IBM Corporation's POWER computer architecture and instruction set architecture, IBM Corporation's POWER4/POWER5/POWER6 microarchitecture, and the like.

Examples of such platforms include, Microsoft's Windows XP operating system and software platform, Microsoft's Windows Vista operating system and software platform, the Linux operating system and software platform, Sun Microsystems' Solaris operating system and software platform, IBM Corporation's AIX operating system and software platform, Sun Microsystems' JAVA platform, Microsoft's .NET platform, and the like.

When implemented in a non-JAVA language or application code environment, the generalized platform, and/or virtual machine and/or machine and/or runtime system is able to operate application code in the language(s) (including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine. It will also be appreciated in light of the description provided herein that platform and/or runtime system may include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

In the JAVA language memory locations include, for example, both fields and elements of array data structures. The above description deals with fields and the changes required for array data structures are essentially the same mutatis mutandis.

Any and all embodiments of the present invention are able to take numerous forms and implementations, including in software implementations, hardware implementations, silicon implementations, firmware implementation, or software/ hardware/silicon/firmware combination implementations.

The above arrangements may be implemented by computer program code statements or instructions (possibly including by a plurality of computer program code statements or instructions) that execute within computer logic circuits, processors, ASICs, microprocessors, microcontrollers, or other logic to modify the operation of such logic or circuits to accomplish the recited operation or function. In another arrangement the implementation may be in firmware and in other arrangement may be in hardware. Furthermore, any one or each of these various implementations may be a combination of computer program software, firmware, and/or hardware.

Any and each of the aforedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer on which it executes or on a computer coupled with, connected to, or otherwise in signal communications with the computer on which the computer program or computer program product is present or executing. Such computer program or computer program product modifying the operation and architectural structure of the computer, computing machine, and/or information appliance to alter the technical operation of the computer and realize the technical effects described herein.

For ease of description, some or all of the indicated memory locations herein may be indicated or described to be replicated on each machine, and therefore, replica memory updates to any of the replicated memory locations by one machine, will be transmitted/sent to all other machines. Importantly, the methods and embodiments of this invention are not restricted to wholly replicated memory arrangements, but are applicable to and operable for partially replicated shared memory arrangements mutatis mutandis (e.g. where one or more replicated memory locations are only replicated on a subset of a plurality of machines).

All described embodiments and arrangements of the present invention are equally applicable to replicated shared memory systems, whether partially replicated or not. Specifically, partially replicated shared memory arrangements where some plurality of memory locations are replicated on some subset of the total machines operating in the replicated shared memory arrangement, themselves may constitute a replicated shared memory arrangement for the purposes of this invention.

Figure 28:
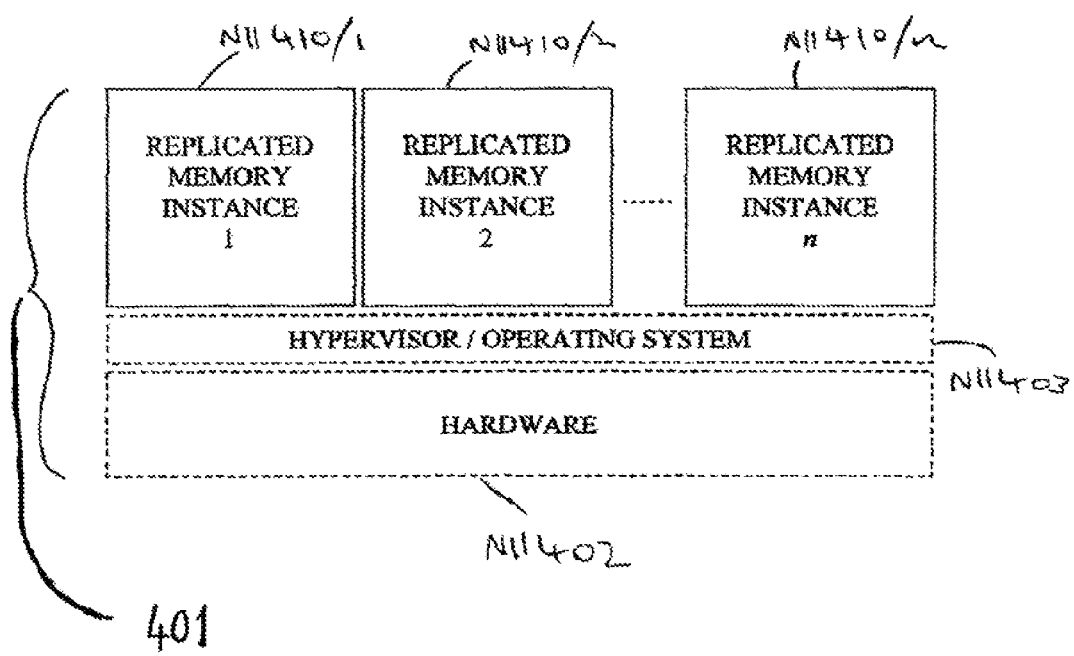

With reference to FIG. 28, where memory locations "A", "B", and "C" are replicated on three machines M1, M2, and M3 of a five machine replicated shared memory arrangement (comprising additional machines M4 and M5), then for the purposes of this invention the term replicated shared memory arrangement is not to be restricted to all 5 machines M1-M5, but may be also encompass any lesser plurality of machines (less than the total number of machines) in the operating arrangement, such as for example machines M1-M3. Thus, machines M1, M2 and M3 with replicated memory locations "A", "B" and "C" constitute a replicated shared memory arrangement in their own right (without machines M4 or M5).

Typically, the replicated shared memory arrangements described and illustrated within this invention generally are explained to take the form of a plurality of independent machines with independent local memories, such as that depicted in FIG. 2 and N10. However, various alternative machine arrangements take the from of a replicated shared memory system are provided by, and included within the scope of, this invention.

Specifically, the term "machine" used herein to refer to a singular computing entity of a plurality of such entities operating as a replicated shared memory arrangement is not to be restricted or limited to mean only a single physical machine or other single computer system. Instead, the use of the term "machine" herein is to be understood to encompass and include within its scope a more broad usage for any "replicated memory instance" (or "replicated memory image", or "replicated memory unit") of a replicated shared memory arrangement.

Specifically, replicated shared memory arrangements as described herein take the form of a plurality of machines, each of which operates with an independent local memory. Each such independent local memory of a participating machine within a replicated shared memory arrangement represents an "independent replicated memory instance" (whether partially replicated or fully replicated). That is, the local memory of each machine in a plurality of such machines operating as a replicated shared memory arrangement, represents and operates as an "independent replicated memory instance". Whilst the most common embodiment of such a "replicated memory instance" is a single such instance of a single physical machine comprising some subset, or total of, the local memory of that single physical machine, "replicated memory instances" are not limited to such single physical machine arrangements only.

Figure 29:
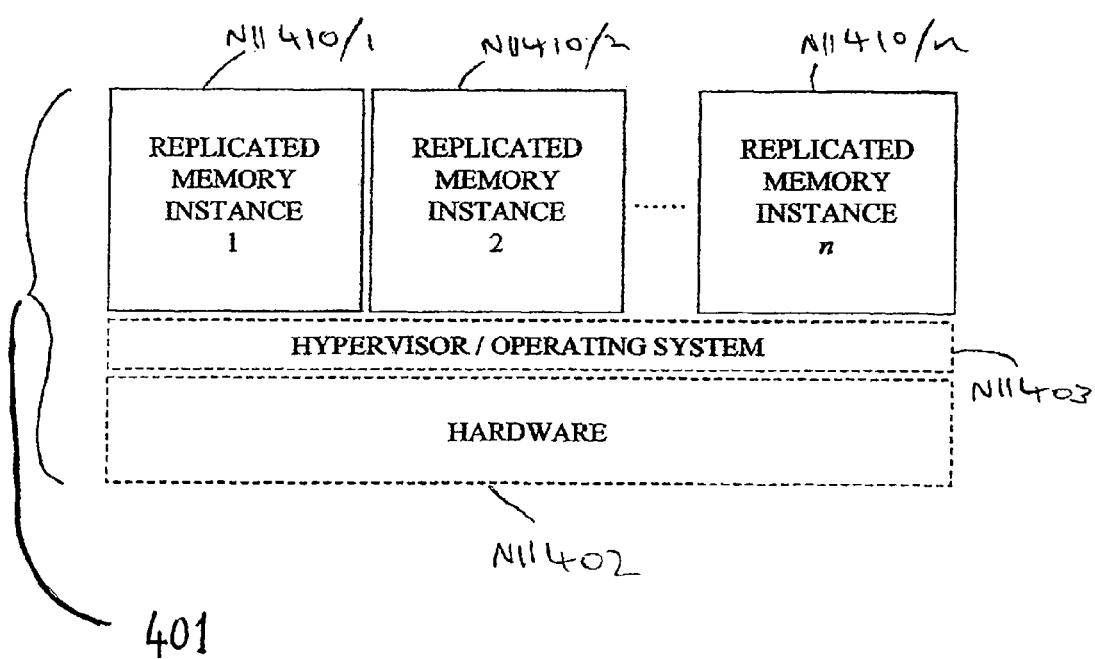
FIG. 29 illustrates an alternative arrangement of replicated memory instances.

For example, the term "machine" includes within its scope any of various "virtual machine" or similar arrangements. One general example of a "virtual machine" arrangement is indicated in FIG. 29. Such virtual machine arrangements may take the form of hypervisor or virtual machine monitor assisted arrangements such as VMWare virtual machine instances, or Xen paravirtualization instances. Alternative substantially equivalent virtual machine arrangements also include Solaris Containers, Isolated Software Domains, Parallel Operating System instances, substantially independent Application Processes or Tasks with independent and/or isolated and/or protected memories, or any other such independent virtual machine instance or such similar multi-program arrangement with an independent or isolated or protected memory. Those skilled in the computing arts will be familiar with various alternative "virtual machine" arrangements.

Utilising any of the various "virtual machine" arrangements, multiple "virtual machines" may reside on, or occupy, a single physical machine, and yet operate in a substantially independent manner with respect to the methods of this invention and the replicated shared memory arrangement as a whole. Essentially then, such "virtual machines" appear, function, and/or operate as independent physical machines, though in actuality share, or reside on, a single common physical machine. Such an arrangement of "n" "virtual machines" N11410 is depicted in FIG. 29.

In FIG. 29, a single physical machine N11401 is indicated comprising hardware N11402 and a hypervisor and/or operating system N11403. Shown to be operating within machine N11401 and above the hypervisor/operating system layer, are n "virtual machines" N11410 (that is, N11410/1, N11410/2 . . . N11410/n), each with a substantially independent, isolated and/or protected local memory (typically take the form of some subset of the total memory of machine N11401).

Each such "virtual machine" N11410 for the purposes of this invention may take the form of a single "replicated memory instance", which is able to behave as, and operate as, a "single machine" of a replicated shared memory arrangement.

When two or more such "virtual machines" reside on, or operate within, a single physical machine, then each such single "virtual machine" will typically represent a single "replicated memory instance" for the purposes of replicated shared memory arrangements. In otherwords, each "virtual machine" with a substantially independent memory of any other "virtual machine", when operating as a member of a plurality of "replicated memory instance" in a replicated shared memory arrangement, will typically represent and operate as a single "replicated memory instance", which for the purposes of this invention comprises a single "machine" in the described embodiments, drawings, arrangements, description, methods and claims contained herein.

Thus, it is provided by this invention that a replicated shared memory arrangement, and the methods of this invention applied and operating within such an arrangement, may include a plurality of "replicated memory instances", which may or may not each correspond to a single independent physical machine. For example, replicated shared memory arrangements are provided where such arrangements comprise a plurality (such as for example 10) of virtual machine instances operating as independent "replicated memory instances", where each virtual machine instance operates within one common, shared, physical machine.

Alternatively for example, replicated shared memory arrangements are provided where such arrangements comprise some one or more virtual machine instances of a single physical machine operating as independent "replicated memory instances" of such an arrangement, as well as some one or more single physical machines not operating with two or more "replicated memory instances".

Further alternatively arrangements of "virtual machines" are also provided and are to be included within the scope of the present invention, including arrangements which reside on, or operate on, multiple physical machines and yet represent a single "replicated memory instance" for the purposes of a replicated shared memory arrangement.

Any combination of any of the above described methods or arrangements are provided and envisaged, and are to be included within the scope of the present invention.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (eg "globalname7787"), and with the understanding that each machine relates the global name to a specific local name or object (eg "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (eg memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(i) re-compilation at loading,
(ii) a pre-compilation procedure prior to loading,
(iii) compilation prior to loading,
(iv) "just-in-time" compilation(s), or
(v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Those skilled in the programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to memory updating means and/or memory replicating means, distributed run time means, modifier or modifying means, and the like. Any one or each of these various means may be implemented by computer program code statements or instructions (possibly including by a plurality of computer program code statements or instructions) that execute within computer logic circuits, processors, ASICs, microprocessors, microcontrollers or other logic to modify the operation of such logic or circuits to accomplish the recited operation or function. In another arrangement, any one or each of these various means may be implemented in firmware and/or in hardware. Furthermore, any one or each of these various means may be implemented by a combination of computer program software, firmware, and/or hardware.

Any and each of the above described methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore be constituted by a computer program product comprising a set of program instructions stored in a storage medium or existing electronically in any form and operable to permit a plurality of computers to carry out any of the methods, procedures, routines, or the like as described herein including in any of the claims.

Furthermore, the invention includes a plurality of computers interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system.

To summarize, there is disclosed a method of asynchronous transmission of data packets each forming part of a sequence of information and each intended to overwrite a previously transmitted packet of information, the method comprising the steps of:

(i) for each packet transmitting a data identifier, a data content, and a packet count value, (ii) for each data packet, for each data identifier transmitted in sequence, incrementing the packet count value to indicate the position of the data packet in the sequence, (iii) on receipt of a data packet for any data identifier, overwriting the previously received data content with the currently received data content only if the currently received packet count value is greater than the previously received packet count value.

Preferably the method includes the further step of:

(iv) disregarding any received data packet for which the currently received packet count is less than the previously received packet count.

Preferably the method includes the further step of:

(v) storing at the or each receiver of the data packets for each the identifier both the received data content and the received packet count value.

Preferably in step (ii) the packet count value is decremented, and in step (iii) the overwriting takes place only if the currently received packet count value is less than the previously received packet count value.

Also disclosed is a transmission system for asynchronous data packets each forming part of a sequence of information and each intended to overwrite a previously transmitted packet of information, and each packet comprising a data identifier, a data content and a packet count value, the system comprising a count valuer within a transmitter to determine the magnitude of the packet count value for each data packet, the count value indicating the position of the data packet in the sequence, and the or each receiver including a count comparison means to compare the currently received packet count value with the previously received packet count value and overwriting the previously received data content with the currently received data content only if the current received packet count exceeds the previously received packet count.

Preferably the or each the receiver includes a memory store means having a plurality of storage addresses each corresponding to one of the data identifiers and each having provision to store the received data content and the received packet count.

Preferably the count valuer increments the packet count value for each successive data packet in the sequence.

Preferably the count comparison means carries out the overwriting only if the currently received packet count is less than the previously received packet count.

A modified system is also disclosed in which the count valuer decrements the packet count value for each the successive data packet.

In addition, there is disclosed a method of asynchronous transmission of data packets each forming part of a sequence of information and each intended to overwrite a previously transmitted packet of information, the method comprising the steps of:

(i) for each packet transmitting a data identifier, a data content, and a packet count value, and (ii) for each data packet, for each data identifier transmitted in sequence, incrementing the packet count value to indicate the position of the data packet in the sequence.

Preferably the method includes the further step of:

(iii) on receipt of a data packet for any data identifier, overwriting the previously received data content with the currently received data content only if the currently received packet count value is greater than the previously received packet count value.

Furthermore, there is disclosed a method of asynchronous reception of data packets each forming part of a sequence of information and each intended to overwrite a previously transmitted packet of information, the method comprising the steps of:

(i) receiving a data packet that includes a data identifier, a data content, and a packet count value, and (ii) in response to receipt of a data packet for any data identifier, overwriting a previously received data content with a currently received data content only if the currently received packet count value is greater than the previously received packet count value.

Preferably the method includes the further steps of:

(iii) transmitting the packet including for each packet transmitting a data identifier, a data content, and a packet count value, and (iv) for each data packet, for each data identifier transmitted in sequence, incrementing the packet count value to indicate the position of the data packet in the sequence when transmitted.

Still further there is disclosed a transmission system for asynchronous data packets each forming part of a sequence of information and each intended to overwrite a previously transmitted packet of information in an external receiver, and each packet comprising a data identifier, a data content and a packet count value, the system comprising a count valuer within a transmitter to determine the magnitude of the packet count value for each data packet, the count value indicating the position of the data packet in the sequence.

Preferably the system further includes the external receiver, wherein the or each receiver including a count comparison means to compare the currently received packet count value with the previously received packet count value and overwriting the previously received data content with the currently received data content only if the current received packet count exceeds the previously received packet count.

Similarly there is disclosed a receiver system for asynchronous data packets each forming part of a sequence of information and each intended to overwrite a previously received packet of information stored in the receiver and sent by an external transmitter, and each packet comprising a data identifier, a data content and a packet count value, the system comprising a count valuer within the transmitter to determine the magnitude of the packet count value for each data packet, the count value indicating the position of the data packet in the sequence; and the receiver including a count comparison means to compare a currently received packet count value with a previously received packet count value and overwriting the previously received data content with the currently received data content only if the current received packet count exceeds the previously received packet count.

Preferably the system further includes the external transmitter.

Still furthermore, there is disclosed a data packet signal structure comprising a data identifier, a data content, and a packet count value; the packet count value indicating the sequential position of the data packet in a sequence of separately transmitted data packet signals.

There is also disclosed a multiple computer system comprising a multiplicity of computers each executing a different portion of an applications program written to execute on a single computer, and each having an independent local memory with at least one memory location being replicated in each the local memory, and a method of asynchronous transmission of updating data packets by a single computer, each forming part of a sequence of information and each intended to overwrite a previously transmitted packet of information, wherein the updating data comprises an identifier of the replicated memory location to be updated, the content with which the replicated memory location is to be updated, and a resident updating count of the updating source associated with the identified replicated memory location, the method comprising the steps of:

(i) for each packet transmitting an updating data identifier, an updating data content and an updating count value, (ii) for each data packet, for each data identifier transmitted in sequence, incrementing the updating count value to indicate the position of the data packet in the sequence, (iii) on receipt of a data packet, overwriting the previously received data content corresponding to the data identifier with the currently received data content only if the currently received updating count value is greater than the previously received updating count value corresponding to the same data identifier.

In addition there is disclosed a multiple computer system comprising a multiplicity of computers each executing a different portion of an applications program written to execute on a single computer, and each having an independent local memory with at least one memory location being replicated in each the local memory, and a transmission system for asynchronous updating data packets by a single computer, each forming part of a sequence of information and each intended to overwrite a previously transmitted packet of information, wherein the updating data comprises an identifier of the replicated memory location to be updated, the content with which the replicated memory location is to be updated, and a resident updating count of the updating source associated with the identified replicated memory location, and each packet comprising a updating data identifier, a updating data content and an updating count value, the system comprising a count valuer within a transmitter to determine the magnitude of the updating count value for each data packet, the count value indicating the position of the updating data packet in the sequence, and the or each receiver including a count comparison means to compare the currently received updating count value with the previously received updating count value and overwriting the previously received data content with the currently received data content only if the current received updating count exceeds the previously received updating count. Preferably the count comparison means is a comparator.

Still further there is disclosed a multiple computer system comprising a multiplicity of computers each executing a different portion of an applications program written to execute on a single computer, and each having an independent local memory with at least one memory location being replicated in each the local memory, and a method of asynchronous transmission of updating data packets by a single computer, each forming part of a sequence of information each intended to overwrite a previously transmitted packet of information, wherein the updating data comprises an identifier of the replicated memory location to be updated, the content with which the replicated memory location is to be updated, and a resident updating count of the updating source associated with the identified replicated memory location, the method comprising the steps of:

(i) for each packet transmitting an updating data identifier, an updating data content, and an updating count value, and (ii) for each data packet, for each data identifier transmitted in sequence, incrementing the updating count value to indicate the position of the data packet in the sequence.

Furthermore there is disclosed a multiple computer system comprising a multiplicity of computers each executing a different portion of an applications program written to execute on a single computer, and each having an independent local memory with at least one memory location being replicated in each the local memory, and a method of asynchronous reception of updating data packets each forming part of a sequence of information and each intended to overwrite a previously transmitted packet of information, wherein the updating data comprises an identifier of the replicated memory location to be updated, the content with which the replicated memory location is to be updated, and a resident updating count of the updating source associated with the identified replicated memory location, and wherein the data packets are transmitted by a single computer, the method comprising the steps of:

(i) receiving a updating data packet that includes a updating data identifier, a updating data content, and a updating count value, and (ii) in response to receipt of an updating data packet, overwriting a previously received data content corresponding to the data identifier with a currently received data content only if the currently received updating count value is greater than the previously received updating count value corresponding to the same data identifier.

Additionally there is disclosed a multiple computer system comprising a multiplicity of computers each executing a different portion of an applications program written to execute on a single computer, and each having an independent local memory with at least one memory location being replicated in each the local memory, and a transmission system for asynchronous updating data packets each forming part of a sequence of information and each intended to overwrite a previously transmitted packet of information in an external receiver, wherein the updating data comprises an identifier of the replicated memory location to be updated, the content with which the replicated memory location is to be updated, and a resident updating count of the updating source associated with the identified replicated memory location, and wherein the data packets are transmitted by a single computer, and each packet comprising an updating data identifier, an updating data content and an updating count value, the system comprising a count valuer within a transmitter to determine the magnitude of the updating count value for each updating data packet, the count value indicating the position of the updating data packet in the sequence.

Still further there is disclosed a multiple computer system comprising a multiplicity of computers each executing a different portion of an applications program written to execute on a single computer, and each having an independent local memory with at least one memory location being replicated in each the local memory, and a receiver system for asynchronous updating data packets each forming part of a sequence of information and each intended to overwrite a previously received packet of information stored in the receiver and sent by an external transmitter, wherein the updating data comprises an identifier of the replicated memory location to be updated, the content with which the replicated memory location is to be updated, and a resident updating count of the updating source associated with the identified replicated memory location, and wherein the data packets are transmitted by a single computer, and each packet comprising an updating data identifier, an updating data content and an updating count value, the system comprising a count valuer within the transmitter to determine the magnitude of the updating count value for each updating data packet, the count value indicating the position of the updating data packet in the sequence; and the receiver including a count comparison means to compare a currently received updating count value corresponding to a data identifier with a previously received updating count value corresponding to the same data identifier, and overwriting the previously received data content with the currently received data content only if the current received updating count exceeds the previously received updating count.

In addition a multiple computer system is disclosed comprising a multiplicity of computers each executing a different portion of an applications program written to execute on a single computer, and each having an independent local memory with at least one memory location being replicated in each the local memory, and a data packet signal structure comprising an updating data identifier of a replicated memory location to be updated, an updating data content of the identified replicated memory location, and an updating count value corresponding to the identified replicated memory location; the updating count value indicating the sequential position of the updating data packet in a sequence of separately transmitted updating data packet signals.

Yet further there is disclosed a method of replica memory updating by a single computer in which a memory location having a specific location identifier and replicated on at least one other computer, is updated multiple times from a single source, the method comprising the steps of:

(i) utilizing an updating format for the signal or packet carrying out the updating, the format comprising the specific identifier of the memory location to be updated, the content with which the memory location is to be updated, and a resident updating count of the updating source, the count comprising a number indicative of the sequence of occasions on which the updating source has been updated inclusive of the current updating, (ii) storing for each replicated memory location the updating count of the previously sent or received updating, (iii) comparing the presently resident updating count associated with the replicated memory location to be updated with the updating count of any currently received updating signal or packet, and (iv) if the currently received updating count is greater than the presently resident updating count, not overwriting the associated replicated memory location with the currently received data content, and not overwriting the presently resident updating count with the currently received updating count, or (v) if the currently received updating count is less than the presently resident updating count, overwriting the associated replicated memory location with the currently received data content, and overwriting the presently resident updating count with the currently received updating count.

Also there is disclosed a system for replica memory updating by a single computer, the system comprising at least one memory location having a specific location identifier and replicated on at least one other computer, and updated to remain substantially similar upon occasion of a computer modifying its replica value; a plurality of sources each of which can update the memory location(s) and each of which utilizes an updating format for the signal or packet carrying out the updating, the format comprising the specific identifier of the memory location to be updated, the content with which the memory location is to be updated, and a resident updating count of the updating source, the count comprising a number indicative of the sequence of occasions on which the updating source has been updated inclusive of the current updating; a storage means associated with each the memory location and in which the updating count of the previously received updating is stored; comparison means to compare the currently received updating count value with the corresponding presently resident updating count value and overwriting the associated replicated memory location with the currently received data content and overwriting the presently resident updating count with the currently received updating count, if the currently received updating count exceeds the presently resident updating count, or not overwriting the associated replicated memory location with the currently received data content and not overwriting the presently resident updating count with the currently received updating count, if the currently received updating count is less than the presently resident updating count.

Preferably the count comparison means is a comparator.

The term "comprising" (and its grammatical variations) as used herein is used in the inclusive sense of "having" or "including" and not in the exclusive sense of "consisting only of".

I claim:

1. A transmitter for transmitting an updating data packet to an external receiver, said transmitter characterized in that:
    said transmitter transmits said updating data packet that forms part of a sequence of information and each updating data packet transmitted being intended to overwrite a previously transmitted data packet, each said updating data packet transmitted comprises (i) an identifier of the replicated memory location to be updated, (ii) the content with which said replicated memory location is to be updated, and (iii) a resident updating count of the updating source associated with the identified replicated memory location, and each updating data packet comprising (a) a updating data identifier, (b) a updating data content, and (c) an updating count value; and
    said transmitter including a count valuer within said transmitter for determining a magnitude of the updating count value for each data packet transmitted, said updating count value indicating the position of said updating data packet in said sequence of information.

2. A transmitter as in claim 1, further including the external receiver.

3. A method for transmitting an updating data packet to an external receiver, said method for transmitting comprising:
    transmitting said updating data packet to an external receiver;
    said transmitted updating data packet forms part of a sequence of transmitted information and each updating data packet transmitted is transmitted with the intention to overwrite a previously transmitted data packet, each said updating data packet transmitted comprises (i) an identifier of the replicated memory location to be updated, (ii) the content with which said replicated memory location is to be updated, and (iii) a resident updating count of the updating source associated with the identified replicated memory location, and each updating data packet comprising (a) a updating data identifier, (b) a updating data content, and (c) an updating count value; and
    determining a magnitude of the updating count value for each data packet transmitted, said updating count value indicating the position of said updating data packet in said sequence of information.

4. An article of manufacture comprising a tangible computer readable media containing computer program instructions stored, therein, the computer program instructions executing in a processor within a computer or information appliance and a memory coupled with the processor so as to modify the operation of the computer or information appliance, the modification including performing a method for transmitting an updating data packet to an external receiver, said method comprising:
    transmitting said updating data packet to an external receiver;
    said transmitted updating data packet forms part of a sequence of transmitted information and each updating data packet transmitted is transmitted with the intention to overwrite a previously transmitted data packet, each said updating data packet transmitted comprises (i) an identifier of the replicated memory location to be updated, (ii) the content with which said replicated memory location is to be updated, and (iii) a resident updating count of the updating source associated with the identified replicated memory location, and each updating data packet comprising (a) a updating data identifier, (b) a updating data content, and (c) an updating count value; and
    determining a magnitude of the updating count value for each data packet transmitted, said updating count value indicating the position of said updating data packet in said sequence of information.

5. A transceiver system including a transmitter and at least one receiver for asynchronous transmission and reception of data packets;
    said transmitter transmitting said data packets each forming part of a sequence of information and each intended to overwrite a previously transmitted packet of information in said receiver, and each packet comprising a data identifier, a data content and a packet count value, said system comprising a count valuer within a transmitter to determine the magnitude of the packet count value for each data packet, said count value indicating the position of said data packet in said sequence;
    the at least one receiver including a count comparison means to compare the currently received packet count value with the previously received packet count value and overwriting the previously received data content with the currently received data content only if the current received packet count exceeds the previously received packet count.

* * * * *